US012809130B2

(12) United States Patent
Sin

(10) Patent No.: US 12,809,130 B2
(45) Date of Patent: Nov. 24, 2026

(54) OPTICAL SYSTEM AND CAMERA MODULE COMPRISING SAME

(71) Applicant: LG INNOTEK CO., LTD., Seoul (KR)

(72) Inventor: Doo Shik Sin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 242 days.

(21) Appl. No.: 18/709,136

(22) PCT Filed: Nov. 11, 2022

(86) PCT No.: PCT/KR2022/017806
§ 371 (c)(1),
(2) Date: May 10, 2024

(87) PCT Pub. No.: WO2023/085871
PCT Pub. Date: May 19, 2023

(65) Prior Publication Data

US 2025/0004251 A1 Jan. 2, 2025

(30) Foreign Application Priority Data

Nov. 11, 2021 (KR) ........................ 10-2021-0155135

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 9/64; G02B 13/00; G02B 13/0045; G02B 13/04; G02B 13/18; G02B 27/00;
(Continued)

(56) References Cited

U.S. PATENT DOCUMENTS

| | | | |
|---|---|---|---|
| 10,345,557 | B2 | 7/2019 | Kubota et al. |
| 2014/0307333 | A1 | 10/2014 | Kawamura |

(Continued)

FOREIGN PATENT DOCUMENTS

| | | |
|---|---|---|
| CN | 106483625 | 3/2017 |
| CN | 111505805 | 8/2020 |

(Continued)

OTHER PUBLICATIONS

International Search Report dated Feb. 17, 2023 issued in Application No. PCT/KR2022/017806.

*Primary Examiner* — Jie Lei
(74) *Attorney, Agent, or Firm* — KED & ASSOCIATES, LLP

(57) ABSTRACT

The optical system disclosed in the embodiment includes first to tenth lenses disposed along the optical axis from the object side toward the sensor side, the first lens has positive refractive power on the optical axis, and the tenth lens has negative refractive power on the optical axis, the object-side surface of the first lens has a convex shape on the optical axis, a sensor-side surface of the third lens has a smallest effective diameter among the first to tenth lenses, a sensor-side surface of the tenth lens has a maximum effective diameter among the first to tenth lenses, the sensor-side surface of the tenth lens is provided without a critical point from the optical axis to an end of an effective region, a distance from a center of the sensor-side surface of the tenth lens to a first point where a slope of a straight line passing through the sensor-side surface is less than −1 is 10% or more of an effective radius, and satisfies the following equation: 0.4<TTL/ImgH<2.5 (TTL (Total track length) is a distance in the optical axis from an apex of the object-side surface of the first lens to an image surface of an image
(Continued)

sensor, and ImgH is ½ of a maximum diagonal length of the image sensor.).

20 Claims, 19 Drawing Sheets

(58) Field of Classification Search
CPC .... G02B 27/0024; G02B 3/00; G02B 3/0087; G02B 15/14; G02B 15/1421; G02B 2003/0093; G03B 17/12; H04N 23/00; H04N 23/55
USPC ....... 359/754, 708, 713, 772, 681, 691, 692, 359/755, 776
See application file for complete search history.

(56) References Cited

U.S. PATENT DOCUMENTS

| | | | |
|---|---|---|---|
| 2020/0393653 A1 | 12/2020 | Chen | |
| 2021/0389574 A1 | 12/2021 | Li et al. | |
| 2021/0389575 A1 | 12/2021 | Li et al. | |
| 2022/0082803 A1 | 3/2022 | Lu et al. | |

FOREIGN PATENT DOCUMENTS

| | | |
|---|---|---|
| CN | 111679399 | 9/2020 |
| CN | 111897103 | 11/2020 |
| JP | 5642891 | 12/2014 |
| KR | 10-2009-0039386 | 4/2009 |

FIG. 3

| Y(mm) | d12 | d23 | d34 | d45 | d56 | d67 | d78 | d89 | d910 |
|---|---|---|---|---|---|---|---|---|---|
| 0 | 0.28 | 0.04 | 0.49 | 0.12 | 0.03 | 0.22 | 0.53 | 0.03 | 0.63 |
| 0.1 | 0.28 | 0.04 | 0.48 | 0.12 | 0.03 | 0.22 | 0.53 | 0.03 | 0.63 |
| 0.2 | 0.28 | 0.04 | 0.48 | 0.12 | 0.03 | 0.23 | 0.53 | 0.03 | 0.63 |
| 0.3 | 0.28 | 0.04 | 0.47 | 0.12 | 0.03 | 0.23 | 0.52 | 0.04 | 0.62 |
| 0.4 | 0.29 | 0.05 | 0.46 | 0.12 | 0.03 | 0.24 | 0.52 | 0.04 | 0.60 |
| 0.5 | 0.29 | 0.05 | 0.44 | 0.12 | 0.03 | 0.25 | 0.52 | 0.05 | 0.59 |
| 0.6 | 0.29 | 0.06 | 0.42 | 0.12 | 0.03 | 0.26 | 0.51 | 0.06 | 0.57 |
| 0.7 | 0.29 | 0.06 | 0.39 | 0.13 | 0.03 | 0.27 | 0.51 | 0.07 | 0.54 |
| 0.8 | 0.29 | 0.07 | 0.36 | 0.13 | 0.03 | 0.29 | 0.50 | 0.08 | 0.52 |
| 0.9 | 0.30 | 0.07 | 0.33 | 0.13 | 0.03 | 0.30 | 0.50 | 0.09 | 0.49 |
| 1 | 0.30 | 0.08 | 0.29 | 0.13 | 0.03 | 0.32 | 0.49 | 0.10 | 0.46 |
| 1.1 | 0.31 | 0.09 | 0.25 | 0.13 | 0.03 | 0.35 | 0.48 | 0.11 | 0.43 |
| 1.2 | 0.31 | 0.09 | 0.20 | 0.13 | 0.03 | 0.37 | 0.47 | 0.12 | 0.40 |
| 1.3 | 0.32 | 0.10 | 0.14 | 0.13 | 0.03 | 0.40 | 0.46 | 0.13 | 0.37 |
| 1.4 | 0.32 | 0.11 | 0.07 | 0.13 | 0.03 | 0.43 | 0.45 | 0.15 | 0.34 |
| 1.5 | 0.33 | 0.11 | 0.29 | 0.12 | 0.04 | 0.47 | 0.43 | 0.16 | 0.31 |
| 1.6 | 0.34 | 0.12 | | 0.11 | 0.05 | 0.50 | 0.42 | 0.17 | 0.28 |
| 1.7 | 0.35 | | | | 0.06 | 0.54 | 0.40 | 0.18 | 0.25 |
| 1.8 | | | | | 0.08 | 0.57 | 0.39 | 0.19 | 0.23 |
| 1.9 | | | | | 0.11 | 0.61 | 0.37 | 0.20 | 0.20 |
| 2 | | | | | | 0.63 | 0.35 | 0.21 | 0.18 |
| 2.1 | | | | | | 0.64 | 0.33 | 0.21 | 0.16 |
| 2.2 | | | | | | 0.06 | 0.30 | 0.22 | 0.14 |
| 2.3 | | | | | | 0.00 | 0.28 | 0.22 | 0.13 |
| 2.4 | | | | | | | 0.26 | 0.23 | 0.12 |
| 2.5 | | | | | | | 0.23 | 0.23 | 0.12 |
| 2.6 | | | | | | | 0.21 | 0.23 | 0.12 |
| 2.7 | | | | | | | | 0.23 | 0.13 |
| 2.8 | | | | | | | | 0.23 | 0.15 |
| 2.9 | | | | | | | | 0.24 | 0.17 |
| 3 | | | | | | | | 0.24 | 0.20 |
| 3.1 | | | | | | | | | 0.23 |
| 3.2 | | | | | | | | | 0.27 |
| 3.3 | | | | | | | | | 0.32 |
| 3.4 | | | | | | | | | 0.37 |
| 3.5 | | | | | | | | | |

FIG. 4

| | L1 | | L2 | | L3 | | L4 | | L5 | |
|---|---|---|---|---|---|---|---|---|---|---|
| | S1 | S2 | S1 | S2 | S1 | S2 | S1 | S2 | S1 | S2 |
| R | 2.858718 | 13.1555 | 8.334976 | 25.35124 | 6.105091 | 3.35538 | -9.06756 | -5.99444 | -7.75841 | -6.6943 |
| K | -0.11509 | -2.50914 | -8.2026 | -34.5733 | -20.713 | -0.01262 | 8.514977 | 9.440512 | 18.25419 | 3.453875 |
| A | 6.59E-04 | -2.41E-03 | 5.63E-05 | -1.04E-03 | -8.62E-03 | -1.84E-02 | -6.12E-03 | -9.96E-03 | -1.79E-02 | -2.87E-03 |
| B | 1.40E-04 | 5.07E-04 | -9.34E-05 | -5.81E-04 | 8.64E-04 | 4.19E-03 | -2.92E-03 | -2.00E-03 | -1.25E-03 | -1.50E-03 |
| C | -9.58E-06 | -1.80E-05 | 1.55E-04 | 2.81E-04 | 4.90E-04 | -3.26E-04 | -2.38E-04 | 6.83E-04 | 6.19E-04 | -1.03E-04 |
| D | 3.22E-06 | -5.90E-06 | 5.34E-06 | 1.63E-05 | -3.95E-05 | 1.07E-04 | 2.70E-04 | 1.11E-04 | -1.20E-04 | -5.42E-05 |
| E | 3.19E-07 | 6.46E-07 | 3.65E-06 | -2.04E-06 | -1.87E-05 | 2.51E-08 | 3.78E-10 | 1.72E-08 | -2.74E-09 | -1.17E-05 |
| F | -1.68E-07 | 6.93E-08 | 3.38E-07 | -1.51E-06 | 2.93E-09 | 3.54E-08 | 3.75E-08 | 1.70E-08 | 4.69E-09 | 1.62E-09 |
| G | -1.36E-08 | -1.85E-08 | 6.04E-10 | 4.05E-09 | 6.91E-09 | 6.33E-17 | -4.74E-17 | 2.38E-08 | 1.24E-08 | 1.08E-09 |
| H | -4.28E-09 | 1.45E-09 | 8.72E-10 | -5.52E-18 | 3.64E-18 | 2.33E-18 | 9.50E-19 | 3.76E-18 | -1.01E-18 | 9.10E-10 |
| J | 6.05E-12 | 1.13E-10 | 8.23E-19 | -1.85E-21 | 1.54E-19 | 1.49E-19 | 1.11E-19 | 1.46E-19 | 9.65E-20 | 4.63E-19 |
| | L6 | | L7 | | L8 | | L9 | | L10 | |
| | S1 | S2 | S1 | S2 | S1 | S2 | S1 | S2 | S1 | S2 |
| R | -7.27074 | -8.14869 | 16.3019 | 10.29913 | 110.7054 | -4.2562 | -14.8655 | 59.15583 | -2.62134 | -88.0019 |
| K | 9.048675 | 10.98557 | -38.5297 | -28.0045 | 95 | -6.39974 | 14.06269 | -95 | -2.58286 | 84.64695 |
| A | -2.98E-03 | -1.65E-02 | -7.53E-03 | -2.67E-03 | -7.72E-03 | 2.13E-03 | -2.23E-03 | -9.19E-03 | 9.42E-03 | 1.62E-03 |
| B | -4.10E-04 | 1.19E-04 | -5.62E-04 | 1.48E-04 | -2.86E-04 | 7.20E-05 | 2.69E-04 | 3.14E-04 | -5.12E-03 | -1.82E-03 |
| C | -3.07E-05 | 2.38E-04 | 1.68E-05 | -3.85E-05 | 6.38E-05 | -6.76E-06 | 3.32E-06 | -2.49E-06 | 1.79E-03 | 5.82E-04 |
| D | -8.72E-07 | 7.66E-06 | -9.68E-06 | 2.08E-06 | 1.43E-06 | 2.35E-07 | 6.60E-08 | -3.06E-07 | -3.70E-04 | -9.99E-05 |
| E | -3.88E-06 | 2.73E-06 | -1.34E-06 | 9.28E-08 | 2.35E-08 | 2.33E-09 | -6.60E-09 | -5.93E-09 | 4.87E-05 | 1.04E-05 |
| F | -1.87E-10 | 3.53E-07 | 8.65E-08 | -1.37E-09 | -2.33E-08 | -1.10E-09 | -7.16E-10 | 4.74E-10 | -4.10E-06 | -6.83E-07 |
| G | 1.96E-10 | 1.39E-10 | 2.29E-08 | 2.94E-10 | -2.88E-10 | -1.20E-10 | -2.51E-11 | 1.66E-11 | 2.15E-07 | 2.75E-08 |
| H | 3.37E-10 | 5.24E-11 | -6.54E-10 | 6.41E-11 | -1.87E-11 | -1.41E-11 | -2.34E-13 | 6.52E-13 | -6.33E-09 | -6.24E-10 |
| J | -5.11E-19 | 2.43E-11 | -2.07E-13 | -8.75E-12 | -4.53E-13 | -1.82E-12 | 1.39E-13 | -3.66E-14 | 8.04E-11 | 6.09E-12 |

FIG. 10

| Y(mm) | d12 | d23 | d34 | d45 | d56 | d67 | d89 | d89 | d910 |
|---|---|---|---|---|---|---|---|---|---|
| 0 | 0.15 | 0.03 | 0.57 | 0.09 | 0.04 | 0.03 | 0.57 | 0.06 | 0.67 |
| 0.1 | 0.15 | 0.03 | 0.57 | 0.09 | 0.04 | 0.03 | 0.57 | 0.06 | 0.67 |
| 0.2 | 0.15 | 0.03 | 0.56 | 0.09 | 0.04 | 0.03 | 0.57 | 0.06 | 0.66 |
| 0.3 | 0.16 | 0.03 | 0.55 | 0.09 | 0.04 | 0.04 | 0.57 | 0.06 | 0.65 |
| 0.4 | 0.16 | 0.04 | 0.54 | 0.09 | 0.04 | 0.05 | 0.56 | 0.07 | 0.64 |
| 0.5 | 0.16 | 0.04 | 0.52 | 0.09 | 0.04 | 0.06 | 0.56 | 0.08 | 0.62 |
| 0.6 | 0.16 | 0.05 | 0.50 | 0.10 | 0.04 | 0.07 | 0.55 | 0.09 | 0.60 |
| 0.7 | 0.16 | 0.05 | 0.48 | 0.10 | 0.04 | 0.09 | 0.54 | 0.09 | 0.58 |
| 0.8 | 0.16 | 0.06 | 0.45 | 0.10 | 0.04 | 0.11 | 0.53 | 0.11 | 0.56 |
| 0.9 | 0.17 | 0.06 | 0.41 | 0.10 | 0.03 | 0.13 | 0.52 | 0.12 | 0.53 |
| 1 | 0.17 | 0.07 | 0.38 | 0.10 | 0.04 | 0.15 | 0.51 | 0.13 | 0.50 |
| 1.1 | 0.18 | 0.08 | 0.33 | 0.10 | 0.04 | 0.18 | 0.50 | 0.14 | 0.47 |
| 1.2 | 0.18 | 0.08 | 0.28 | 0.10 | 0.04 | 0.20 | 0.49 | 0.15 | 0.43 |
| 1.3 | 0.19 | 0.09 | 0.22 | 0.10 | 0.04 | 0.23 | 0.48 | 0.17 | 0.40 |
| 1.4 | 0.19 | 0.09 | 0.16 | 0.10 | 0.04 | 0.27 | 0.46 | 0.18 | 0.36 |
| 1.5 | 0.20 | 0.10 | 0.08 | 0.10 | 0.05 | 0.30 | 0.45 | 0.19 | 0.33 |
| 1.6 | 0.21 | 0.10 | | 0.09 | 0.06 | 0.33 | 0.43 | 0.20 | 0.29 |
| 1.7 | 0.22 | 0.11 | | 0.06 | 0.08 | 0.37 | 0.42 | 0.21 | 0.26 |
| 1.8 | 0.23 | 0.12 | | | 0.10 | 0.40 | 0.40 | 0.22 | 0.22 |
| 1.9 | 0.25 | | | | 0.12 | 0.42 | 0.38 | 0.23 | 0.19 |
| 2 | | | | | | 0.43 | 0.36 | 0.23 | 0.15 |
| 2.1 | | | | | | 0.42 | 0.35 | 0.24 | 0.12 |
| 2.2 | | | | | | | 0.33 | 0.24 | 0.10 |
| 2.3 | | | | | | | 0.32 | 0.25 | 0.07 |
| 2.4 | | | | | | | 0.31 | 0.25 | 0.05 |
| 2.5 | | | | | | | 0.30 | 0.25 | 0.04 |
| 2.6 | | | | | | | 0.30 | 0.25 | 0.03 |
| 2.7 | | | | | | | 0.31 | 0.25 | 0.03 |
| 2.8 | | | | | | | 0.32 | 0.24 | 0.03 |
| 2.9 | | | | | | | | 0.24 | 0.04 |
| 3 | | | | | | | | 0.24 | 0.06 |
| 3.1 | | | | | | | | 0.24 | 0.09 |
| 3.2 | | | | | | | | 0.24 | 0.12 |
| 3.3 | | | | | | | | 0.24 | 0.15 |
| 3.4 | | | | | | | | 0.25 | 0.20 |
| 3.5 | | | | | | | | 0.26 | 0.24 |
| 3.6 | | | | | | | | | 0.29 |
| 3.7 | | | | | | | | | 0.33 |
| 3.8 | | | | | | | | | 0.38 |
| 3.9 | | | | | | | | | 0.42 |
| 4 | | | | | | | | | |

FIG. 11

| | L1 | | L2 | | L3 | | L4 | | L5 | |
|---|---|---|---|---|---|---|---|---|---|---|
| | S1 | S2 | S1 | S2 | S1 | S2 | S1 | S2 | S1 | S2 |
| R | 2.689396 | 10.76162 | 8.061396 | 16.4513 | 5.825975 | 3.590955 | -8.83062 | -6.02576 | -7.76417 | -6.78587 |
| K | -0.11828 | -4.79529 | -4.22121 | -8.86169 | -18.9893 | 0.061936 | 8.605143 | 9.416757 | 18.39949 | 5.570371 |
| A | 0.000514 | -0.00255 | 0.000518 | -0.00084 | -0.00937 | -0.01783 | -0.00456 | -0.0102 | -0.01848 | -0.0035 |
| B | 0.000172 | 0.000537 | -0.00018 | -0.00073 | 0.000636 | 0.003725 | -0.00484 | -0.00251 | -0.0012 | -0.00256 |
| C | -1.06E-05 | 2.52E-06 | 0.000182 | 2.36E-04 | 0.000543 | -2.22E-04 | -1.68E-05 | 4.78E-04 | 0.00046 | -0.00017 |
| D | 2.89E-06 | -4.25E-06 | 3.57E-06 | 2.67E-05 | 2.51E-06 | 1.18E-04 | 0.000105 | 8.73E-05 | -9.22E-05 | -4.23E-05 |
| E | 4.52E-07 | 6.25E-07 | 1.17E-06 | 1.65E-06 | -1.21E-05 | -8.89E-13 | 5.75E-11 | -3.52E-11 | -1.21E-11 | -1.39E-05 |
| F | -1.31E-07 | 9.52E-08 | 8.80E-07 | -1.55E-06 | 6.42E-12 | -3.64E-13 | 4.72E-13 | -6.42E-14 | -1.09E-12 | 5.05E-12 |
| G | -1.13E-08 | 3.25E-10 | 1.93E-16 | 6.06E-17 | -1.32E-17 | 1.05E-16 | 3.97E-17 | 8.87E-17 | 8.07E-17 | 1.10E-16 |
| H | -2.45E-09 | -9.11E-18 | 6.17E-18 | 2.25E-18 | 1.57E-18 | 3.92E-18 | 2.54E-18 | 3.83E-18 | 3.56E-18 | 4.84E-18 |
| J | 6.57E-19 | -3.34E-19 | 2.94E-19 | 2.35E-19 | 1.67E-19 | 2.38E-19 | 1.96E-19 | 2.32E-19 | 2.21E-19 | 2.57E-19 |
| | L6 | | L7 | | L8 | | L9 | | L10 | |
| | S1 | S2 | S1 | S2 | S1 | S2 | S1 | S2 | S1 | S2 |
| R | -6.71986 | -8.1687 | 8.316878 | 5.998979 | 53.59693 | -4.16687 | -14.8974 | -28.2367 | -2.33305 | -100 |
| K | 10.61185 | 10.42016 | -70.9109 | -35.8825 | -95 | -6.4057 | 13.92366 | 49.4442 | -2.63497 | -91.1814 |
| A | -0.00338 | -0.01519 | -0.00711 | -0.00485 | -0.00716 | 0.002614 | -0.00213 | -0.00546 | 0.00473 | -0.00252 |
| B | -6.96E-05 | 3.35E-05 | -0.00081 | 1.31E-05 | -0.00045 | 6.25E-05 | 0.000249 | 0.000188 | -0.00224 | -0.00013 |
| C | -7.40E-05 | 0.000282 | -7.69E-05 | -4.36E-05 | 6.77E-05 | -9.43E-06 | 3.41E-06 | 1.74E-06 | 0.000481 | 9.73E-06 |
| D | -6.63E-06 | 1.70E-05 | -1.29E-05 | 1.84E-06 | 2.01E-06 | 1.61E-07 | 1.13E-07 | -1.17E-07 | -3.78E-05 | 2.46E-07 |
| E | 5.03E-06 | 2.82E-06 | -5.43E-07 | 9.36E-08 | 7.24E-08 | 9.35E-09 | -3.18E-09 | -1.86E-09 | 8.61E-07 | -9.73E-09 |
| F | -1.95E-12 | 3.49E-07 | 1.33E-07 | -2.51E-10 | -1.94E-08 | 1.67E-10 | -5.14E-10 | 4.59E-10 | 2.64E-08 | -2.63E-10 |
| G | -5.68E-17 | 9.95E-16 | 9.80E-09 | 2.66E-10 | -2.02E-11 | 1.50E-11 | -1.47E-11 | 1.25E-11 | -9.23E-11 | 4.65E-12 |
| H | 6.39E-19 | 3.58E-17 | -1.22E-10 | 3.89E-11 | -3.80E-12 | -9.23E-13 | 1.39E-13 | 7.35E-13 | -1.05E-10 | 3.41E-14 |
| J | 1.40E-19 | 8.50E-19 | -5.05E-20 | -6.89E-13 | -6.56E-13 | -4.14E-13 | 1.29E-13 | 7.78E-15 | 2.81E-12 | -1.52E-14 |

FIG. 17

| Y(mm) | d12 | d23 | d34 | d45 | d56 | d67 | d89 | d89 | d910 |
|---|---|---|---|---|---|---|---|---|---|
| 0 | 0.15 | 0.03 | 0.42 | 0.10 | 0.05 | 0.19 | 0.51 | 0.07 | 0.65 |
| 0.1 | 0.15 | 0.03 | 0.42 | 0.10 | 0.05 | 0.20 | 0.51 | 0.07 | 0.64 |
| 0.2 | 0.15 | 0.03 | 0.41 | 0.10 | 0.05 | 0.20 | 0.50 | 0.07 | 0.64 |
| 0.3 | 0.15 | 0.03 | 0.40 | 0.10 | 0.05 | 0.21 | 0.50 | 0.08 | 0.63 |
| 0.4 | 0.15 | 0.04 | 0.38 | 0.10 | 0.05 | 0.22 | 0.49 | 0.08 | 0.61 |
| 0.5 | 0.15 | 0.04 | 0.36 | 0.10 | 0.05 | 0.24 | 0.48 | 0.09 | 0.59 |
| 0.6 | 0.15 | 0.05 | 0.33 | 0.10 | 0.05 | 0.26 | 0.47 | 0.10 | 0.57 |
| 0.7 | 0.16 | 0.05 | 0.30 | 0.10 | 0.05 | 0.28 | 0.45 | 0.12 | 0.55 |
| 0.8 | 0.16 | 0.06 | 0.27 | 0.10 | 0.05 | 0.30 | 0.44 | 0.13 | 0.52 |
| 0.9 | 0.16 | 0.06 | 0.22 | 0.10 | 0.05 | 0.33 | 0.42 | 0.15 | 0.49 |
| 1 | 0.17 | 0.07 | 0.17 | 0.10 | 0.06 | 0.36 | 0.40 | 0.16 | 0.46 |
| 1.1 | 0.17 | 0.08 | 0.12 | 0.10 | 0.06 | 0.39 | 0.38 | 0.18 | 0.42 |
| 1.2 | 0.18 | 0.08 | 0.05 | 0.10 | 0.06 | 0.43 | 0.36 | 0.20 | 0.39 |
| 1.3 | 0.19 | 0.09 | 0.22 | 0.09 | 0.07 | 0.47 | 0.34 | 0.21 | 0.35 |
| 1.4 | 0.20 | 0.11 | | 0.06 | 0.08 | 0.51 | 0.31 | 0.23 | 0.32 |
| 1.5 | 0.21 | | | | 0.09 | 0.55 | 0.29 | 0.24 | 0.28 |
| 1.6 | | | | | 0.11 | 0.58 | 0.27 | 0.26 | 0.25 |
| 1.7 | | | | | | 0.61 | 0.24 | 0.27 | 0.21 |
| 1.8 | | | | | | 0.62 | 0.22 | 0.28 | 0.18 |
| 1.9 | | | | | | | 0.20 | 0.29 | 0.14 |
| 2 | | | | | | | 0.18 | 0.30 | 0.11 |
| 2.1 | | | | | | | 0.16 | 0.30 | 0.09 |
| 2.2 | | | | | | | 0.15 | 0.31 | 0.07 |
| 2.3 | | | | | | | 0.15 | 0.31 | 0.05 |
| 2.4 | | | | | | | 0.16 | 0.31 | 0.04 |
| 2.5 | | | | | | | 0.18 | 0.30 | 0.03 |
| 2.6 | | | | | | | 0.22 | 0.29 | 0.03 |
| 2.7 | | | | | | | | 0.28 | 0.04 |
| 2.8 | | | | | | | | 0.27 | 0.05 |
| 2.9 | | | | | | | | 0.26 | 0.07 |
| 3 | | | | | | | | 0.24 | 0.09 |
| 3.1 | | | | | | | | | 0.13 |
| 3.2 | | | | | | | | | 0.16 |
| 3.3 | | | | | | | | | 0.20 |
| 3.4 | | | | | | | | | 0.25 |
| 3.5 | | | | | | | | | 0.29 |
| 3.6 | | | | | | | | | 0.35 |
| 3.7 | | | | | | | | | 0.41 |
| 3.8 | | | | | | | | | |

FIG. 18

| | L1 | | L2 | | L3 | | L4 | | L5 | |
|---|---|---|---|---|---|---|---|---|---|---|
| | S1 | S2 | S1 | S2 | S1 | S2 | S1 | S2 | S1 | S2 |
| R | 2.262307 | 4.591721 | 3.85122 | 12.24185 | 5.289184 | 3.178509 | -6.41217 | -5.13072 | -6.35714 | -6.22664 |
| K | -0.11207 | -12.1102 | -8.1024 | -32.4651 | -18.5854 | -0.2301 | 11.15915 | 10.32198 | 18.39791 | 8.995529 |
| A | 0.000227 | -0.00331 | -0.00071 | -0.00121 | -0.00899 | -0.02018 | -0.00765 | -0.00912 | -0.01789 | -0.00857 |
| B | 0.00045 | 0.000785 | 0.000117 | -0.00058 | 0.001712 | 0.006438 | -0.00394 | -0.00043 | -0.00286 | -0.00259 |
| C | 3.51E-05 | 6.83E-05 | 0.000496 | 1.74E-04 | 0.001224 | 4.17E-04 | -8.73E-04 | 6.81E-04 | 0.000849 | -0.00048 |
| D | -3.50E-06 | 2.63E-05 | 8.04E-05 | 4.61E-05 | 1.37E-04 | 3.40E-04 | 0.000577 | 2.47E-04 | -0.00019 | -8.02E-05 |
| E | -4.08E-06 | 1.20E-05 | 2.08E-05 | 2.39E-05 | -4.80E-05 | -3.54E-12 | 5.72E-11 | -3.14E-05 | 7.06E-06 | -5.65E-07 |
| F | -1.47E-06 | 2.16E-08 | 5.08E-07 | -2.32E-06 | 6.37E-12 | -5.99E-13 | 2.81E-13 | -2.26E-13 | -1.37E-12 | 3.02E-06 |
| G | 9.09E-08 | -1.27E-06 | -1.63E-14 | -3.27E-14 | -2.21E-14 | -2.80E-14 | -2.67E-14 | -2.66E-14 | -2.83E-14 | -4.18E-15 |
| H | 2.84E-09 | -3.30E-15 | -3.17E-15 | -3.64E-15 | -3.35E-15 | -3.47E-15 | -3.49E-15 | -3.43E-15 | -3.53E-15 | -2.50E-15 |
| J | -5.57E-16 | -4.26E-16 | -4.40E-16 | -4.49E-16 | -4.45E-16 | -4.49E-16 | -4.49E-16 | -4.41E-16 | -4.50E-16 | -4.35E-16 |
| | L6 | | L7 | | L8 | | L9 | | L10 | |
| | S1 | S2 | S1 | S2 | S1 | S2 | S1 | S2 | S1 | S2 |
| R | -6.08471 | -7.4913 | 4.531813 | 4.152294 | -56.1346 | -4.00145 | -44.452 | -24.9778 | -2.07193 | -62.8908 |
| K | 11.17523 | 10.49202 | -23.7751 | -19.2249 | 69.30417 | -6.01003 | 57.71649 | 18.76743 | -3.33332 | 95 |
| A | -0.00259 | -0.02053 | -0.01214 | -0.00919 | -0.01146 | 0.003679 | -0.00496 | -0.00489 | 0.005321 | 0.001512 |
| B | -0.00105 | 1.12E-05 | -0.00156 | -0.00026 | -0.00029 | 5.55E-05 | 2.71E-04 | 0.000206 | -0.00404 | -0.00254 |
| C | -3.78E-05 | 0.000431 | -5.14E-05 | -5.44E-05 | 8.75E-05 | -9.29E-06 | 5.74E-06 | -7.90E-07 | 0.001189 | 0.000532 |
| D | 5.81E-06 | 6.27E-05 | -1.76E-05 | 2.32E-06 | 3.99E-06 | 2.95E-07 | 1.74E-07 | -1.55E-08 | -0.00014 | -6.45E-05 |
| E | 1.23E-05 | 1.04E-05 | -2.95E-06 | 2.03E-07 | 2.58E-07 | 2.21E-08 | -4.32E-09 | 5.97E-09 | 7.14E-06 | 4.46E-06 |
| F | 5.28E-06 | 1.88E-06 | -6.88E-08 | 5.63E-09 | -4.84E-09 | 1.03E-09 | -8.19E-10 | 5.67E-10 | 3.64E-08 | -1.10E-07 |
| G | -5.66E-14 | 4.33E-07 | 7.45E-08 | 1.49E-10 | 6.28E-10 | 6.61E-11 | -4.72E-11 | -2.80E-12 | -2.13E-08 | -4.80E-09 |
| H | -4.82E-15 | 1.73E-07 | 2.65E-08 | -1.01E-10 | -1.51E-10 | 4.54E-12 | -2.78E-12 | -1.52E-12 | 9.28E-10 | 3.58E-10 |
| J | -4.72E-16 | 2.03E-16 | 2.90E-09 | -2.18E-11 | -4.75E-11 | -3.34E-13 | -1.31E-13 | -2.14E-13 | -1.35E-11 | -6.27E-12 |

OPTICAL SYSTEM AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2022/017806, filed Nov. 11, 2022, which claims priority to Korean Patent Application No. 10-2021-0155135, filed Nov. 11, 2021, whose entire disclosures are hereby incorporated by reference.

TECHNICAL FIELD

An embodiment relates to an optical system for improved optical performance and a camera module including the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or prevent image stabilization due to an unstable fixing device or a camera movement caused by a user's movement.

The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted.

When the optical system includes a plurality of lenses, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. In addition, the size of the image sensor is increasing to realize high-resolution and high-definition. However, when the size of the image sensor increases, TTL (Total Track Length) of the optical system including the plurality of lenses also increases, thereby increasing the thickness of the camera and the mobile terminal including the optical system. Therefore, a new optical system capable of solving the above problems is required.

DISCLOSURE

Technical Problem

An embodiment of the invention provides an optical system with improved optical properties. The embodiment provides an optical system having excellent optical performance at the center portion and periphery portion of a field of view. The embodiment provides an optical system capable of having a slim structure.

Technical Solution

An optical system according to an embodiment of the invention includes first to tenth lenses disposed along an optical axis in a direction from an object side to a sensor side, wherein the first lens has positive (+) refractive power on the optical axis, and the tenth lens has negative (−) refractive power on the optical axis, an object-side surface of the first lens has a convex shape on the optical axis, a sensor-side surface of the third lens has a smallest effective diameter among the first to tenth lenses, a sensor-side surface of the tenth lens has a maximum effective diameter among the first to tenth lenses, the sensor-side surface of the tenth lens is provided without a critical point from the optical axis to an end of an effective region, a distance from a center of the sensor-side surface of the tenth lens to a first point where a slope of a straight line passing through the sensor-side surface is less than −1 is 10% or more of an effective radius, and satisfies the following equation: $0.4<TTL/ImgH<2.5$ (TTL (Total track length) is a distance in the optical axis from an apex of the object-side surface of the first lens to an image surface of an image sensor, and ImgH is ½ of a maximum diagonal length of the image sensor.).

According to an embodiment of the invention, each of an object-side surface and a sensor-side surface of the seventh lens among the first to tenth lenses has at least one critical point, and a sensor-side surface of the eighth lens disposed between the seventh lens and the ninth lens may be provided without a critical point from the optical axis to an end of an effective region. A sensor-side surface of the ninth lens disposed between the eighth lens and the tenth lens may be provided without a critical point on from the optical axis to an end of an effective region.

According to an embodiment of the invention, a distance from the center of the sensor-side surface of the tenth lens to the first point may be in a range of 10% to 30% or 40% to 55% of the effective radius. The distance from the center of the sensor-side surface of the tenth lens to a second point where the slope of the straight line is less than −2 may be located at 35% or more or 55% or more of the effective radius.

According to an embodiment of the invention, the following equation satisfies: $1<L1\_CT/L1\_ET<5$ (L1_CT is a thickness of the first lens in the optical axis, and L1_ET is a thickness between ends of effective region of the object-side and sensor-side surfaces of the first lens.). The following equation satisfies: $1.5<n1<1.6$ and $1.5<n10<1.6$ (n1 is a refractive index of the first lens, and n10 is a refractive index of the tenth lens.).

According to an embodiment of the invention, the effective diameters of the third lens and an object-side surface of the tenth lens satisfy the following equation: $2\leq CA\_L10S1/AVR\_CA\_L3\leq 4$ (CA_L10S1 is the effective diameter (mm) of the object-side surface of the tenth lens, and AVR_CA_L3 is an average value of effective diameters of object-side and sensor-side surfaces of the third lens.). The effective diameter of the third lens and the sensor-side surface of the tenth lens satisfies the following equation: 2≤CA_L10S2/AVR_CA_L3<5 (CA_L10S2 is the effective diameter (mm) of the sensor-side surface of the tenth lens, and AVR_CA_L3 is the average value of the effective diameters of the object-side and sensor-side surfaces of the third lens.).

According to an embodiment of the invention, the thicknesses of the first and tenth lenses satisfies the following equation: 1<L1_CT/L10_CT<5 (L1_CT is the thickness of the first lens in the optical axis, and L10_CT is the thickness of the tenth in the optical axis.). The maximum Sag value of the sensor-side surface of the tenth lens may be the center of the sensor-side surface.

An optical system according to an embodiment of the invention includes a first lens group having three or less lenses on an object side; and a second lens group having seven or less lenses on a sensor side of the first lens group, wherein the first lens group has a positive (+) refractive power on the optical axis, the second lens group has a negative (−) refractive power on the optical axis, a number of lenses of the second lens group is twice or more a number of lenses of the first lens group, a sensor-side surface closest to the second lens group among the lens surfaces of the first lens group has the minimum effective diameter, a sensor-side surface closest to an image sensor among the lens surfaces of the second lens group has the maximum effective diameter, the sensor-side surface closest to the image sensor among the lens surfaces of the second lens group has the minimum distance between a center of the sensor-side surface and the image sensor, and the distance gradually increases toward an end of the effective region of the sensor-side surface, satisfying the following equations:

$$0.4 < TTL/ImgH < 3$$

$$0.5 < TD/\text{CA\_Max} < 1.5$$

(TTL (Total track length) is a distance in the optical axis from the apex of the object-side surface of the first lens to the image surface of the image sensor, ImgH is ½ of the maximum diagonal length of the sensor, TD is a maximum distance (mm) in the optical axis from the object-side surface of the first lens group to the sensor-side surface of the second lens group, and CA_Max is a maximum effective diameter of effective diameters of object-side and sensor-side surfaces of the first to tenth lenses.).

According to an embodiment of the invention, an absolute value of a focal length of each of the first and second lens groups may be larger for the second lens group than for the first lens group. The sensor-side surface of the first lens group closest to the second lens group among the lens surfaces of the first and second lens groups has a minimum effective diameter, and the sensor-side surface of the second lens group closet to the image sensor among the lens surfaces of the first and second lens groups may have a maximum effective diameter.

According to an embodiment of the invention, the first lens group includes first to third lenses disposed along the optical axis from the object side toward a sensor side, and the second lens group includes fourth to tenth lenses disposed along the optical axis from the object side toward the sensor side, wherein a sensor-side surface of the third lens may have a minimum effective diameter, and a sensor-side surface of the tenth lens may have a maximum effective diameter, each of object-side and sensor-side surfaces of the seventh lens among the first to tenth lenses has at least one critical point, and a sensor-side surfaces of the eighth lens disposed between the seventh lens and the ninth lens may be provided without critical point from the optical axis to an end of the effective region, and a sensor-side surfaces of the ninth lens disposed between the eighth lens and the tenth lens may be provided without a critical point from the optical axis to an end of an effective region.

According to an embodiment of the invention, the sensor-side surface closest to the image sensor among the lens surfaces of the second lens group is provided without a critical point from the optical axis to an end of an effective region, and a distance from the optical axis to a first point where a slope of a straight line passing through the sensor-side surface is less than 1 may be 10% or more of the effective radius. The distance from a center of the sensor-side surface closest to the image sensor to the first point may be in a range of 10% to 30% or 40% to 55% of the effective radius. The distance from the center of the sensor-side surface closest to the image sensor to a second point where the slope of the straight line has an absolute value of less than 2 may be located at 35% or more or 55% or more of the effective radius.

An optical system according to an embodiment of the invention includes first to tenth lenses disposed along an optical axis from an object side toward a sensor side, the first lens has positive refractive power on the optical axis, and the tenth lens has negative refractive power on the optical axis, a sensor-side surface of the third lens has a concave shape on the optical axis, an object-side surface of the fourth lens has a concave shape on the optical axis, an object-side surface of the fourth lens has a concave shape on the optical axis, at least one of object-side and sensor-side surfaces of the eight lens has a critical point, a sensor-side surface of the ninth lens is provided without a critical point from the optical axis to an end of an effective region, a sensor-side surface of the tenth lens may be provided without from the optical axis to an end of an effective region, the sensor-side surface of the third lens has a smallest effective diameter among the first to tenth lenses, the sensor-side surface of the tenth lens has a largest effective diameter among the first to tenth lenses, and satisfies the following equation: 1<CA_Max/CA_min<5 (CA_Max is the largest effective diameter among the effective diameters of the object-side surfaces and the sensor-side surfaces of the first to tenth lenses, and CA_Min is the smallest effective diameter among the effective diameters of the object-side surfaces and the sensor-side surfaces of the first to tenth lenses.).

According to an embodiment of the invention, the sensor-side surface of the tenth lens may have a minimum distance from a center to the image sensor.

A camera module according to an embodiment of the invention includes an image sensor; and a filter between the image sensor and a last lens of an optical system, wherein the optical system includes an optical system disclosed above, and satisfies the following equation: 1≤F/EPD<5 (F is a total focal length of the optical system, and EPD is an entrance pupil diameter of the optical system.).

Advantageous Effects

The optical system and the camera module according to the embodiment may have improved optical properties. In detail, the optical system may have improved resolution as a plurality of lenses have a set shape, focal length, and the like. The optical system and the camera module according to the embodiment may have improved distortion and aberration characteristics, and may have good optical performance at the center portion and periphery portion of the field of view (FOV). The optical system according to the embodiment may have improved optical characteristics and a small total track length (TTL), so that the optical system and a camera module including the same may be provided in a slim and compact structure.

DESCRIPTION OF DRAWINGS

FIG. 3 is a diagram showing data of distances between two adjacent lenses in the optical system of FIG. 1.

FIG. 4 is a diagram showing data of an aspheric coefficient of each lens surface in the optical system of FIG. 1.

FIG. 10 is a diagram showing data of distances between two adjacent lenses in the optical system of FIG. 8.

FIG. 11 is a diagram showing data of an aspheric coefficient of each lens surface in the optical system of FIG. 8.

FIG. 17 is a diagram showing data of distances between two adjacent lenses in the optical system of FIG. 15.

FIG. 18 is a diagram showing data of an aspheric coefficient of each lens surface in the optical system of FIG. 15.

BEST MODE

Figure 1:
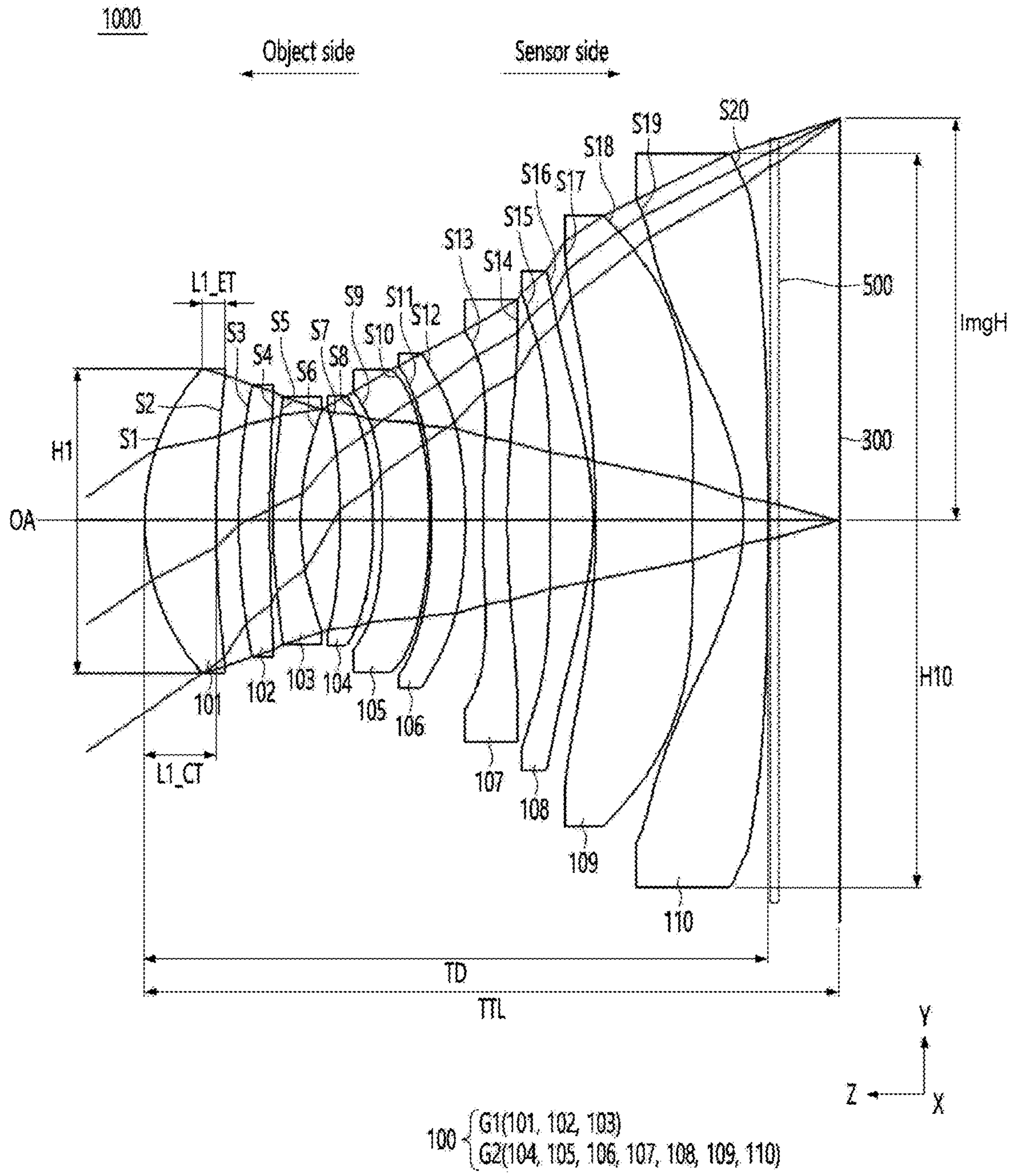
FIG. 1 is a configuration diagram of an optical system according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In the description of the invention, "object-side surface" may refer to a surface of the lens facing the object-side surface with respect to the optical axis, and "sensor-side surface" may refer to a surface of the lens facing the imaging surface (image sensor) with respect to the optical axis. A convex surface of the lens may mean that the lens surface on the optical axis has a convex shape, and a concave surface of the lens may mean that the lens surface on the optical axis has a concave shape. The radius of curvature, center thickness, and distance between lenses described in the table for lens data may mean values on the optical axis. The vertical direction may mean a direction perpendicular to the optical axis, and an end of the lens or the lens surface may mean the end or edge of the effective region of the lens through which the incident light passes. A size of the effective diameter of the lens surface may have a measurement error of up to ±0.4 mm depending on the measurement method. A paraxial region refers to a very narrow region near the optical axis, and is a region where the distance at which light rays fall from the optical axis OA is almost zero. Hereinafter, the concave or convex shape of the lens surface is described along the optical axis, and may also include the paraxial region.

Figure 8:
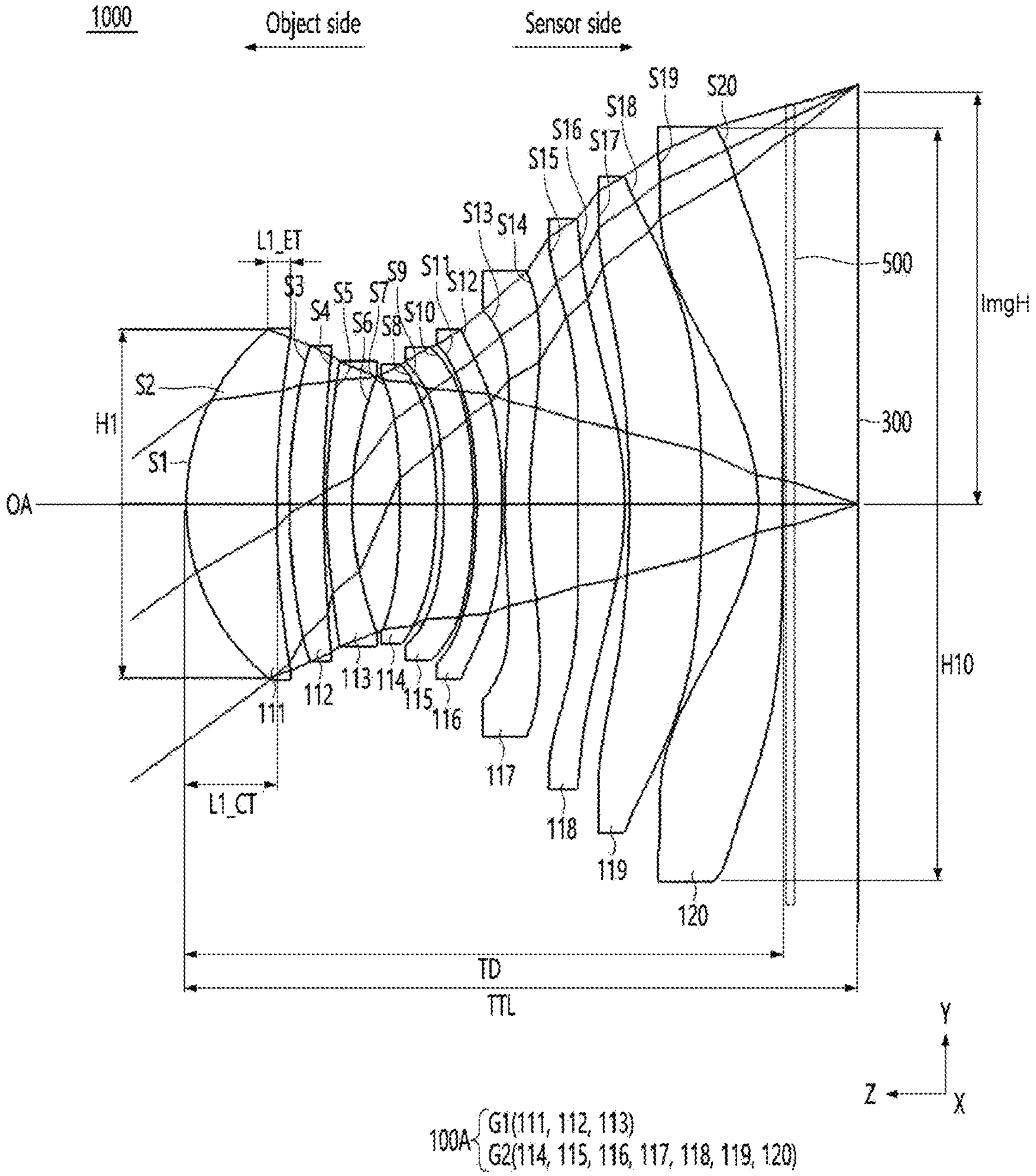
FIG. 8 is a configuration diagram of an optical system according to a second embodiment.
Figure 15:
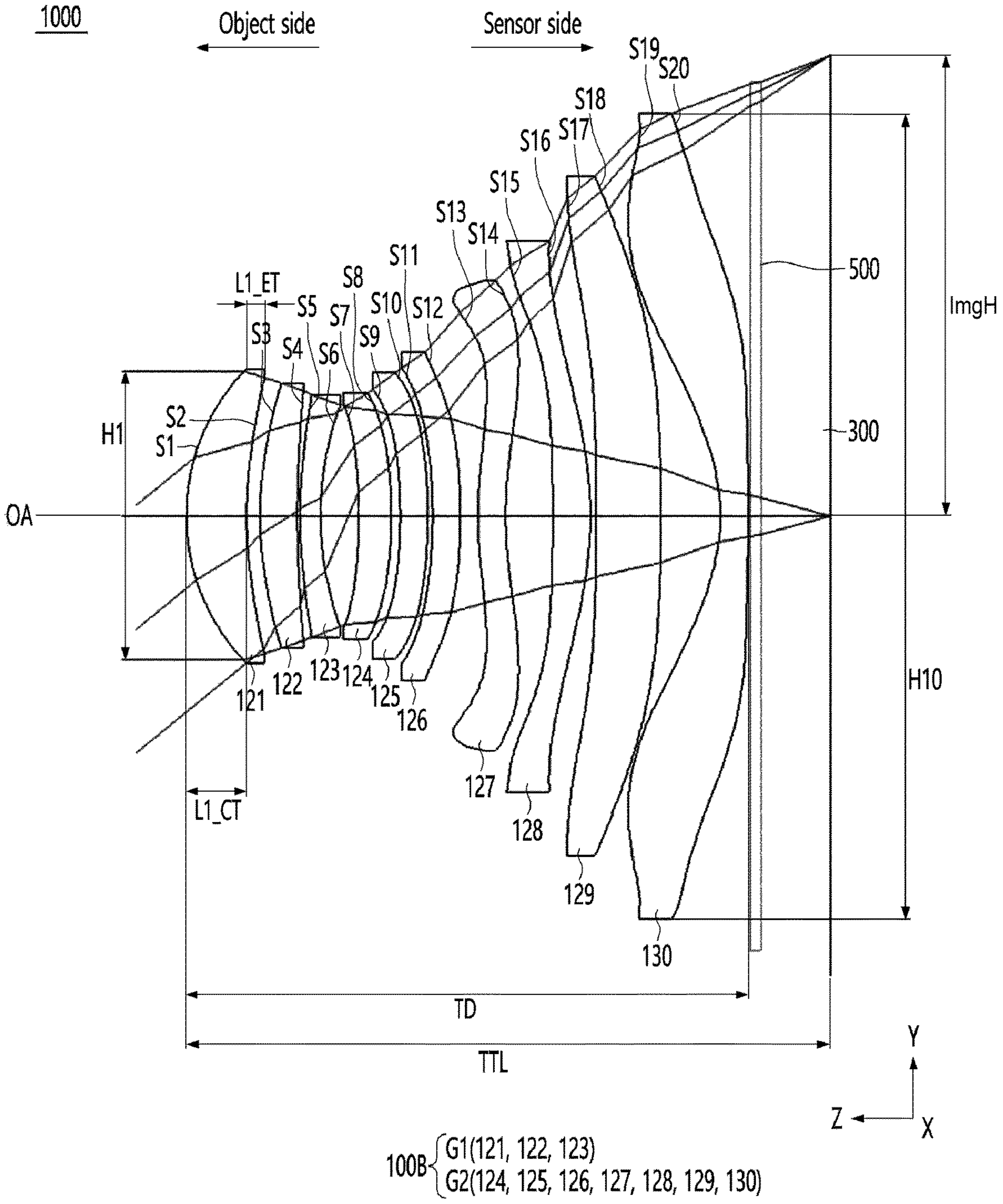
FIG. 15 is a configuration diagram of an optical system according to a third embodiment.

As shown in FIGS. 1, 8, and 15, the optical system 1000 according to the first to third embodiments of the invention may include a plurality of lens groups. In detail, each of the plurality of lens groups includes at least one lens. For example, the optical system 1000 may include a first lens group G1 and a second lens group G2 sequentially arranged along the optical axis OA from the object-side toward the image sensor 300.

The first lens group G1 may include at least one lens. The first lens group G1 may include three or less lenses. For example, the first lens group G1 may include three lenses. The second lens group G2 may include at least one lens. The second lens group G2 may include more lenses than that of the first lens group G1, for example, twice or more. The second lens group G2 may include 7 or less lenses. The number of lenses of the second lens group G2 may have a difference of 5 or more and 7 or less than the number of lenses of the first lens group G1. For example, the second lens group G2 may include 7 lenses.

The optical system 1000 may be provided in a structure where a sensor-side surface of the last lens, that is, the n-th lens, has no critical point. Here, n may be 8 to 10, and is preferably 10. By removing the critical point on the sensor-side surface of the last n-th lens, a thickness of the n-th lens may be provided thinly, and a distance (i.e., BFL) between the sensor-side surface of the n-th lens and the image sensor may be reduced. Accordingly, a slim optical system and a camera module having the same may be provided. The total number of lenses in the first and second lens groups G1 and G2 is 8 or more.

The first lens group G1 may have positive (+) refractive power. The second lens group G2 may have a negative refractive power different from that of the first lens group G1. The first lens group G1 and the second lens group G2 may have different focal lengths. Since the first lens group G1 and the second lens group G2 have opposite refractive powers, the focal length f_G2 of the second lens group G2 has a negative sign, and the focal length f_G1 of the first lens group G1 may have a positive (+) sign.

When expressed as an absolute value, the focal length of the first lens group G1 may be greater than the focal length of the second lens group G2. For example, the absolute value of the focal length f_G1 of the first lens group G1 may be 1.4 times or more, for example, in a range of 1.4 to 2.2 times the absolute value of the focal length f_G2 of the second lens group G2. Accordingly, the optical system 1000 according to the embodiment may have improved aberration control characteristics such as chromatic aberration and distortion aberration by controlling the refractive power and focal length of each lens group, and may have good optical performance in the center and periphery portions of the field of view (FOV).

On the optical axis, the first lens group G1 and the second lens group G2 may have a set distance. The distance between the first lens group G1 and the second lens group G2 on the optical axis is an optical axis distance, and may be an optical axis distance between a sensor-side surface of a lens closest to the sensor side among the lenses in the first lens group G1 and an object-side surface of a lens closest to the object side among the lenses in the second lens group G2. The optical axis distance between the first lens group G1 and the second lens group G2 is greater than the center thickness of the last of the lenses of the first lens group G1 and a first of the lenses of the second lens group G2, and may be 35% or less than the optical axis distance of the first lens group G1, for example, in a range of 18% to 35%. The optical axis distance between the first lens group G1 and the second lens group G2 may be smaller than the center thickness of the thickest lens among the lenses of the first lens group G1. Here, the optical axis distance of the first lens group G1 is an optical axis distance between the object-side surface of the lens closest to the object side in the first lens group G1 and the sensor-side surface of the lens closest to the sensor side.

The optical axis distance between the first lens group G1 and the second lens group G2 may be 15% or less of the optical axis distance of the second lens group G2, for example, in the range of 3% to 15%. The optical axis distance of the second lens group G2 is an optical axis distance between the object-side surface of the lens closest to the object side in the second lens group G2 and the sensor-side surface of the lens closest to the sensor side. Accordingly, the optical system 1000 may have good optical performance not only in the center portion of the FOV but also in the periphery portion, and may improve chromatic aberration and distortion aberration.

The optical system 1000 may include a first lens group G1 and a second lens group G2 sequentially arranged in the direction from the object side to the image sensor 300. The optical system 1000 may include 10 or less lenses. The first lens group G1 refracts the light incident through the object side to collect it, and the second lens group G2 may refract the light emitted through the first lens group G1 so that it may spread to the periphery of the image sensor 300.

In the first lens group G1, the number of lenses with positive (+) refractive power may be greater than the number of lenses with negative (−) refractive power. In the second lens group G2, the number of lenses with positive (+) refractive power may be smaller than the number of lenses with negative (−) refractive power.

The distance between the sensor-side surface (e.g., S6) of the first lens group G1 and the object-side surface (e.g., S7) of the second lens group G2 facing each other may gradually increase from the optical axis OA toward an edge. Among the distances between the lenses of the first and second lens groups G1 and G2, a distance in the optical axis OA between the first and second lens groups G1 and G2 may have the second largest distance in the optical system 1000, and the largest distance may be a distance between the last two lenses of the second lens group G2.

The sum of the convex surface on the object side and the concave surface on the sensor side on the optical axis OA or paraxial region of each lens of the first lens group G1 may be 60% or more of the lens surfaces of the first lens group G1. The sum of the concave surfaces on the object side and the convex surfaces on the sensor side in the optical axis OA or paraxial region of each lens of the second lens group G2 may be 50% or more among the lens surfaces of the second lens group G2.

The object-side surface and sensor-side surface of all lenses of the first lens group G1 may be provided without critical points. Among the lenses of the second lens group G1, the sensor-side surface of the lens closest to the image sensor 300 may be provided without a critical point. Hereinafter, the optical system according to the embodiment will be described in detail.

Each of the plurality of lenses 100, 100A, and 100B may include an effective region and a non-effective region. The effective region may be a region through which light incident on each of the lenses 100, 100A, and 100B passes. That is, the effective region may be an effective region in which the incident light is refracted to implement optical characteristics. The non-effective region may be arranged around the effective region. The non-effective region may be a region where effective light does not enter the plurality of lenses 100, 100A, and 100B. That is, the non-effective region may be a region unrelated to the optical characteristics. Additionally, the end of the non-effective region may be a region fixed to a barrel (not shown) accommodating the lens.

The optical system 1000 may include an image sensor 300. The image sensor 300 may detect light and convert it into an electrical signal. The image sensor 300 may detect light that sequentially passes through the plurality of lenses 100, 100A, and 100B. The image sensor 300 may include an element capable of detecting incident light, such as a charge coupled device (CCD) or a complementary metal oxide semiconductor (CMOS).

The optical system 1000 may include a filter 500. The filter 500 may be disposed between the second lens group G2 and the image sensor 300. The filter 500 may be disposed between the image sensor 300 and a lens closest to the image sensor among the plurality of lenses 100, 100A, and 100B. For example, when the optical systems 100, 100A, and 100B have ten lenses, the filter 500 may be disposed between the tenth lens 110 and the image sensor 300.

The filter 500 may include at least one of an infrared filter or an optical filter of a cover glass. The filter 500 may pass light in a set wavelength band and filter light in a different wavelength band. When the filter 500 includes an infrared filter, radiant heat emitted from external light may be blocked from being transmitted to the image sensor 300. Additionally, the filter 500 may transmit visible light and reflect infrared rays.

The optical system 1000 according to the embodiment may include an aperture stop (not shown). The aperture stop may control the amount of light incident on the optical system 1000. The aperture stop may be placed at a set position. For example, the aperture stop may be disposed around the object-side surface of the lens or the sensor-side surface of the lens closest to the object side. The aperture stop may be disposed between two adjacent lenses among the lenses in the first lens group G1. For example, the aperture stop may be located between the two lenses closest to the object. Alternatively, at least one lens selected from among the plurality of lenses 100, 100A, and 100B may function as an aperture stop. In detail, the object-side surface or the sensor-side surface of one lens selected from among the lenses of the first lens group G1 may function as an aperture stop to adjust the amount of light.

First Embodiment

Figure 2:
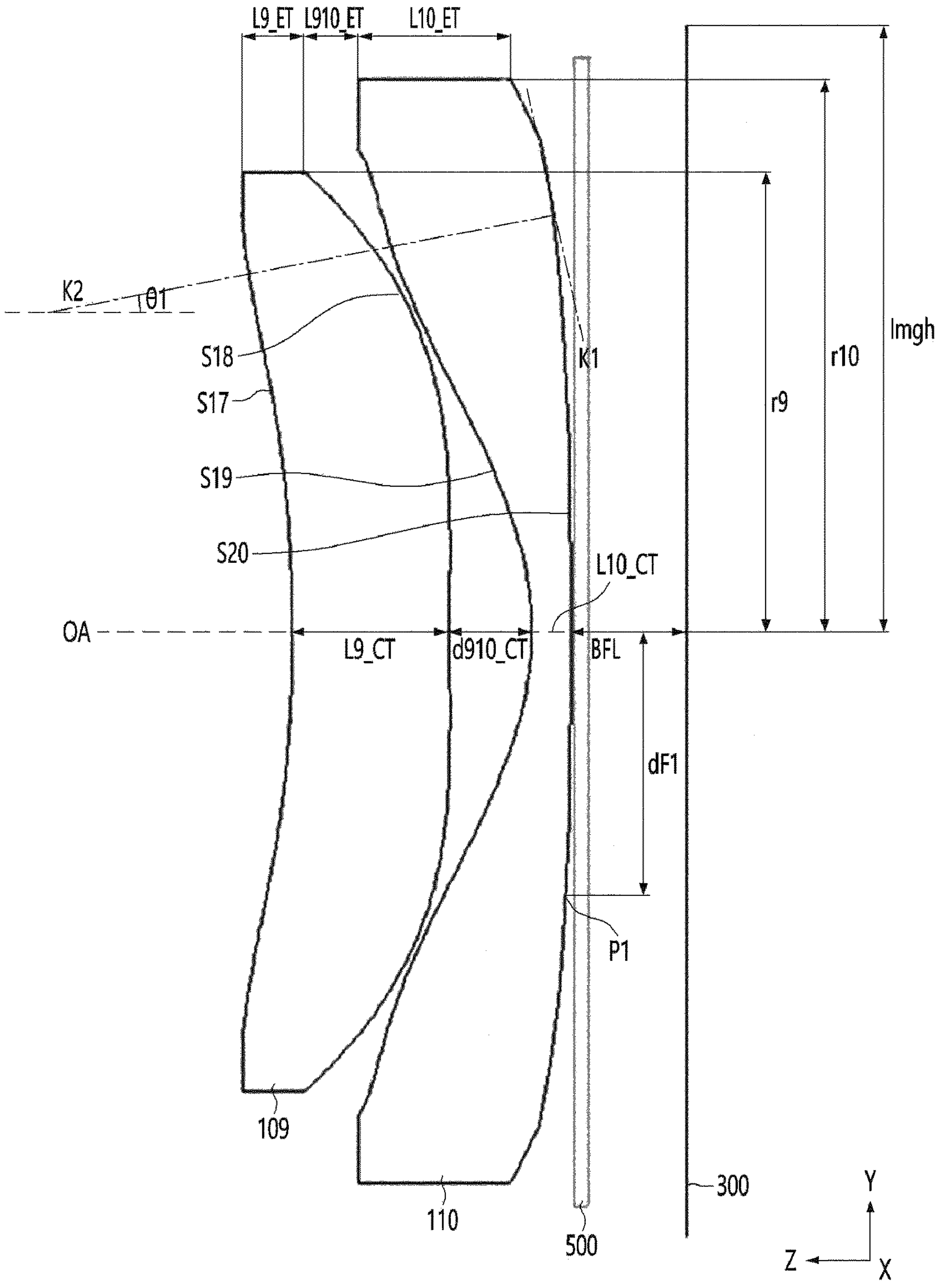
FIG. 2 is an explanatory diagram showing a relationship between an image sensor, an n-th lens, and an n−1-th lens in the optical system of FIG. 1.
Figure 5:
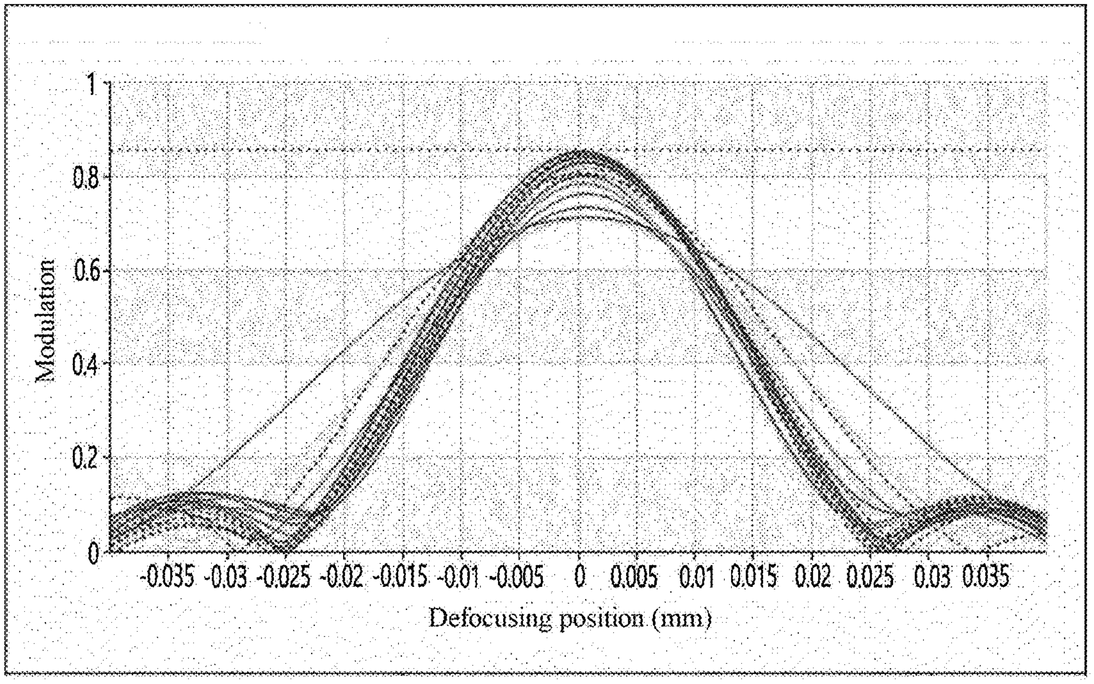
FIG. 5 is a graph of the diffraction MTF of the optical system of FIG. 1.
Figure 6:
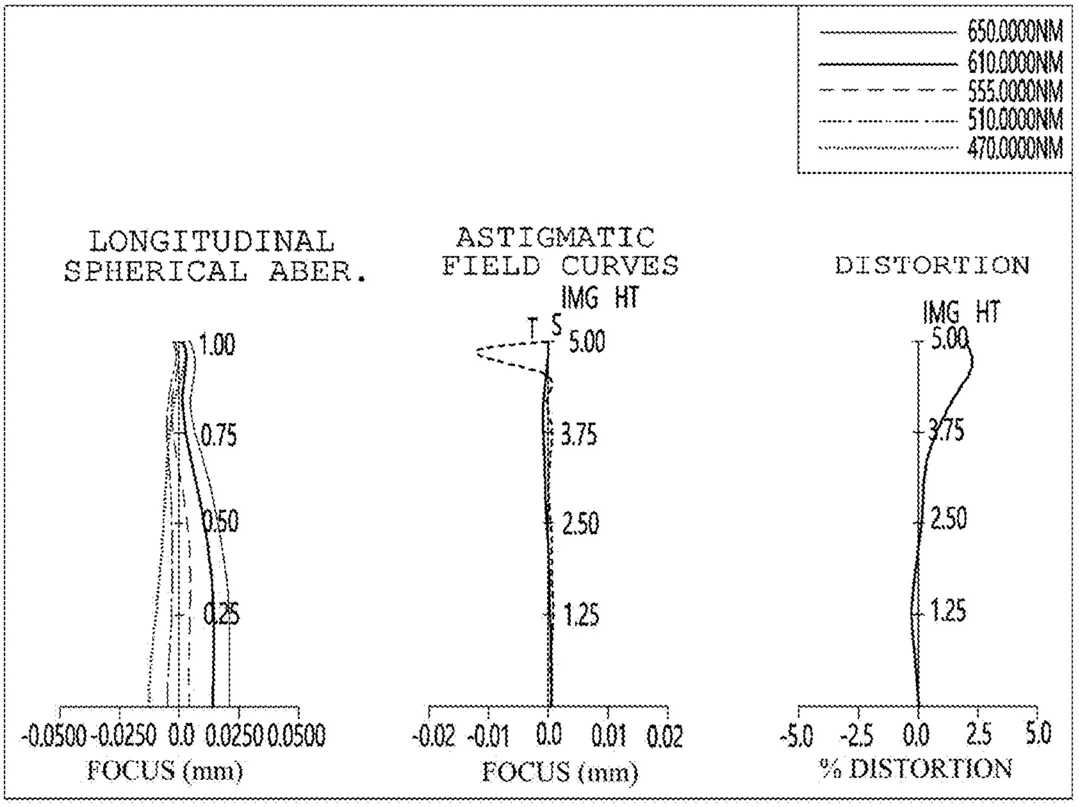
FIG. 6 is a graph showing the aberration characteristics of the optical system of FIG. 1.
Figure 7:
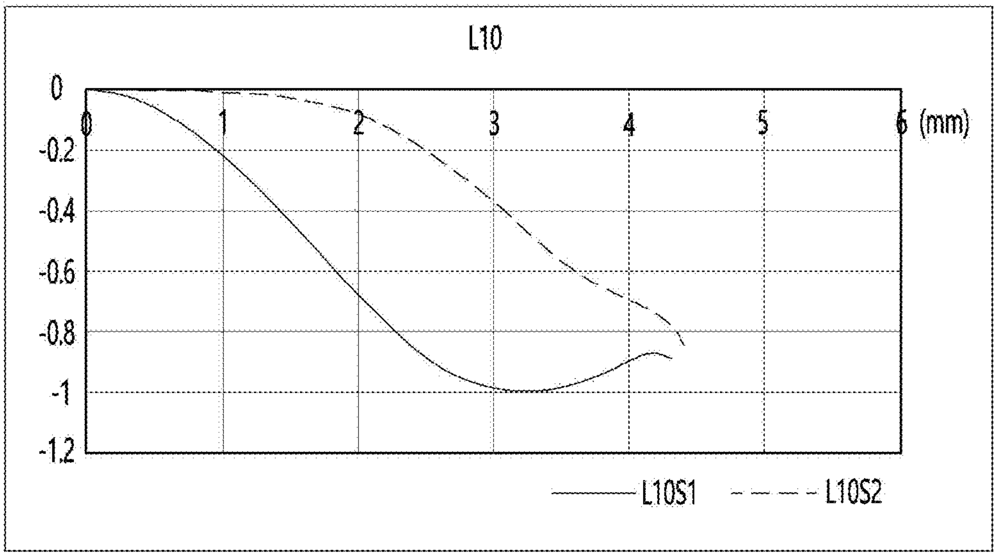
FIG. 7 is a graph showing a height in an optical axis direction according to a distance in a first direction Y of an object-side surface and a sensor-side surface in an n-th lens of the optical system of FIG. 2.

FIG. 1 is a configuration diagram of an optical system according to the first embodiment, FIG. 2 is an explanatory diagram showing a relationship between an image sensor, an n-th lens, and an n−1-th lens in the optical system of FIG. 1, FIG. 3 is a diagram showing data of distances between two adjacent lenses in the optical system of FIG. 1, FIG. 4 is a diagram showing data of an aspheric coefficient of each lens surface in the optical system of FIG. 1, FIG. 5 is a graph of the diffraction MTF of the optical system of FIG. 1, FIG. 6 is a graph showing the aberration characteristics of the optical system of FIG. 1, and FIG. 7 is a graph showing a height in an optical axis direction according to a distance in a first direction Y of an object-side surface and a sensor-side surface in an n-th lens of the optical system of FIG. 2.

Referring to FIGS. 1 and 2, the optical system 1000 according to the first embodiment includes a plurality of lenses 100, and the plurality of lenses 100 may include a first lens 101, a second lens 102, a third lens 103, a fourth lens 104, a fifth lens 105, a sixth lens 106, an eighth lens 108, a ninth lens 109, and a tenth lens 110. The first to tenth lenses 101 to 110 may be sequentially arranged along the optical axis OA of the optical system 1000. Light corresponding to object information may pass through the first lens 101, the second lens 102, the third lens 103, the fourth lens 104, the fifth lens 105, the sixth lens 106, the seventh lens 107, the eighth lens 108, the ninth lens 109, and the tenth lens 110 and enter the image sensor 300.

The first lens 101 may have positive (+) or negative (−) refractive power on the optical axis OA. The first lens 101 may have positive (+) refractive power. The first lens 101 may include plastic or glass. For example, the first lens 101 may be made of plastic. The first lens 101 may include a first surface S1 defined as the object-side surface and a second surface S2 defined as the sensor-side surface. On the optical axis OA, the first surface S1 may have a convex shape, and the second surface S2 may have a concave shape. That is, the first lens 101 may have a meniscus shape that is convex from the optical axis OA toward the object. Alternatively, on the optical axis OA, the first surface S1 may have a convex shape, and the second surface S2 may have a convex shape. That is, the first lens 101 may have a shape in which both sides are convex on the optical axis OA. At least one of the first surface S1 and the second surface S2 may be an aspherical surface. For example, both the first surface S1 and the second surface S2 may be aspherical. The aspheric coefficients of the first and second surfaces S1 and S2 are provided as shown in FIG. 4, where L1 is the first lens 101 and S1/S2 represent the first/second surfaces of L1.

The second lens 102 may have positive (+) or negative (−) refractive power on the optical axis OA. The second lens 102 may have positive (+) refractive power. The second lens 102 may include plastic or glass. For example, the second lens 102 may be made of plastic. The second lens 102 may include a third surface S3 defined as the object-side surface and a fourth surface S4 defined as the sensor-side surface. On the optical axis OA, the third surface S3 may have a convex shape, and the fourth surface S4 may have a concave shape. That is, the second lens 102 may have a meniscus shape that is convex from the optical axis OA toward the object. Alternatively, on the optical axis OA, the third surface S3 may have a convex shape, and the fourth surface S4 may have a convex shape. That is, the second lens 102 may have a shape in which both sides are convex on the optical axis OA. At least one of the third surface S3 and the fourth surface S4 may be an aspherical surface. For example, both the third surface S3 and the fourth surface S4 may be aspherical. The aspherical coefficients of the third and fourth surfaces S3 and S4 are provided as shown in FIG. 4, where L2 is the second lens 102, and S1/S2 of L2 represent the first/second surfaces of L2.

The third lens 103 may have positive (+) or negative (−) refractive power on the optical axis OA. The third lens 103 may have negative (−) refractive power. The third lens 103 may include plastic or glass. For example, the third lens 103 may be made of plastic. The third lens 103 may include a fifth surface S5 defined as the object-side surface and a sixth surface S6 defined as the sensor-side surface. On the optical axis OA, the fifth surface S5 may have a convex shape, and the sixth surface S6 may have a concave shape. That is, the third lens 103 may have a meniscus shape that is convex from the optical axis OA toward the object. Alternatively, on the optical axis OA, the fifth surface S5 may have a concave shape, and the sixth surface S6 may have a concave shape. That is, the third lens 103 may have a shape where both sides are concave on the optical axis OA. At least one of the fifth surface S5 and the sixth surface S6 may be an aspherical surface. For example, both the fifth surface S5 and the sixth surface S6 may be aspherical. The aspheric coefficients of the fifth and sixth surfaces S5 and S6 are provided as shown in FIG. 4, where L3 is the third lens 103, and S1/S2 of L3 represent the first/second surfaces of L3.

The first lens group G1 may include the first to third lenses 101, 102, and 103. Among the first to third lenses 101, 102, and 103, the thickness in the optical axis OA, that is, the center thickness of the lens, may be the thinnest for the third lens 103, and the thickest for the first lens 101. Accordingly, the optical system 1000 may control incident light and have improved aberration characteristics and resolution.

In the average size of the effective diameters (Clear aperture: CA) of the lenses of the first to third lenses 101, 102, and 103, the third lens 103 may be the smallest, and the first lens 101 may be the largest. In detail, among the first to third lenses 101, 102, and 103, the effective diameter H1 (see FIG. 1) of the first surface S1 may be the largest, and the effective diameter of the sixth surface S6 of the third lens 13 may be the same as that of the seventh surface S7 or may be the smallest among the plurality of lenses 100. The average size of the effective diameter is the average value of the effective diameter of the object-side surface and the effective diameter of the sensor-side surface of each lens. Accordingly, the optical system 1000 may have improved chromatic aberration control characteristics, and the vignetting characteristics of the optical system 1000 may be improved by controlling incident light.

The refractive index of the third lens 103 may be greater than that of the first and second lenses 101 and 102. The refractive index of the third lens 103 may be greater than 1.6, and the refractive index of the first and second lenses 101 and 102 may be less than 1.6. The third lens 103 may have an Abbe number that is smaller than the Abbe numbers of the first and second lenses 101 and 102. For example, the Abbe number of the third lens 103 may be smaller than the Abbe number of the first and second lenses 101 and 102 by a difference of 20 or more. In detail, the Abbe number of the first and second lenses 101 and 102 may be 30 or more greater than the Abbe number of the third lens 103, for example, 50 or more. Accordingly, the optical system 1000 may have improved chromatic aberration control characteristics.

The fourth lens 104 may have positive (+) or negative (−) refractive power on the optical axis OA. The fourth lens 104 may have positive (+) refractive power. The fourth lens 104 may include plastic or glass. For example, the fourth lens 104 may be made of plastic.

The fourth lens 104 may include a seventh surface S7 defined as the object-side surface and an eighth surface S8 defined as the sensor-side surface. On the optical axis the seventh surface S7 may have a concave shape, and the eighth surface S8 may have a convex shape. That is, the fourth lens 104 may have a meniscus shape that is convex from the optical axis OA toward the sensor. Alternatively, the seventh surface S7 may have a convex shape on the optical axis OA, and the eighth surface S8 may have a convex shape on the optical axis OA. That is, the fourth lens 104 may have a shape in which both sides are convex on the optical axis OA. Alternatively, the seventh surface S7 may have a convex shape on the optical axis OA, and the eighth surface S8 may have a concave shape on the optical axis OA. That is, the fourth lens 104 may have a meniscus shape that is convex from the optical axis OA toward the object. Alternatively, the seventh surface S7 may have a concave shape on the optical axis OA, and the eighth surface S8 may have a concave shape on the optical axis OA. That is, the fourth lens 104 may have a concave shape to both sides on the optical axis OA.

At least one of the seventh surface S7 and the eighth surface S8 may be an aspherical surface. For example, both the seventh surface S7 and the eighth surface S8 may be aspherical. The aspherical coefficients of the seventh and eighth surfaces S7 and S8 are provided as shown in FIG. 4, where L4 is the fourth lens 104, and S1/S2 of L4 represent the first/second surfaces of LA.

The refractive index of the fourth lens 104 may be lower than that of the third lens 103. The fourth lens 104 may have a larger Abbe number than the third lens 103. For example, the Abbe number of the fourth lens 104 may be greater than the Abbe number of the third lens 103 by about 20 or more, for example, 30 or more. Accordingly, the optical system 1000 may have improved chromatic aberration control characteristics.

The fifth lens 105 may have positive (+) or negative (−) refractive power on the optical axis OA. The fifth lens 105 may have positive (+) refractive power. The fifth lens 105 may include plastic or glass. For example, the fifth lens 105 may be made of plastic.

The fifth lens 105 may include a ninth surface S9 defined as the object-side surface and a tenth surface S10 defined as the sensor-side surface. The ninth surface S9 may have a concave shape on the optical axis OA, and the tenth surface S10 may have a convex shape on the optical axis OA. That is, the fifth lens 105 may have a meniscus shape that is convex from the optical axis OA toward the sensor. Alternatively, the ninth surface S9 may have a convex shape on the optical axis OA, and the tenth surface S10 may have a convex shape on the optical axis OA. That is, the fifth lens 105 may have a shape in which both sides are convex on the optical axis OA. Alternatively, the ninth surface S9 may have a convex shape on the optical axis OA, and the tenth surface S10 may have a concave shape on the optical axis OA. That is, the fifth lens 105 may have a meniscus shape that is convex from the optical axis OA toward the object. Alternatively, the ninth surface S9 may have a concave shape on the optical axis OA, and the tenth surface S10 may have a concave shape on the optical axis OA. That is, the fifth lens 105 may have a concave shape to both sides on the optical axis OA. At least one of the ninth surface S9 and the tenth surface S10 may be an aspherical surface. For example, both the ninth surface S9 and the tenth surface S10 may be aspherical. The aspheric coefficients of the ninth and tenth surfaces S9 and S10 are provided as shown in FIG. 4, where L5 is the fifth lens 105, and S1/S2 of L5 represent the first/second surfaces of L5.

The sixth lens 106 may have positive (+) or negative (−) refractive power on the optical axis OA. The sixth lens 106 may have negative (−) refractive power. The sixth lens 106 may include plastic or glass. For example, the sixth lens 106 may be made of plastic. The sixth lens 106 may include an eleventh surface S11 defined as the object-side surface and a twelfth surface S12 defined as the sensor-side surface. The eleventh surface S11 may have a concave shape on the optical axis OA, and the twelfth surface S12 may have a convex shape on the optical axis OA. That is, the sixth lens 106 may have a meniscus shape that is convex from the optical axis OA toward the sensor. Alternatively, the eleventh surface S11 may have a convex shape on the optical axis OA, and the twelfth surface S12 may have a convex shape on the optical axis OA. That is, the sixth lens 106 may have a shape in which both sides are convex on the optical axis OA. At least one of the eleventh surface S11 and the twelfth surface S12 may be an aspherical surface. For example, both the eleventh surface S11 and the twelfth surface S12 may be aspherical. The aspherical coefficients of the eleventh and twelfth surfaces S11 and S12 are provided as shown in FIG. 4, where L6 is the sixth lens 106, and S1/S2 of L6 represent the first/second surfaces of L6.

The seventh lens 107 may have positive (+) or negative (−) refractive power on the optical axis OA. The seventh lens 107 may have negative refractive power. The seventh lens 107 may include plastic or glass. For example, the seventh lens 107 may be made of plastic. The seventh lens 107 may include a thirteenth surface S13 defined as the object-side surface and a fourteenth surface S14 defined as the sensor-side surface. The thirteenth surface S13 may have a convex shape on the optical axis OA, and the fourteenth surface S14 may have a concave shape on the optical axis OA. That is, the seventh lens 107 may have a meniscus shape that is convex from the optical axis OA toward the object. Alternatively, the thirteenth surface S13 may have a concave shape on the optical axis OA, and the fourteenth surface S14 may have a concave shape on the optical axis OA, that is, the seventh lens 107 may have a shape where both sides are concave on the optical axis OA. At least one of the thirteenth surface S13 and the fourteenth surface S14 may be an aspherical surface. For example, both the thirteenth surface S13 and the fourteenth surface S14 may be aspherical. The aspheric coefficients of the thirteenth and fourteenth surfaces S13 and S14 are provided as shown in FIG. 4, where L7 is the seventh lens 107, and S1/S2 of L7 represent the first/second surfaces of L7.

The seventh lens 107 may include at least one critical point. In detail, at least one or both of the thirteenth surface S13 and the fourteenth surface S14 may include a critical point. The critical point of the thirteenth surface S13 may be located at a position greater than 50% of the effective diameter of the thirteenth surface S13, for example, in the range of 50% to 60%. The critical point of the fourteenth surface S14 may be located at a position of 65% or more of the effective radius of the fourteenth surface S14, which is a distance from the optical axis OA to an end of an effective region, for example, in a range of 65% to 85%. The critical point of the fourteenth surface S14 may be located further outside the optical axis OA than the critical point of the thirteenth surface S13. Accordingly, the fourteenth surface S14 may diffuse the light incident through the thirteenth surface S13. The critical point is a point at which the sign of the inclination value with respect to the optical axis OA and the direction perpendicular to the optical axis OA changes from positive (+) to negative (−) or from negative (−) to positive (+), and may mean a point at which the slope value is 0. Additionally, the critical point may be a point where the slope value decreases as it increases, or a point where it decreases and then increases.

The eighth lens 108 may have positive (+) or negative (−) refractive power on the optical axis OA. The eighth lens 108 may have positive (+) refractive power. The eighth lens 108 may include plastic or glass. For example, the eighth lens 108 may be made of plastic. The eighth lens 108 may include a fifteenth surface S15 defined as the object-side surface and a sixteenth surface S16 defined as the sensor-side surface. The fifteenth surface S15 may have a convex shape on the optical axis OA, and the sixteenth surface S16 may have a convex shape on the optical axis OA. That is, the eighth lens 108 may have a shape in which both sides are convex on the optical axis OA. Alternatively, the fifteenth surface S15 may have a convex shape on the optical axis OA, and the sixteenth surface S16 may have a concave shape on the optical axis OA. That is, the eighth lens 108 may have a meniscus shape that is convex toward the object. Alternatively, the fifteenth surface S15 may have a concave shape on the optical axis OA, and the sixteenth surface S16 may have a convex shape on the optical axis OA. That is, the eighth lens 108 may have a meniscus shape that is convex from the optical axis OA toward the image sensor 300. Alternatively, the fifteenth surface S15 may have a concave shape on the optical axis OA, and the sixteenth surface S16 may have a concave shape on the optical axis OA. That is, the eighth lens 108 may have a concave shape to both sides on the optical axis OA. At least one of the fifteenth surface S15 and the sixteenth surface S16 may be an aspherical surface. For example, both the fifteenth surface S15 and the sixteenth surface S16 may be aspherical. The aspheric coefficients of the fifteenth and sixteenth surfaces S15 and S16 are provided as shown in FIG. 4, where L8 is the eighth lens 108, and S1/S2 of L8 represent the first/second surfaces of L8.

The eighth lens 108 may include at least one critical point. In detail, at least one of the fifteenth surface S15 and the sixteenth surface S16 may include a critical point. The critical point of the fifteenth surface S15 may be located at a position of 25% or more of the effective radius of the fifteenth surface S15, which is a distance from the optical axis OA to an end of an effective region, for example, in a range of 25% to 40%. The critical point of the fifteenth surface S15 may be located closer to the optical axis OA than the critical point of the fourteenth surface S14. Accordingly, the fifteenth surface S14 may diffuse the light incident through the fourteenth surface S14. The sixteenth surface S16 may be provided without a critical point from the optical axis OA to the end of the effective region. As another example, the eighth lens 108 may be provided with both the fifteenth surface S15 and the sixteenth surface S16 without a critical point from the optical axis OA to the end of the effective region.

Figure 9:
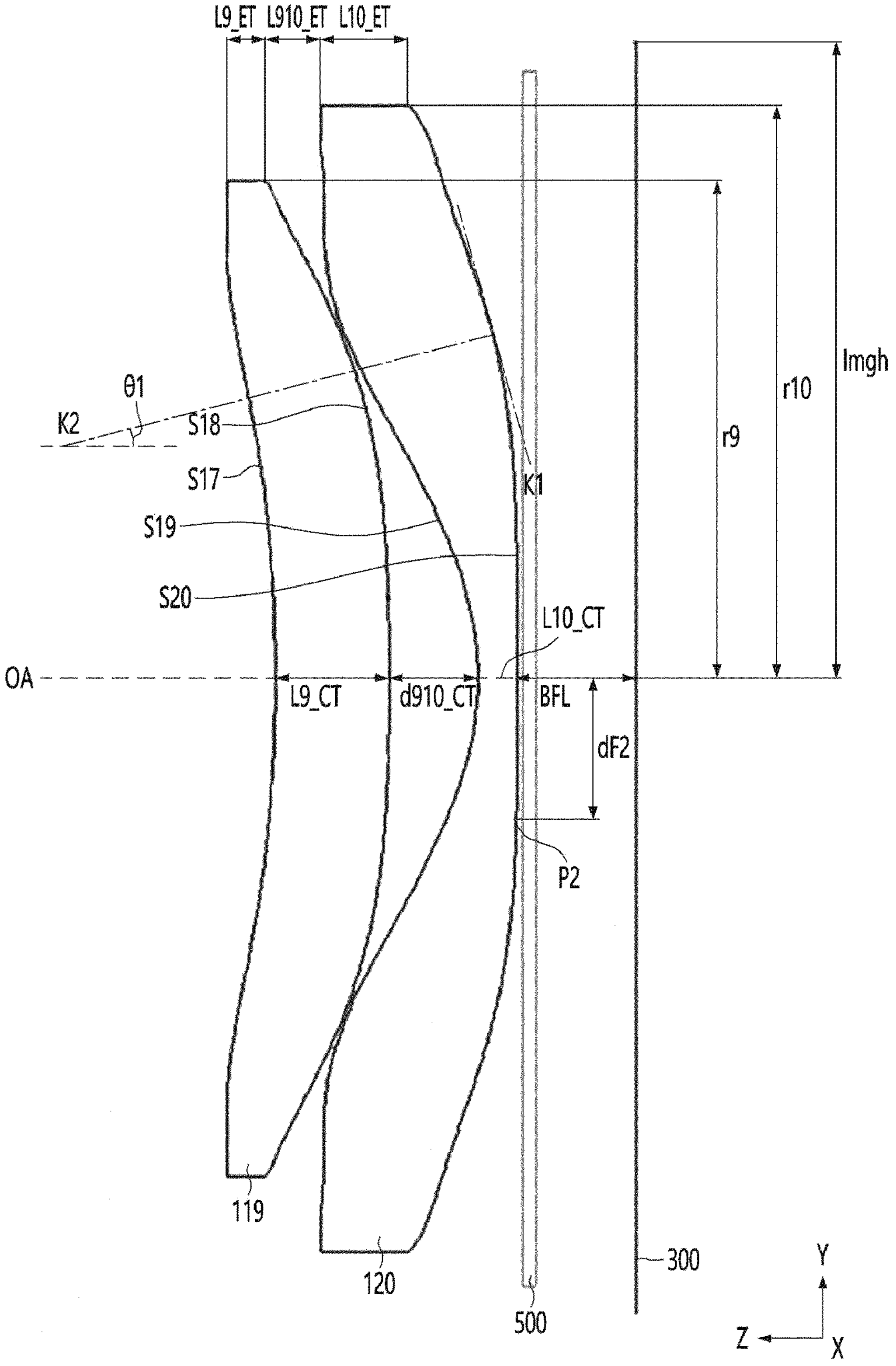
FIG. 9 is an explanatory diagram showing a relationship between the image sensor, the n-th lens, and the n−1-th lens in the optical system of FIG. 8.
Figure 16:
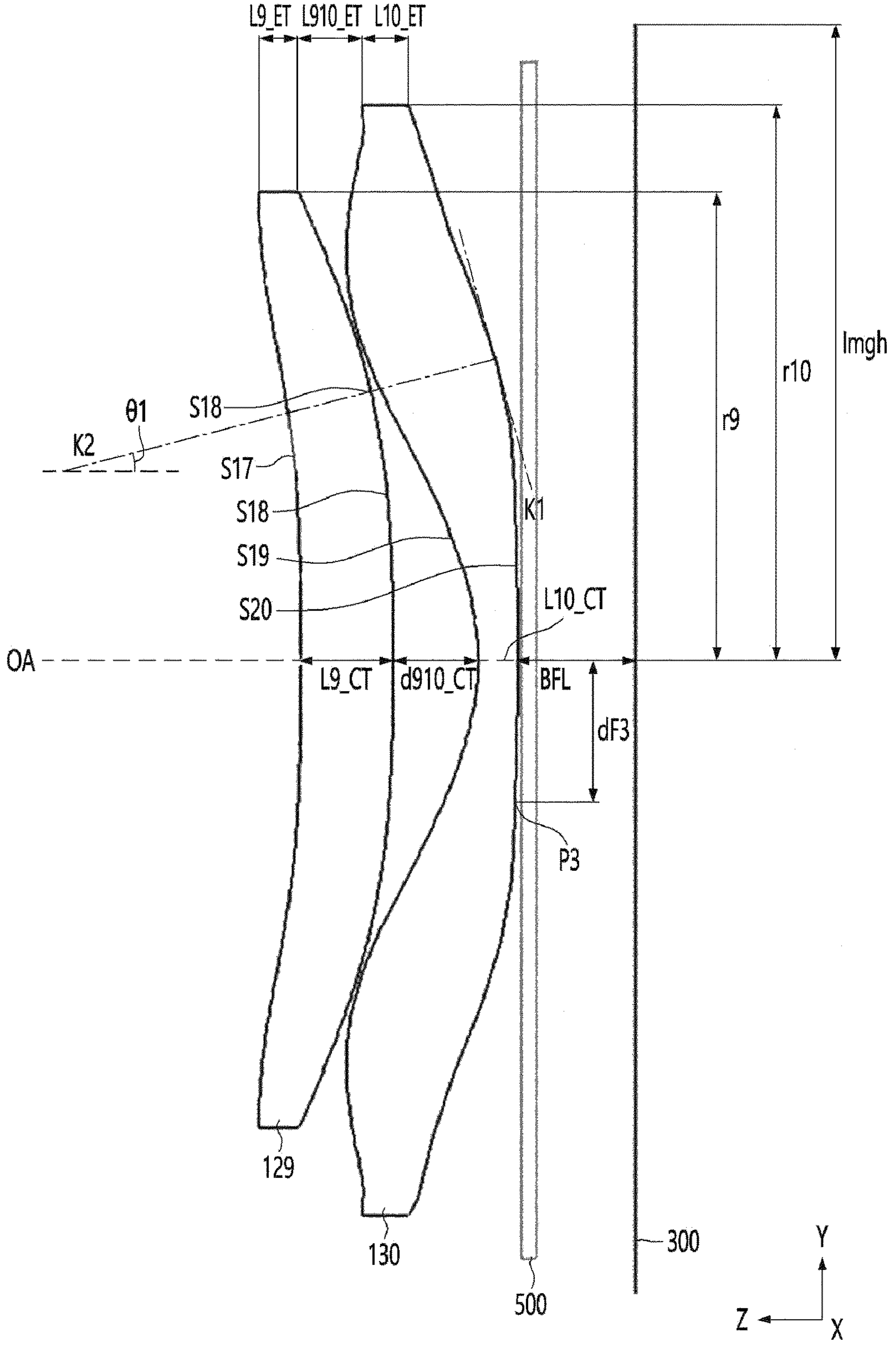
FIG. 16 is an explanatory diagram showing a relationship between the image sensor, the n-th lens, and the n−1-th lens in the optical system of FIG. 15.

Referring to FIG. 2, the positions of the critical points of the seventh and eighth lenses 107 and 108 are preferably placed at positions that satisfy the above-mentioned range in consideration of the optical characteristics of the optical system 1000. In detail, it is desirable that the position of the critical point satisfies the above-mentioned range for controlling optical characteristics such as chromatic aberration, distortion characteristics, aberration characteristics, and resolution of the optical system 1000. Accordingly, the path of light emitted to the image sensor 300 through the lenses may be effectively controlled. Accordingly, the optical system 1000 according to the embodiment may have improved optical characteristics not only in the center portion but also in the periphery portion of the FOV. For example, referring to FIGS. 2, 9, and 16, the normal line K2 passing through an arbitrary point on the sensor-side twentieth surface S20 of the tenth lens 110, 120, and 130, which is the last lens, have at a predetermined angle θ1 with respect to the optical axis OA. Here, the critical point may mean a point where the slope of the normal line K2 and the optical axis OA is 0 on the sensor-side twentieth surface S20. Additionally, the critical point may mean a point at which an inclination between the tangent K1 and an imaginary line extending in a vertical direction of the optical axis OA on the twentieth surface S20 is 0 degree. Referring to FIGS. 2, 9, and 16, r9 is the effective radius of the eighteenth surface S18 of the ninth lens 109, 119, and 129, and r10 is the effective radius of the twentieth surface S20 of the tenth lens 110, 120, and 130.

The ninth lens 109 may have positive (+) or negative (−) refractive power on the optical axis OA. The ninth lens 109 may have negative (−) refractive power. The ninth lens 109 may include plastic or glass. For example, the ninth lens 109 may be made of plastic. The ninth lens 109 may include a seventeenth surface S17 defined as the object-side surface and an eighteenth surface S18 defined as the sensor-side surface. The seventeenth surface S17 may have a concave shape on the optical axis OA, and the eighteenth surface S18 may have a concave shape on the optical axis OA. That is, the ninth lens 109 may have a concave shape to both sides on the optical axis OA. Alternatively, the seventeenth surface S17 may have a convex shape on the optical axis OA, and the eighteenth surface S18 may have a concave shape on the optical axis OA. That is, the ninth lens 109 may have a meniscus shape convex from the optical axis OA toward the object. Alternatively, the seventeenth surface S17 may have a concave shape on the optical axis OA, and the eighteenth surface S18 may have a convex shape on the optical axis OA. That is, the ninth lens 109 may have a meniscus shape convex from the optical axis OA toward the sensor. At least one of the seventeenth surface S17 and the eighteenth surface S18 may be an aspherical surface. For example, both the seventeenth surface S17 and the eighteenth surface S18 may be aspherical surfaces. The aspheric coefficients of the seventeenth and eighteenth surfaces S17 and S18 are provided as shown in FIG. 4, where L9 is the ninth lens 109, and S1/S2 of L9 represent the first/second surfaces of L9. The seventeenth surface S17 and the eighteenth surface S18 of the ninth lens 109 may be provided without a critical point. In detail, the seventeenth surface S17 and the eighteenth surface S18 may be provided without a critical point from the optical axis OA to the end of the effective region.

The tenth lens 110 may have negative refractive power on the optical axis OA. The tenth lens 110 may include plastic or glass. For example, the tenth lens 110 may be made of plastic. The tenth lens 110 may include a nineteenth surface S19 defined as the object-side surface and a twentieth surface S20 defined as the sensor-side surface. The nineteenth surface S19 may have a concave shape on the optical axis OA, and the twentieth surface S20 may have a convex shape on the optical axis OA. That is, the tenth lens 110 may have a meniscus shape that is convex from the optical axis OA toward the sensor. Alternatively, the nineteenth surface S19 may have a convex shape on the optical axis OA, and the twentieth surface S20 may have a convex shape on the optical axis OA. That is, the tenth lens 110 may have a shape in which both sides are convex on the optical axis OA. At least one of the nineteenth surface S19 and the twentieth surface S20 may be an aspherical surface. For example, both the nineteenth surface S19 and the twentieth surface S20 may be aspherical. The aspherical coefficients of the nineteenth and twentieth surfaces S19 and S20 are provided as shown in FIG. 4, where L10 is the tenth lens 110, and S1/S2 of L10 represent the first/second surfaces of L10. At least one or both of the nineteenth surface S19 and the twentieth surface S20 of the tenth lens 110 may be provided without a critical point. In detail, the nineteenth surface S19 and the twentieth surface S20 may be provided without a critical point from the optical axis OA to the end of the effective region. As another example, the nineteenth surface S19 may have a critical point. The twentieth surface S20 may be provided without a critical point from the optical axis OA to the end of the effective region. Here, in the twentieth surface S20, the distance between the center of the twentieth surface S20 and the image sensor 300 is the closest, and the distance from the image sensor 300 to the twentieth surface S20 may gradually decrease from the optical axis OA to the end of the effective region.

FIG. 7 is a graph showing a height in the optical axis direction according to a distance in the first direction Y from the object-side nineteenth surface S19 and the sensor-side twentieth surface S20 of the tenth lens 110 of FIG. 2. In the drawing, L10 refers to the tenth lens, L10S1 refers to the nineteenth surface, and L10S2 refers to the twentieth surface. As shown in FIG. 7, it may be seen that the twentieth surface (L10S2) has a shape extending along a straight line perpendicular to the center 0 of the twentieth surface (L10S2) to a point where the height in the optical axis direction is from the optical axis to 2 mm or less, and it may be seen that there is no critical point.

Referring to FIGS. 2 and 7, the twentieth surface S20 of the tenth lens 110 has a negative radius of curvature on the optical axis OA, and may have a slope of a straight line passing from the center of the twentieth surface S20 to a surface of the twentieth surface S20 based on a reference straight line perpendicular to the optical axis OA or center of the twentieth surface S20, and a distance dP1 from the optical axis OA to the first point P1 where the slope is less than 1, may be located at least 10%, for example, in the range of 10% to 55% or in the range of 40% to 55% of the effective radius of the twentieth surface S20. The twentieth surface S20 may be located so that the distance from the optical axis OA to the second point where the slope is less than −2 may be 55% or more, for example, in the range of 55% to 65% of the effective radius of the twentieth surface S20. Accordingly, the optical axis or paraxial region of the twentieth surface S20 may be provided without a critical point, and a slim optical system may be provided. The first and second points of the slope may be set to an absolute value of less than 1 or less than 2.

The second lens group G2 may include the fourth to tenth lenses 104, 105, 106, 107, 108, 109, and 110. The thickness in the optical axis OA, that is, the center thickness of the fourth to tenth lenses 104, 105, 106, 107, 108, 109, and 110, at least one of the seventh and tenth lenses 107 and 110 may have the thinnest thickness, and the ninth lens 109 may have the thickest thickness. Accordingly, the optical system 1000 may control incident light and have improved aberration characteristics and resolution.

In FIG. 2, L9_CT is the center thickness or optical axis thickness of the ninth lens 109, and L9_ET is the end or edge thickness of the effective region of the ninth lens 109. L10_CT is the center thickness or optical axis thickness of the tenth lens 110, and L10_ET is the end or edge thickness of the effective region of the tenth lens 110. The edge thickness L9_ET of the ninth lens 109 is a distance in the optical axis direction from the end of the effective region of the seventeenth surface S17 to the effective region of the eighteenth surface S18. The edge thickness L10_ET of the tenth lens 110 is a distance in the optical axis direction from the end of the effective region of the nineteenth surface S19 to the effective region of the twentieth surface S20.

d910_CT is an optical axis distance (i.e., center distance) from the center of the ninth lens 109 to the center of the tenth lens 110. That is, the optical axis distance d910_CT from the center of the ninth lens 109 to the center of the tenth lens 110 is the distance between the eighteenth surface S18 and the nineteenth surface S19 in the optical axis OA. d910_ET is the distance (i.e., edge distance) in the optical axis direction from the edge of the ninth lens 109 to the edge of the tenth lens 110. That is, the distance d910_ET in the optical axis direction from the edge of the ninth lens 109 to the edge of the tenth lens 110 is a distance in the optical axis direction between a straight line extending in a circumferential direction from the end of the effective region of the eighteenth surface S18 and the end of the effective region of the nineteenth surface S19. Back focal length (BFL) is an optical axis distance from the image sensor 300 to the last lens. In this way, the center thickness, edge thickness, and center distance and edge distance between two adjacent lenses of the first to tenth lenses 101 to 110 may be set. For example, as shown in FIG. 3, a distance between adjacent lenses may be provided, for example, a first distance d12 between the first and second lenses 101 and 102, a second distance d23 between the second and third lenses 102 and 103, and a third distance d34 between the third and fourth lenses 103 and 104, a fourth distance d45 between the fourth and fifth lenses 104 and 105, a fifth distance d56 between the fifth and sixth lenses 105 and 106, a sixth distance d67 between the sixth and seventh lenses 106 and 107, a seventh distance d78 between the seventh and eighth lenses 107 and 108, an eighth distance d89 between the eighth and ninth lenses 108 and 109, and a ninth distance d910 between the ninth and tenth lenses 109 and 110 may be obtained in a region spaced apart for each predetermined distance (e.g., 0.1 mm) along the first direction Y based on the optical axis OA. In the description of FIGS. 3, 10, and 17, the first direction Y may include a circumferential direction centered on the optical axis OA or two directions orthogonal to each other, and a distance between two adjacent lenses at the ends of the first direction Y may be based on the ends of the effective region of the lens with a smaller effective radius, and the ends of the effective radius may include an error of ±0.2 mm at the ends.

Referring to FIGS. 3 and 1, the first distance d12 may be a distance in the optical axis direction Z between the first lens 101 and the second lens 102 along the first direction Y. When the first distance d12 has the optical axis OA as its starting point and the end of the effective region of the third surface S3 of the second lens 102 at its end point, the first distance d12 may change from the optical axis OA toward the first direction Y. The first distance d12 may gradually increase from the optical axis OA to the end of the effective region. The maximum value in the first distance d12 may be 1.5 times or less, for example, in a range of 1.1 to 1.5 times the minimum value. Accordingly, the optical system 1000 may effectively control incident light. In detail, as the first lens 101 and the second lens 102 are spaced apart at the first distance d12 set according to their positions, the light incident through the first and second lenses 101 and 102 may proceed to another lens and maintain good optical performance.

The second distance d23 may be an interval in the optical axis direction Z between the second lens 102 and the third lens 103. When the second distance d23 has the optical axis OA as its starting point and the end of the effective region of the fifth surface S5 of the third lens 103 as its end point, the second distance d23 may increase from the optical axis OA toward the end point in the first direction Y. The second distance d23 may be minimum at the optical axis OA or the starting point and maximum at the end point. The maximum value of the second distance d23 may be twice or more the minimum value. In detail, the maximum value of the second distance d23 may satisfy 2 to 5 times the minimum value. Accordingly, the optical system 1000 may have improved optical characteristics. In detail, as the second lens 102 and the third lens 103 are spaced apart at the second distance d23 set according to their positions, the aberration characteristics of the optical system 1000 may be improved. The maximum value of the first distance d12 is three times or more than the maximum value of the second distance d23, and the minimum value of the first distance d12 may be greater than the maximum value of the second distance d23.

The first lens group G1 and the second lens group G2 may be spaced apart by a third distance d34. The third distance d34 may be a distance in the optical axis direction Z between the third lens 103 and the fourth lens 104. When the third distance d34 has the optical axis OA as its starting point and the end of the effective region of the sixth surface S6 of the third lens 103 as its the end point in the first direction Y, the third distance d34 may gradually become smaller as it moves from the optical axis OA toward the end point of the first direction Y. That is, the third distance may have a maximum value at the optical axis OA and a minimum value around the end point. The maximum value may be 5 times or more than the minimum value, for example, in a range of 5 to 9 times. The maximum value of the third distance d34 may be 3 times or more, for example, in a range of 3 to 5 times the maximum value of the second distance d23, and the minimum value may be greater than the minimum value of the second distance d23. Accordingly, the optical system 1000 may have improved optical characteristics. In detail, as the third lens 103 and the fourth lens 104 are spaced apart at the third distance d34 set according to their positions, the optical system 1000 may have improved chromatic aberration characteristics. Additionally, the optical system 1000 may control vignetting characteristics.

The fourth distance d45 may be a distance in the optical axis direction Z between the fourth lens 104 and the fifth lens 105. When the fourth distance d45 has the optical axis OA as the starting point and the end of the effective region of the eighth surface S8 of the fourth lens 104 as an end point, the fourth distance d45 may be increased and decreased in the first direction Y from the start point to the end point. The minimum value of the fourth distance d45 may be located at a point in the range of 40% to 60% of the distance from the starting point or the optical axis OA to the ending point, and the fourth distance d45 may gradually increases toward the optical axis OA from the position of the minimum value and gradually increase from the position of the minimum value toward the end point. Here, the fourth distance d45 may be smaller the distance at the optical axis OA than the distance at the end point.

The fourth distance d45 may be in a range of 0.10 mm to 0.15 mm. The maximum value of the fourth distance d45 may be greater than the minimum value of the third distance d34 and may be less than the maximum value of the third distance d34. Accordingly, the optical system 1000 may have improved optical characteristics. As the fourth lens 104 and the fifth lens 105 are spaced apart at the fourth distance d45 set according to their positions, the optical system 1000 may have good optical performance in the center and peripheral portions of the FOV and may control improved chromatic aberration and distortion aberration.

The fifth distance d56 may be a distance in the optical axis direction Z between the fifth lens 105 and the sixth lens 106. When the optical axis OA is the starting point and the end of the effective region of the tenth surface S10 of the fifth lens 105 is the ending point, the fifth distance d56 may change from the optical axis OA toward a vertical first direction Y. The fifth distance d56 may have a maximum value greater than or equal to 95% of the distance from the optical axis OA to the end point, for example, in the range of 95% to 100%. The minimum value of the fifth distance d56 may be located at the optical axis, and the maximum value may be 3 times or more, for example, in a range of 3 to 5 times the minimum value. The minimum value of the fifth distance d56 may be greater than the minimum value of the third distance d34, and the maximum value may be less than the maximum value of the third distance d34.

The sixth distance d67 may be a distance in the optical axis direction between the sixth lens 106 and the seventh lens 107. When the sixth distance d67 has the optical axis OA as the starting point and the end of the effective region of the twelfth surface S12 of the sixth lens 106 as the end point, the minimum value of the sixth distance d67 is located at the optical axis OA, the maximum value is located at the end, and the sixth distance d67 may gradually increase from the minimum value to the maximum value. The maximum value of the sixth distance d67 may be two times or more, for example, in a range of 2 to 4 times the minimum value. The maximum value of the sixth distance d67 may be 1.2 times or more, for example, in a range of 1.2 to 3 times the maximum value of the third distance d34, and the minimum value may be smaller than the maximum value of the third distance d34.

The seventh distance d78 may be a distance in the optical axis direction between the seventh lens 107 and the eighth lens 108. When the seventh distance d78 has the optical axis OA as the starting point and the end of the effective region of the fourteenth surface S14 of the seventh lens 107 as the end point, the minimum value of the sixth distance d78 is located at the end of the effective region, the maximum value is located at the optical axis, and the sixth distance d78 may gradually increase from the minimum value to the maximum value. The maximum value of the seventh distance d78 may be 1.5 times or more, for example, in a range of 1.5 to 3 times the minimum value. Accordingly, the optical system 1000 may have improved optical characteristics in the center and periphery portions of the FOV. In addition, the optical system 1000 may have improved aberration control characteristics as the seventh lens 107 and the eighth lens 108 are spaced apart at the seventh distance d78 set according to the position, and may be appropriately controlled the size of the effective diameter of the tenth lens 100.

The eighth distance d89 may be a distance in the optical axis direction between the eighth lens 108 and the ninth lens 109. When the eighth distance d89 has the optical axis OA as the starting point and the end of the effective region of the sixteenth surface S16 of the eighth lens 108 as the end point, the minimum value of the eighth distance d89 is located at the optical axis, the maximum value is located at the end of the effective region, and may gradually increase from the minimum value to the maximum value. The maximum value of the eighth distance d89 may be 5 times or more, for example, in a range of 5 to 15 times the minimum value. Aberration control characteristics may be improved by the eighth distance d89, and the size of the effective diameter of the tenth lens 110 may be appropriately controlled.

The ninth distance d910 may be a distance in the optical axis direction between the ninth lens 109 and the tenth lens 110. When the ninth distance d910 has the optical axis OA as the starting point and the end of the effective region of the eighteenth surface S18 of the ninth lens 109 as the end point, the ninth distance d910 may be disposed in a range of 65% or more, for example, in a range of 65% to 85% of the distance from the optical axis to the end of the effective region, and the maximum value may be located at the optical axis OA. The maximum value of the ninth distance d910 may be 4 times or more, for example, in a range of 4 to 7 times the minimum value. Accordingly, the optical system 1000 may have improved optical characteristics in the center and periphery portions of the FOV. In addition, as the ninth lens 109 and the tenth lens 110 are spaced apart at the ninth distance d910 set according to the position, the optical system 1000 may have good optical performance in the center and peripheral portions of the FOV and may control improved chromatic aberration and distortion aberration.

The lens with the thickest center thickness in the first lens group G1 may be thinner than the lens with the thickest center thickness in the second lens group G2. Among the first to tenth lenses 101 to 110, the maximum center thickness may be greater than the maximum center distance, for example, 1.5 times or more or in the range of 1.5 to 2.3 times the maximum center distance. For example, the center thickness of the ninth lens 109 is the largest among the lenses, and the center distance d910 between the ninth lens 109 and the tenth lens 110 is the largest among the distances between the lenses. The center thickness of the ninth lens 109 may be 1.5 times or more, for example, in a range of 1.5 to 2.3 times the center distance between the ninth and tenth lenses 109 and 110.

Among the fourth to tenth lenses 104, 105, 106, 107, 108, 109, and 110, the average effective diameter (clear aperture (CA)) of the lenses may be the smallest for the fourth lens 104, and the largest for the tenth lens 110. In detail, in the second lens group G2, the effective diameter of the seventh surface S7 of the fourth lens 104 may be the smallest, and the effective diameter of the twentieth surface S20 may be the largest. Among the plurality of lenses 100, the size of the effective diameter (H10 in FIG. 1) of the twentieth surface S20 may be 3 times or more, for example, in a range of 3 to 4 times the size of the effective diameter of the sixth surface S6. Among the plurality of lenses 100, the tenth lens 110 with the largest average effective diameter may be 3 times or more, for example, in a range of 3 to 4 times the range of the third lens 103 with the smallest effective diameter. The size of the effective diameter of the tenth lens 110 is the largest, so that it may effectively refract incident light toward the image sensor 300. Accordingly, the optical system 1000 may have improved chromatic aberration control characteristics, and the vignetting characteristics of the optical system 1000 may be improved by controlling incident light.

The refractive index of the ninth lens 109 may be greater than that of the eighth and tenth lenses 108 and 110. The refractive index of the ninth lens 109 may be greater than 1.6, and the refractive index of the eighth and tenth lenses 108 and 110 may be less than 1.6. The ninth lens 109 may have an Abbe number that is smaller than the Abbe numbers of the eighth and tenth lenses 108 and 110. For example, the Abbe number of the ninth lens 109 may be small and has a difference of 20 or more from the Abbe number of the tenth lens 110. In detail, the Abbe number of the tenth lens 110 may be 30 or more greater than the Abbe number of the ninth lens 109, for example, 50 or more. Accordingly, the optical system 1000 may have improved chromatic aberration control characteristics. In the second lens group G2, the number of lenses with a refractive index exceeding 1.6 may be smaller than the number of lenses with a refractive index of less than 1.6. In the second lens group G2, the number of lenses with an Abbe number exceeding 50 may be smaller than the number of lenses with an Abbe number of less than 50.

Among the lenses 101 to 110, the maximum center thickness may be 3.5 times or more, for example, in a range of 3.5 to 4.5 times the minimum center thickness. The ninth lens 109 having the maximum center thickness may be 3.5 times or more, for example, in a range of 3.5 to 4.5 times the seventh or tenth lenses 107 and 110 having the minimum center thickness. Among the plurality of lenses 100, the number of lenses with a center thickness of less than 0.5 mm may be greater than the number of lenses with a center thickness of 0.5 mm or more. Among the plurality of lenses 100, the number of lenses smaller than 0.5 mm may be 70% or more of the total number of lenses. Accordingly, the optical system 1000 may be provided in a structure with a slim thickness.

Among the plurality of lens surfaces S1 to S20, the number of surfaces with an effective radius of less than 1 mm may be greater than the number of surfaces with an effective radius of 1 mm or more, for example, may range from 51% to 60% of the total lens surface. When the radius of curvature is described as an absolute value, the radius of curvature of the fifteenth surface S15 of the eighth lens 108 among the plurality of lenses 100 may be the largest among the lens surfaces, and the radius of curvature of the fifteenth surface S15 of the eighth lens 108 may be the largest among the lens surfaces, and the radius of curvature of the fifteenth surface S15 of the eighth lens 108 may be the largest among the lens surfaces, and may be 35 times or more, for example, in a range of 35 to 55 times the radius of curvature of the first surface S1 or the nineteenth surface S19. When the focal length is described as an absolute value, the focal length of the sixth lens 106 among the plurality of lenses 100 may be the largest among the lenses, and may be 20 times or more than the focal length of the tenth lens 110, for example, in a range of 20 times to 35 times.

Table 1 is an example of lens data of the optical system of FIG. 1.

larly significantly change the aspheric shape of the periphery portion, so the optical performance of the periphery portion of the FOV may be well corrected.

FIG. 5 is a graph showing the diffraction MTF characteristics of the optical system 1000 according to the first embodiment, and FIG. 6 is a graph showing the aberration characteristics. The aberration graph in FIG. 6 is a graph measuring spherical aberration, astigmatic field curves, and distortion from left to right.

The diffraction MTF characteristic graph is measured from F1: Diff.Limit and F1: (RIH) 000 mm to F11: T (RIH) 5.000 mm and F11: R (RIH) 5.000 mm in units of about 0.000 mm to 5.000 mm in spatial frequency. In the diffraction MTF graph, T represents the MTF change in spatial frequency per millimeter on the tangential, and R represents the MTF change in spatial frequency per millimeter on the radiating source. Here, MTF depends on the spatial frequency in cycles per millimeter.

In FIG. 6, X-axis may represent focal length (mm) and distortion (%), and Y-axis may represent the height of the image. Additionally, the graph for spherical aberration is a graph for light in the approximately 470 nm, approximately 510 nm, approximately 555 nm, approximately 610 nm, and approximately 660 nm wavelength bands, and the graph for astigmatism and distortion aberration is a graph for light in the approximately 555 nm wavelength band.

TABLE 1

| Lens | Surface | Radius (mm) of curvature | Thickness (mm)/ Distance (mm) | Refractive index | Abbe number | Effective diameter (mm) |
|---|---|---|---|---|---|---|
| Lens 1 | S1 | 2.859 | 0.890 | 1.536 | 55.699 | 3.800 |
| | S2 | 13.156 | 0.282 | | | 3.634 |
| Lens 2 | S3 (Stop) | 8.335 | 0.383 | 1.536 | 55.699 | 3.368 |
| | S4 | 25.351 | 0.038 | | | 3.200 |
| Lens 3 | S5 | 6.105 | 0.352 | 1.674 | 19.518 | 3.080 |
| | S6 | 3.355 | 0.486 | | | 2.760 |
| Lens 4 | S7 | −9.068 | 0.406 | 1.536 | 55.699 | 2.849 |
| | S8 | −5.994 | 0.119 | | | 3.119 |
| Lens 5 | S9 | −7.758 | 0.581 | 1.536 | 55.699 | 3.201 |
| | S10 | −6.694 | 0.030 | | | 3.775 |
| Lens 6 | S11 | −7.271 | 0.418 | 1.592 | 29.931 | 3.855 |
| | S12 | −8.149 | 0.222 | | | 4.166 |
| Lens 7 | S13 | 16.302 | 0.300 | 1.678 | 19.230 | 4.724 |
| | S14 | 10.299 | 0.529 | | | 5.502 |
| Lens 8 | S15 | 110.705 | 0.537 | 1.577 | 33.546 | 5.666 |
| | S16 | −4.256 | 0.030 | | | 6.210 |
| Lens 9 | S17 | −14.866 | 1.210 | 1.664 | 20.402 | 6.932 |
| | S18 | 59.156 | 0.634 | | | 7.586 |
| Lens 10 | S19 | −2.621 | 0.300 | 1.536 | 55.699 | 7.990 |
| | S20 | −88.002 | 0.030 | | | 9.121 |
| Filter | | Infinity | 0.110 | | | 9.454 |
| | | Infinity | 0.750 | | | 9.501 |
| Image sensor | | Infinity | 0.000 | | | 10.000 |

Table 1 shows the radius of curvature, the thickness of the lens, the distance between lenses on the optical axis OA of the first to tenth lenses 101 to 110 of FIG. 1, the refractive index at d-line, Abbe Number, and effective diameter (clear aperture (CA)).

As shown in FIG. 4, in the first embodiment, at least one lens surface among the plurality of lenses 100 may include an aspherical surface with a 30th order aspherical coefficient. For example, the first to tenth lenses 101, 102, 103, 104, 105, 106, 107, 108, 109, and 110 may include a lens surface having a 30th order aspherical coefficient. As described above, an aspheric surface with a 30th order aspherical coefficient (a value other than "0") may particu- In the aberration diagram of FIG. 6, it may be interpreted that the closer each curve is to the Y-axis, the better the aberration correction function. Referring to FIG. 6, it may be seen that measurement values of the optical system 1000 according to an embodiment are adjacent to the Y-axis in most regions. That is, the optical system 1000 according to an embodiment may have improved resolution and may have good optical performance not only at the center but also at the periphery portions of the FOV.

Second Embodiment

Figure 12:
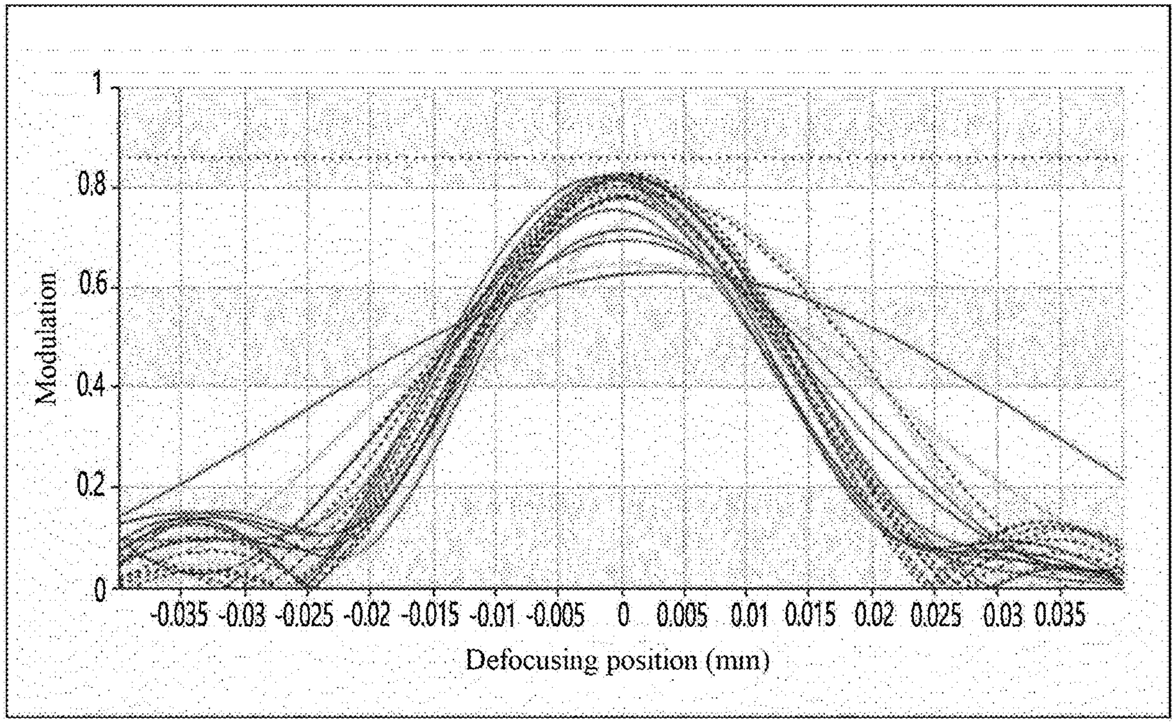
FIG. 12 is a graph of the diffraction MTF of the optical system of FIG. 8.
Figure 13:
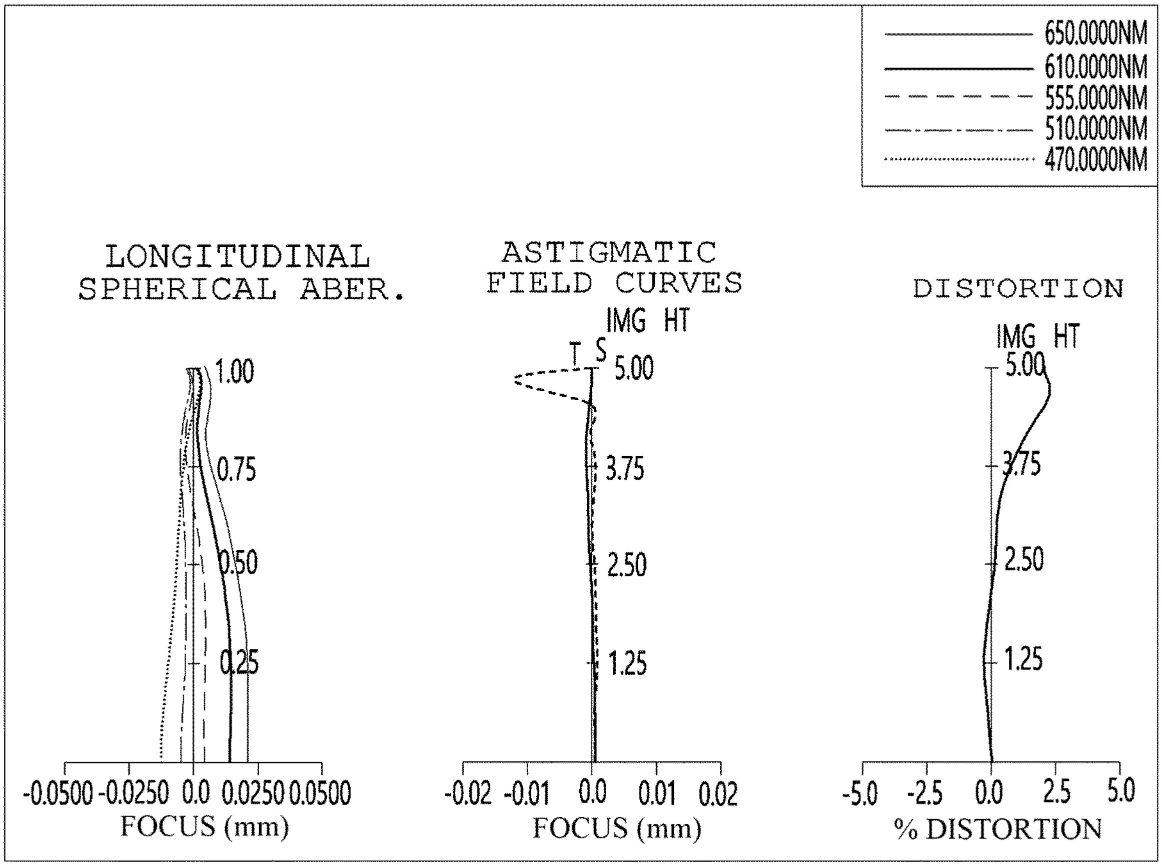
FIG. 13 is a graph showing the aberration characteristics of the optical system of FIG. 8.
Figure 14:
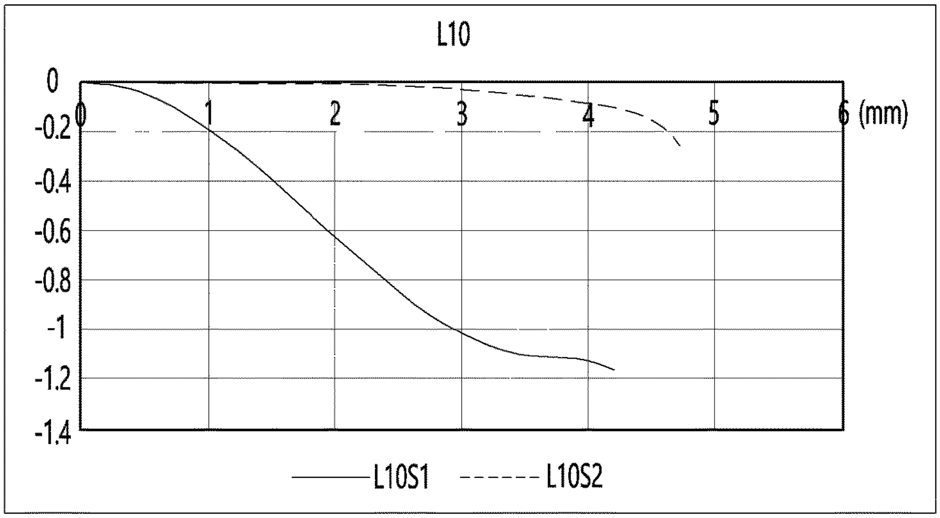
FIG. 14 is a graph showing a height in an optical axis direction according to a distance in a first direction Y of an object-side surface and a sensor-side surface in an n-th lens of the optical system of FIG. 9.

FIG. 8 is a configuration diagram of an optical system according to a second embodiment, FIG. 9 is an explanatory diagram showing a relationship between the image sensor, the n-th lens, and the n−1-th lens in the optical system of FIG. 8, FIG. 10 is a diagram showing data of distances between two adjacent lenses in the optical system of FIG. 8, FIG. 11 is a diagram showing data of an aspheric coefficient of each lens surface in the optical system of FIG. 8, FIG. 12 is a graph of the diffraction MTF of the optical system of FIG. 8, FIG. 13 is a graph showing the aberration characteristics of the optical system of FIG. 8, and FIG. 14 is a graph showing a height in an optical axis direction according to a distance in a first direction Y of an object-side surface and a sensor-side surface in an n-th lens of the optical system of FIG. 9.

Referring to FIGS. 8 and 9, the optical system 1000 according to the second embodiment includes a plurality of lenses 100A, and the plurality of lenses 100A may include the first lens 111 to the tenth lens 120. The first to tenth lenses 111 to 120 may be sequentially arranged along the optical axis OA of the optical system 1000.

The first lens 111 may have positive (+) refractive power on the optical axis OA. The first lens 111 may include plastic or glass, for example, may be made of plastic. On the optical axis the first surface S1 of the first lens 111 may have a convex shape, and the second surface S2 may have a concave shape. That is, the first lens 111 may have a meniscus shape that is convex from the optical axis OA toward the object. Alternatively, on the optical axis OA, the first surface S1 may be concave and/or the second surface S2 may be formed as a combination of concave or convex, and may selectively include configurations of the first and second surfaces S1 and S2 of the first embodiment.

The second lens 112 may have positive (+) or negative (−) refractive power on the optical axis OA, for example, positive (+) refractive power. The second lens 112 may include plastic or glass, for example, may be made of plastic. The third surface S3 of the second lens 112 may have a convex shape on the optical axis, and the fourth surface S4 may have a concave shape. That is, the second lens 112 may have a meniscus shape that is convex from the optical axis OA toward the object. Alternatively, on the optical axis OA, the third surface S3 may have a convex or concave shape, and the fourth surface S4 may have a convex or concave shape, and may selectively include configurations of the third and fourth surfaces S3 and S4 of the first embodiment.

The third lens 113 may have positive (+) or negative (−) refractive power on the optical axis OA, for example, negative (−) refractive power. The third lens 113 may include plastic or glass, for example, may be made of plastic. The fifth surface S5 of the third lens 113 may have a convex shape on the optical axis OA, and the sixth surface S6 may have a concave shape. That is, the third lens 113 may have a meniscus shape that is convex from the optical axis OA toward the object. Alternatively, on the optical axis OA, the fifth surface S5 may have a convex or concave shape, and the sixth surface S6 may have a convex or concave shape, and may selectively include configurations of the fifth and sixth surfaces S5 and S6 of the first embodiment.

The first lens group G1 may include the first to third lenses 111, 112, and 113. Among the first to third lenses 111, 112, and 113, the thickness in the optical axis OA, that is, the center thickness of the lens, may be the thinnest for the third lens 113, and the thickest for the first lens 111. Accordingly, the optical system 1000 may control incident light and have improved aberration characteristics and resolution. The center thickness of the first lens 111 may be the thickest among the center thicknesses of the first to tenth lenses 111 to 120. The center thickness of the first lens 111 may be the largest among the center thicknesses of the first to tenth lenses 111 to 120 and the center distance between two adjacent lenses.

Among the first to third lenses 111, 112, and 113, the average effective diameter (clear aperture (CA)) of the lenses may be the smallest for the third lens 113, and the largest for the first lens 111. In detail, the size of the effective diameter of the sixth surface S6 of the third lens 113 is the same as the effective diameter of the seventh surface S7 of the fourth lens 114 or may be the smallest among the effective diameters of the lens surfaces of the plurality of lenses 100A. Accordingly, the optical system 1000 may have improved chromatic aberration control characteristics, and the vignetting characteristics of the optical system 1000 may be improved by controlling incident light.

The refractive index of the third lens 113 may be greater than that of the first and second lenses 111 and 112. The refractive index of the third lens 113 may be greater than 1.6, and the refractive index of the first and second lenses 111 and 112 may be less than 1.6. The third lens 113 may have an Abbe number that is smaller than the Abbe numbers of the first and second lenses 111 and 112. For example, the Abbe number of the third lens 113 may be smaller than the Abbe number of the first and second lenses 111 and 112 by a difference of 20 or more. In detail, the Abbe number of the first and second lenses 111 and 112 may be 30 or more greater than the Abbe number of the third lens 113, for example, 50 or more. Accordingly, the optical system 1000 may have improved chromatic aberration control characteristics.

The fourth lens 114 may have positive (+) or negative (−) refractive power on the optical axis OA, for example, positive (+) refractive power. The fourth lens 114 may include plastic or glass, for example, may be made of plastic. On the optical axis, the seventh surface S7 of the fourth lens 114 may have a concave shape, and the eighth surface S8 may have a convex shape. That is, the fourth lens 114 may have a meniscus shape that is convex from the optical axis OA toward the sensor. Alternatively, the seventh surface S7 may have a convex or concave shape on the optical axis OA, and the eighth surface S8 may have a convex or concave shape on the optical axis OA. That is, the shapes of the seventh and eighth surfaces S7 and S8 of the fourth lens 114 on the optical axis OA may include the configuration disclosed in the first embodiment. The refractive index of the fourth lens 114 may be lower than that of the third lens 113. The fourth lens 114 may have a greater Abbe number than the third lens 113. For example, the Abbe number of the fourth lens 114 may be greater than the Abbe number of the third lens 113 by about 20 or more, for example, 30 or more. Accordingly, the optical system 1000 may have improved chromatic aberration control characteristics.

The fifth lens 115 may have positive (+) or negative (−) refractive power on the optical axis OA, for example, positive (+) refractive power. The fifth lens 115 may include plastic or glass, for example, may be made of plastic. On the optical axis the ninth surface S9 of the fifth lens 115 may have a concave shape, and the tenth surface S10 may have a convex shape. That is, the fifth lens 115 may have a meniscus shape that is convex from the optical axis OA toward the sensor. Alternatively, the ninth surface S9 may have a convex or concave shape on the optical axis OA, and the tenth surface S10 may have a convex or concave shape on the optical axis OA. That is, the shape of the ninth and tenth surfaces S9 and S10 of the fifth lens 115 on the optical axis OA may include the configuration disclosed in the first embodiment.

The sixth lens 116 may have positive (+) or negative (−) refractive power on the optical axis OA, for example, negative (−) refractive power. The sixth lens 116 may include plastic or glass, for example, may be made of plastic. On the optical axis the eleventh surface S11 of the sixth lens 116 may have a concave shape, and the twelfth surface S12 may have a convex shape. That is, the sixth lens 116 may have a meniscus shape that is convex from the optical axis OA toward the sensor. Alternatively, the eleventh surface S11 may have a convex or concave shape, and the twelfth surface S12 may have a concave or convex shape, and may include the configuration disclosed in the first embodiment.

The seventh lens 117 may have positive (+) or negative (−) refractive power on the optical axis OA, for example, negative (−) refractive power. The seventh lens 117 may include plastic or glass, for example, may be made of plastic. On the optical axis the thirteenth surface S13 of the seventh lens 117 may have a convex shape, and the fourteenth surface S14 may have a concave shape. That is, the seventh lens 117 may have a meniscus shape that is convex from the optical axis OA toward the object. Alternatively, the thirteenth surface S13 may have a convex or concave shape on the optical axis OA, and the fourteenth surface S14 may have a convex or concave shape on the optical axis OA, and may include the configuration disclosed in the first embodiment. The seventh lens 117 may include at least one critical point. In detail, at least one or both of the thirteenth surface S13 and the fourteenth surface S14 may include at least one critical point. The critical point of the thirteenth surface S13 may be located at a position greater than 50% of the effective radius of the thirteenth surface S13, for example, in the range of 50% to 60%. The effective radius is a distance from the optical axis OA of the thirteenth surface S13 to the end of the effective region. The critical point of the fourteenth surface S14 may be located at a position greater than 62% of the effective radius of the fourteenth surface S14, for example, in the range of 62% to 72%. The critical point of the fourteenth surface S14 may be located further outside the optical axis OA than the critical point of the thirteenth surface S13. Accordingly, the fourteenth surface S14 may diffuse the light incident through the thirteenth surface S13. The critical point is a point at which the sign of the inclination value with respect to the optical axis OA and the direction perpendicular to the optical axis OA changes from positive (+) to negative (−) or from negative (−) to positive (+), and may mean a point at which the slope value is 0. Additionally, the critical point may be a point where the slope value decreases as it increases, or a point where it decreases and then increases.

The eighth lens 118 may have positive (+) or negative (−) refractive power on the optical axis OA, for example, positive (+) refractive power. The eighth lens 118 may include plastic or glass, for example, may be made of plastic. On the optical axis the fifteenth surface S15 of the eighth lens 118 may have a convex shape, and the sixteenth surface S16 may have a convex shape. That is, the eighth lens 118 may have a shape in which both sides are convex on the optical axis OA. Alternatively, the fifteenth surface S15 may have a convex or concave shape on the optical axis OA, the sixteenth surface S16 may have a concave or convex shape on the optical axis OA, and the fifteenth and sixteenth surfaces S15 and S16 may optionally include the configuration of the first embodiment. Both the fifteenth surface S15 and the sixteenth surface S16 of the eighth lens 118 may be provided without critical points. As another example, the fifteenth surface S15 may have a critical point.

The ninth lens 119 may have positive (+) or negative (−) refractive power on the optical axis OA, for example, negative (−) refractive power. The ninth lens 119 may include plastic or glass, for example, may be made of plastic. On the optical axis, the seventeenth surface S17 of the ninth lens 119 may have a concave shape, and the eighteenth surface S18 may have a convex shape. That is, the ninth lens 119 may have a meniscus shape convex from the optical axis OA toward the sensor. Alternatively, the seventeenth surface S17 may have a convex or concave shape on the optical axis OA, and the eighteenth surface S18 may have a concave or convex shape on the optical axis OA, and may have a meniscus convex shape toward the object or a shape where both sides are concave or convex. At least one of the seventeenth surface S17 and the eighteenth surface S18 of the ninth lens 119 may have at least one critical point. In detail, the critical point of the seventeenth surface S17 may be provided at a position greater than 85% of the effective radius, which is the distance from the optical axis OA to the end of the effective region. The seventeenth and eighteenth surfaces S17 and S18 may be provided without critical points.

The positions of the critical points of the seventh and ninth lenses 117 and 119 are preferably located at positions that satisfy the above-mentioned range in consideration of the optical characteristics of the optical system 1000. In detail, it is desirable that the position of the critical point satisfies the above-mentioned range for controlling optical characteristics such as chromatic aberration, distortion characteristics, aberration characteristics, and resolution of the optical system 1000. Accordingly, the path of light emitted to the image sensor 300 through the lens may be effectively controlled. Accordingly, the optical system 1000 according to the embodiment may have improved optical characteristics not only in the center portion but also in the periphery portion of the FOV.

The tenth lens 120 may have negative refractive power on the optical axis OA. The tenth lens 120 may include plastic or glass, for example, may be provided as a plastic material. On the optical axis, the nineteenth surface S19 of the tenth lens 120 may have a concave shape, and the twentieth surface S20 may have a convex shape. That is, the tenth lens 120 may have a meniscus shape that is convex from the optical axis OA toward the sensor. The nineteenth surface S19 of the tenth lens 120 may have at least one critical point, and the twentieth surface S20 may be provided without a critical point at the distance from the optical axis OA to the end of the effective region, that is, the effective radius r10. The critical point of the nineteenth surface S19 may be located in a range of 80% or more, for example, 80% to 90% of the effective radius of the nineteenth surface S19. As another example, the nineteenth surface S19 may be provided without a critical point. The twentieth surface S20 may be provided without a critical point from the optical axis to the end of the effective region. Here, the center of the twentieth surface S20 is the closest to the image sensor 300, and the distance from the center of the twentieth surface S20 to the image sensor 300 may gradually increase from the optical axis OA toward the end of the effective region.

FIG. 14 is a graph showing a height in the optical axis direction according to a distance in the first direction Y from the object-side nineteenth surface S19 and the sensor-side twentieth surface S20 in the tenth lens 120 of FIG. 9. In the drawing, L10 refers to the tenth lens, L10S1 refers to the nineteenth surface, and L10S2 refers to the twentieth surface. As shown in FIG. 14, it may be seen that the twentieth surface (L10S2) appears in a shape extending along a straight line perpendicular to the center 0 of the twentieth surface (L10S2) to a point where the height in the optical axis direction is 1 mm or less from the optical axis, and it may be seen that there is no critical point. Additionally, it may be seen that the critical point of the nineteenth surface L10S1 exists between 3 mm and 4 mm from the center.

Referring to FIGS. 9 and 14, the twentieth surface S20 of the tenth lens 120 has a negative radius of curvature on the optical axis OA, and may have a slope of a straight line passing from the center of the twentieth surface S20 to a surface of the twentieth surface S20 with respect to a straight line orthogonal to the optical axis OA or the center of the twentieth surface S20, and a distance dP2 from the optical axis OA to a first point P2 having an inclination of less than −1 may be located in a range of 10% or more, for example, in a range of 10% to 30% of the effective radius of the twentieth surface S20. The distance from the optical axis OA to a second point having a slope of less than −2 may be located in the range of 35% or more, for example, 35% to 45% of the effective radius of the twentieth surface S20. Accordingly, the optical axis or paraxial region of the twentieth surface S20 may be provided without a critical point, and a slim optical system may be provided. The slope may be set to be less than 1 or less than 2 as an absolute value. At least one or all of the first to twentieth surfaces S1 to S20 of the plurality of lenses 100A may be aspherical, and the aspheric coefficient of each surface S1 to S20 may be provided as shown in FIG. 11 and may be provided as shown in S1/S2 from lens L1 to L10.

The second lens group G2 may include the fourth to tenth lenses 114, 115, 116, 117, 118, 119, and 120. Among the fourth to tenth lenses 114, 115, 116, 117, 118, 119, and 120, at least one of the sixth, seventh, and tenth lenses 116, 117, and 120 may have the thinnest thickness in the optical axis OA, that is, the center thickness, and the ninth lens 119 may be the thickest. Accordingly, the optical system 1000 may control incident light and have improved aberration characteristics and resolution.

As shown in FIG. 9, L9_CT is the center thickness or optical axis thickness of the ninth lens 119, and L9_ET is the end or edge thickness of the effective region of the ninth lens 119. L10_CT is the center thickness or optical axis thickness of the tenth lens 120, and L10_ET is the end or edge thickness of the effective region of the tenth lens 120. d910_CT is the optical axis distance (i.e., center distance) from the center of the ninth lens 119 to the center of the tenth lens 120. d910_ET is the distance (i.e., edge distance) in the optical axis direction from the edge of the ninth lens 119 to the edge of the tenth lens 120. Back focal length (BFL) is the optical axis distance from the image sensor 300 to the last lens 120. In this way, the center thickness, edge thickness, and center distance and edge distance between two adjacent lenses of the first to tenth lenses 111 to 120 may be set. For example, as shown in FIG. 10, a distance between adjacent lenses may be provided, for example, a first distance d12 between the first and second lenses 111 and 112, a second distance d23 between the second and third lenses 112 and 113, a third distance d34 between the third and fourth lenses 113 and 114, a fourth distance d45 between the fourth and fifth lenses 114 and 115, a fifth distance d56 between the fifth and sixth lenses 115 and 116, a sixth distance d67 between the sixth and seventh lenses 116 and 117, a seventh distance d78 between the seventh and eighth lenses 117 and 118, an eighth distance d89 between the eighth and ninth lenses 118 and 119, and a ninth distance d910 between the ninth and tenth lenses 119 and 120 may be obtained in a region spaced by a predetermined distance (e.g., 0.1 mm) along the first direction Y with respect to the optical axis OA.

Referring to FIGS. 10 and 8, when the first distance d12 has the optical axis OA as its starting point and the end of the effective region of the third surface S3 of the second lens 112 at its end point, the first distance d12 may gradually increase from the optical axis OA toward an end of the first direction Y. The first distance d12 may gradually increase from the optical axis OA to the end of the effective region. The maximum value in the first distance d12 may be 1.5 times or less, for example, in a range of 1.1 to 1.5 times the minimum value. Accordingly, the optical system 1000 may effectively control incident light and improve optical characteristics.

When the second distance d23 has the optical axis OA as its starting point and the end of the effective region of the fifth surface S5 of the third lens 113 as its end point, the second distance d23 may increase from the optical axis OA toward the end point in the first direction Y. The second distance d23 may be minimum at the optical axis OA or the starting point and maximum at the end point. The maximum value of the second distance d23 may be twice or more the minimum value, for example, in a range of 2 to 5 times the minimum value. Accordingly, the optical and aberration characteristics of the optical system 1000 may be improved. The maximum value of the first distance d12 may be three times or more greater than the maximum value of the second distance d23, and the minimum value of the first distance d12 may be greater than the maximum value of the second distance d23.

When the third distance d34 has the optical axis OA as its starting point and the end of the effective region of the sixth surface S6 of the third lens 113 as its the end point in the first direction Y, the third distance d34 may gradually become smaller as it moves from the optical axis OA toward the end point of the first direction Y. That is, the third distance d34 may have a maximum value at the optical axis OA and a minimum value around the end point. The maximum value may be 3 times or more, for example, in a range of 3 to 5 times the minimum value. The maximum value of the third distance d34 may be 3 times or more, for example, in a range of 3 to 7 times the maximum value of the second distance d23, and the minimum value may be greater than the minimum value of the second distance d23. Accordingly, the optical system 1000 may have improved optical and chromatic aberration characteristics and may control vignetting characteristics.

When the fourth distance d45 has the optical axis OA as the starting point and the end of the effective region of the eighth surface S8 of the fourth lens 114 as an end point, the fourth distance d45 may be increased and decreased again in the first direction Y from the start point to the end point. The minimum value of the fourth distance d45 may be located at the end of the effective region, and the maximum value may be located between the region around the optical axis OA and around the end. The fourth distance d45 may gradually increase toward the optical axis OA from the position of the minimum value, and may gradually decrease towards the end point from the position of the maximum value. Here, the fourth distance d45 may be larger at the optical axis OA than at the end point. The fourth distance d45 may be in the range of 0.03 mm to 0.15 mm. The maximum value of the fourth distance d45 may be smaller than the minimum value of the third distance d34 and may be smaller than the maximum value of the third distance d34. Accordingly, the optical system 1000 may have good optical performance in the center and periphery portions of the FOV, and may control improved chromatic aberration and distortion aberration.

When the optical axis OA is the starting point and the end of the effective region of the tenth surface S10 of the fifth lens 115 is the ending point, the fifth distance d56 may change from the optical axis OA toward a vertical first direction Y. The maximum value of the fifth distance d56 may be located at the end of the effective region, and the minimum value may be located at 40% or more of the distance from the optical axis OA to the end point, for example, in the range of 40% to 60%. The maximum value of the fifth distance d56 may be 3 times or more, for example, in a rage of 3 to 5 times the minimum value. The minimum value of the fifth distance d56 may be smaller than the minimum value of the third distance d34, and the maximum value may be smaller than the minimum value of the third distance d34.

When the sixth distance d67 has the optical axis OA as the starting point and the end of the effective region of the twelfth surface S12 of the sixth lens 116 as the end point, the minimum value of the sixth distance d67 is located at the optical axis OA, the maximum value is located at the end, and may gradually increase from the minimum value to the maximum value. The maximum value of the sixth distance d67 may be 10 times or more, for example, in a range of 10 to 20 times the minimum value. The maximum value of the sixth distance d67 may be less than the maximum value of the third distance d34, and the minimum value may be less than the minimum value of the third distance d34.

When the seventh distance d78 has the optical axis OA as the starting point and the end of the effective region of the fourteenth surface S14 of the seventh lens 117 as the end point, the minimum value of the sixth distance d78 is located at the end of the effective region, the maximum value is located at the optical axis, and may gradually increase from the minimum value to the maximum value. The maximum value of the seventh distance d78 may be 1.5 times or more, for example, in a range of 1.5 to 3 times the minimum value. Accordingly, the optical system 1000 may have improved optical characteristics at the center and periphery portions of the FOV, may have improved aberration control characteristics, and may appropriately control the size of the effective diameter of the tenth lens 120.

When eighth distance d89 has the optical axis OA as the starting point and the end point of the effective region of the sixteenth surface S16 of the eighth lens 118 as the end point, the minimum value of the eighth distance d89 is located at the optical axis, the maximum value is located at the end of the effective region, and may gradually increase from the minimum value to the maximum value. The maximum value of the eighth distance d89 may be 3 times or more, for example, in a range of 3 to 10 times the minimum value. Aberration control characteristics may be improved by the eighth distance d89, and the size of the effective diameter of the tenth lens 120 may be appropriately controlled.

When the ninth distance d910 has the optical axis OA as the starting point and the end point of the effective region of the eighteenth surface S18 of the ninth lens 119 as the end point, the minimum value of the ninth distance d910 may be arranged in a range of 65% or more, for example, in a range of 65% to 85% of the distance from the optical axis to the end of the effective region, and the maximum value may be located at the optical axis OA. The maximum value of the ninth distance d910 may be 5 times or more, for example, in a range of 5 to 15 times the minimum value. Accordingly, the optical system 1000 may have improved optical characteristics in the center and periphery portions of the FOV. In addition, the optical system 1000 may improve the distortion and aberration characteristics of the periphery portion of the FOV as the ninth lens 119 and the tenth lens 110 are spaced apart at the ninth distance d910 set according to the position.

The lens with the thickest center thickness in the first lens group G1 may be thicker than the lens with the thickest center thickness in the second lens group G2. Among the first to tenth lenses 111 to 120, the maximum center thickness may be greater than the maximum center distance, for example, 1.2 times or more or in the range of 1.2 to 2 times the maximum center distance. For example, the center thickness of the first lens 111 is the largest among the lenses, and the center distance d910 between the ninth lens 119 and the tenth lens 120 is the largest among the distances between the lenses. The maximum thickness of the center of the first lens 111 may be 1.2 times or more, for example, in a range of 1.2 to 2 times the center distance between the ninth and tenth lenses 119 and 120.

Among the fourth to tenth lenses 114, 115, 116, 117, 118, 119, and 120, the average effective diameter (clear aperture (CA) of the lenses may be the smallest for the fourth lens 114, and the largest for the tenth lens 120. In detail, in the second lens group G2, the effective diameter of the seventh surface S7 of the fourth lens 114 may be the smallest, and the effective diameter of the twentieth surface S20 may be the largest. Among the plurality of lenses 100A, the effective diameter of the twentieth surface S20 may be 2.5 times or more, for example, in a range of 2.5 to 4 times the effective diameter of the sixth surface S6. Among the plurality of lenses 100A, the average effective diameter of the tenth lens S10 may be 2.5 times or more, for example, in a range of 2.5 to 4 times the average effective diameter of the third lens 113. The average effective diameter of the tenth lens 120 is the largest, so that it may effectively refract incident light toward the image sensor 300. Accordingly, the optical system 1000 may have improved chromatic aberration control characteristics, and the vignetting characteristics of the optical system 1000 may be improved by controlling incident light.

Among the lenses 111 to 120, the maximum center thickness may be 3 times or more, for example, in a range of 3 to 4 times the minimum center thickness. The first lens 111 having the maximum center thickness may be 3 times or more, for example, in a range of 3 to 4 times the range of the sixth, seventh, or tenth lenses 116, 117, and 120 having the minimum center thickness.

The refractive index of the ninth lens 119 may be greater than that of the eighth and tenth lenses 118 and 120. The refractive index of the ninth lens 119 may be greater than 1.6, and the refractive index of the eighth and tenth lenses 118 and 120 may be less than 1.6. The ninth lens 119 may have an Abbe number that is smaller than the Abbe numbers of the eighth and tenth lenses 118 and 120. For example, the Abbe number of the ninth lens 119 may be small and has a difference of 5 or more from the Abbe number of the tenth lens 120. In detail, since the Abbe number of the tenth lens 120 is greater than the Abbe number of the eighth and ninth lenses 118 and 119, the optical system 1000 may have improved chromatic aberration control characteristics. In the second lens group G2, the number of lenses with a refractive index exceeding 1.6 may be equal to the number of lenses with a refractive index of less than 1.6. In the second lens group G2, the number of lenses with an Abbe number exceeding 50 may be smaller than the number of lenses with an Abbe number of less than 50.

Among the plurality of lenses 100A, the number of lenses with a center thickness of less than 0.5 mm may be greater than the number of lenses with a center thickness of 0.5 mm or more. Among the plurality of lenses 100A, the number of lenses smaller than 0.5 mm may be 60% or more of the total number of lenses. Accordingly, the optical system 1000 may be provided in a structure with a slim thickness. Among the plurality of lens surfaces S1 to S20, lens surfaces with an effective radius of less than 1 mm may be disposed between the first surface S1 of the first lens 111 and the twelfth surface S12 of the sixth lens 116.

When the radius of curvature is explained as an absolute value, the radius of curvature of the twentieth surface S20 of the tenth lens 120 among the plurality of lenses 100A may be the largest among the lens surfaces, and may be the radius of curvature of the twentieth surface S20 of the tenth lens 120 may be 35 times or more, for example, in a range of 35 to 55 times the radius of curvature of the first surface S1 of the first lens 111 or the nineteenth surface S19 of the tenth lens 120. If the focal length is described as an absolute value, the focal length of the fifth lens 115 among the plurality of lenses 100 may be the largest among the lenses, and may be 10 times or more, for example, in a range of 10 times to 25 times the focal length of the tenth lens 120.

Table 2 is an example of lens data of the optical system of FIG. 8.

TABLE 2

| Lens | Surface | Radius (mm) of curvature | Thickness (mm)/ Distance (mm) | Refractive index | Abbe number | Effective diameter (mm) |
|---|---|---|---|---|---|---|
| Lens 1 | S1 | 2.689 | 1.078 | 1.536 | 55.699 | 4.200 |
| | S2 | 10.762 | 0.154 | | | 3.967 |
| Lens 2 | S3 (Stop) | 8.061 | 0.409 | 1.536 | 55.699 | 3.756 |
| | S4 | 16.451 | 0.030 | | | 3.539 |
| Lens 3 | S5 | 5.826 | 0.308 | 1.678 | 19.230 | 3.412 |
| | S6 | 3.591 | 0.571 | | | 3.036 |
| Lens 4 | S7 | −8.831 | 0.429 | 1.536 | 55.699 | 3.088 |
| | S8 | −6.026 | 0.090 | | | 3.339 |
| Lens 5 | S9 | −7.764 | 0.357 | 1.678 | 19.230 | 3.376 |
| | S10 | −6.786 | 0.036 | | | 3.738 |
| Lens 6 | S11 | −6.720 | 0.300 | 1.678 | 19.230 | 3.799 |
| | S12 | −8.169 | 0.030 | | | 4.169 |
| Lens 7 | S13 | 8.317 | 0.300 | 1.678 | 19.230 | 4.617 |
| | S14 | 5.999 | 0.575 | | | 5.548 |
| Lens 8 | S15 | 53.597 | 0.554 | 1.600 | 29.289 | 6.380 |
| | S16 | −4.167 | 0.056 | | | 6.806 |
| Lens 9 | S17 | −14.897 | 0.863 | 1.621 | 24.146 | 7.461 |
| | S18 | −28.237 | 0.672 | | | 7.829 |
| Lens 10 | S19 | −2.333 | 0.300 | 1.579 | 31.523 | 8.369 |
| | S20 | −100.00 | 0.030 | | | 9.003 |
| Filter | | Infinity | 0.110 | | | 9.505 |
| | | Infinity | 0.751 | | | 9.547 |
| Image sensor | | Infinity | 0.000 | | | 10.00 |

Table 2 shows the radius of curvature, the thickness of the lens, the distance between lenses on the optical axis OA of the first to tenth lenses 111 to 120 of FIG. 1, the refractive index at d-line, Abbe Number, and effective diameter (clear aperture (CA)).

As shown in FIG. 11, in the second embodiment, at least one lens surface among the plurality of lenses 100 may include an aspherical surface with a 30th order aspherical coefficient. For example, the first to tenth lenses 111 to 120 may include a lens surface having a 30th order aspherical coefficient. As described above, an aspheric surface with a 30th order aspherical coefficient (a value other than "0") may particularly significantly change the aspheric shape of the periphery portion, so the optical performance of the periphery portion of the FOV may be well corrected.

FIG. 12 is a graph of the diffraction MTF characteristics of the optical system 1000 according to the second embodiment, and FIG. 13 is a graph of the aberration characteristics. The aberration graph in FIG. 13 is a graph measuring spherical aberration, astigmatic field curves, and distortion from left to right. In FIG. 13, X-axis may represent focal length (mm) and distortion (%), and Y-axis may represent the height of the image. Additionally, the graph for spherical aberration is a graph for light in the approximately 470 nm, approximately 510 nm, approximately 555 nm, approximately 610 nm, and approximately 660 nm wavelength bands, and the graph for astigmatism and distortion aberration is a graph for light in the approximately 555 nm wavelength band.

In the aberration diagram of FIG. 13, it may be interpreted that the closer each curve is to the Y-axis, the better the aberration correction function. Referring to FIG. 13, it may be seen that measurement values of the optical system 1000 according to an embodiment are adjacent to the Y-axis in most regions. That is, the optical system 1000 according to an embodiment may have improved resolution and may have good optical performance not only at the center portion but also at the periphery portion of the FOV.

Third Embodiment

Figure 19:
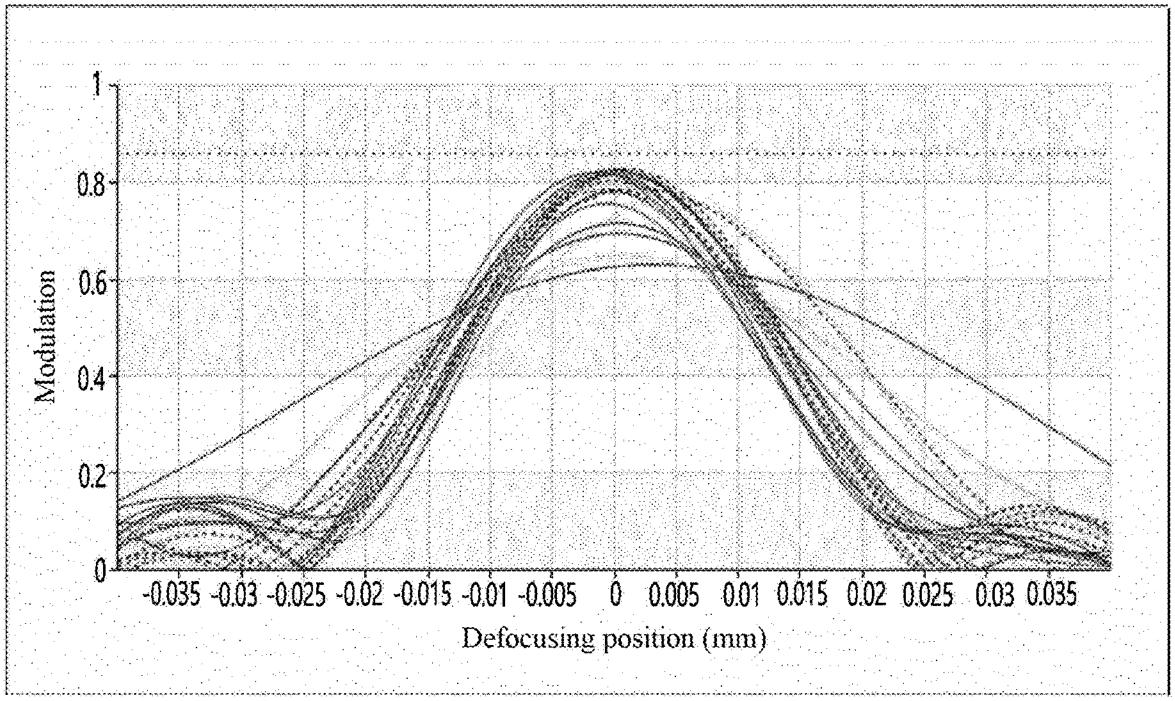
FIG. 19 is a graph of the diffraction MTF of the optical system of FIG. 15.
Figure 20:
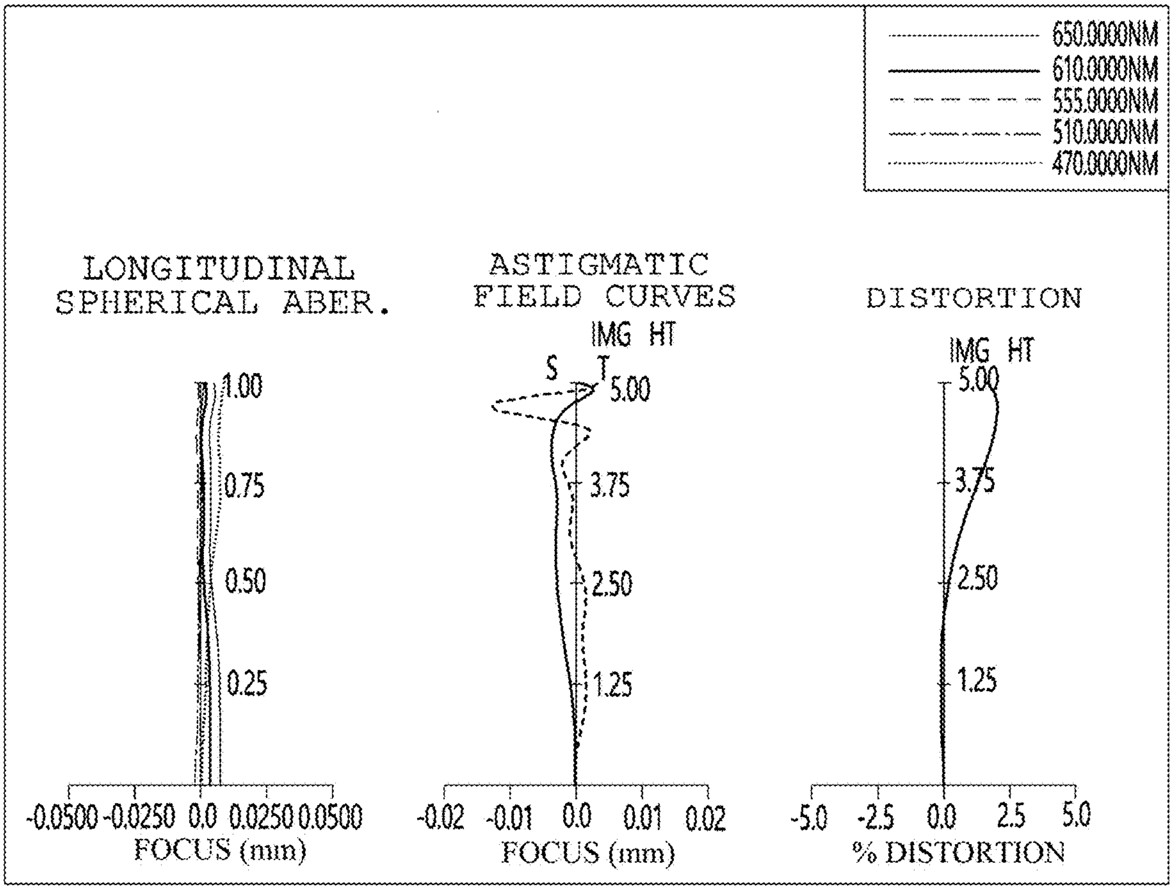
FIG. 20 is a graph showing the aberration characteristics of the optical system of FIG. 15.
Figure 21:
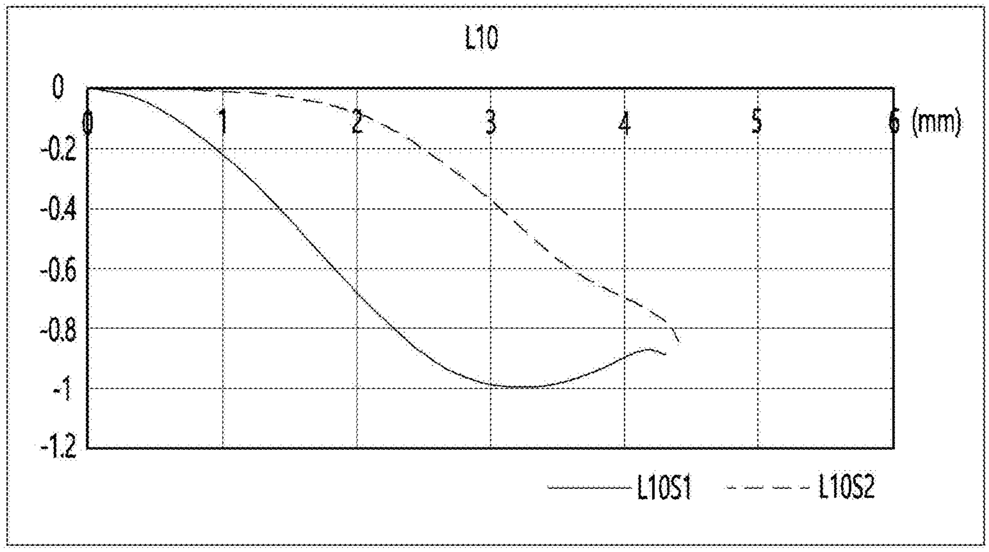
FIG. 21 is a graph showing a height in an optical axis direction according to a distance in a first direction Y of an object-side surface and a sensor-side surface in an n-th lens of the optical system of FIG. 16.

FIG. 15 is a configuration diagram of an optical system according to a third embodiment, FIG. 16 is an explanatory diagram showing a relationship between the image sensor, the n-th lens, and the n−1-th lens in the optical system of FIG. 15, FIG. 17 is a diagram showing data of distances between two adjacent lenses in the optical system of FIG. 15, FIG. 18 is a diagram showing data of an aspheric coefficient of each lens surface in the optical system of FIG. 15, FIG. 19 is a graph of the diffraction MTF of the optical system of FIG. 15, FIG. 20 is a graph showing the aberration characteristics of the optical system of FIG. 15, and FIG. 21 is a graph showing a height in an optical axis direction according to a distance in a first direction Y of an object-side surface and a sensor-side surface in an n-th lens of the optical system of FIG. 16.

Referring to FIGS. 15 and 16, the optical system 1000 according to the third embodiment includes a plurality of lenses 100B, and the plurality of lenses 100B may include the first lens 121 to the tenth lens 130. The first to tenth lenses 121 to 130 may be sequentially arranged along the optical axis OA of the optical system 1000.

The first lens 121 may have positive (+) refractive power on the optical axis OA. The first lens 121 may include plastic or glass, for example, may be made of plastic. On the optical axis, the first surface S1 of the first lens 121 may have a convex shape, and the second surface S2 may have a concave shape. That is, the first lens 121 may have a meniscus shape that is convex from the optical axis OA toward the object. Alternatively, on the optical axis OA, the first surface S1 may be concave and/or the second surface S2 may be formed as a combination of concave or convex, and may selectively include configurations of the first and second surfaces S1 and S2 of the first embodiment.

The second lens 122 may have positive (+) or negative (−) refractive power on the optical axis OA, for example, positive (+) refractive power. The second lens 122 may include plastic or glass, for example, may be made of plastic. The third surface S3 of the second lens 122 may be convex on the optical axis, and the fourth surface S4 may be concave. That is, the second lens 122 may have a meniscus shape that is convex from the optical axis OA toward the object. Alternatively, on the optical axis OA, the third surface S3 may have a convex or concave shape, and the fourth surface S4 may have a convex or concave shape, and may selectively include configurations of the third and fourth surfaces S3 and S4 of the first embodiment.

The third lens 123 may have positive (+) or negative (−) refractive power on the optical axis OA, for example, negative (−) refractive power. The third lens 123 may include plastic or glass, for example, may be made of plastic. The fifth surface S5 of the third lens 123 may have a convex shape on the optical axis OA, and the sixth surface S6 may have a concave shape. That is, the third lens 123 may have a meniscus shape that is convex from the optical axis OA toward the object. Alternatively, on the optical axis OA, the fifth surface S5 may have a convex or concave shape, and the sixth surface S6 may have a convex or concave shape, and may selectively include configurations of the fifth and sixth surfaces S5 and S6 of the first embodiment.

The first lens group G1 may include the first to third lenses 121, 122, and 123. Among the first to third lenses 121, 122, and 123, the thickness in the optical axis OA, that is, the center thickness of the lens, may be the thinnest for the third lens 123, and the thickest for the first lens 121. Accordingly, the optical system 1000 may control incident light and have improved aberration characteristics and resolution. The center thickness of the first lens 121 may be the thickest among the center thicknesses of the first to tenth lenses 121 to 130. The center thickness of the first lens 121 may be the largest among the center thicknesses of the first to tenth lenses 121 to 130 and the center distance between two adjacent lenses.

Among the first to third lenses 121, 122, and 123, the average effective diameter (clear aperture (CA)) of the lenses may be the smallest for the third lens 123, and the largest for the first lens 121. In detail, the size of the effective diameter of the sixth surface S6 of the third lens 123 is the same as the effective diameter of the seventh surface S7 of the fourth lens 124 or may be the smallest among the effective diameters of the lens surfaces of the plurality of lenses 100B. Accordingly, the optical system 1000 may have improved chromatic aberration control characteristics, and the vignetting characteristics of the optical system 1000 may be improved by controlling incident light.

The refractive index of the third lens 123 may be greater than that of the first and second lenses 121 and 122. The refractive index of the third lens 123 may be greater than 1.6, and the refractive index of the first and second lenses 121 and 122 may be less than 1.6. The third lens 123 may have an Abbe number that is smaller than the Abbe numbers of the first and second lenses 121 and 122. For example, the Abbe number of the third lens 123 may be smaller than the Abbe number of the first and second lenses 121 and 122 by a difference of 20 or more. In detail, the Abbe number of the first and second lenses 121 and 122 may be 30 or more greater than the Abbe number of the third lens 123, for example, 50 or more. Accordingly, the optical system 1000 may have improved chromatic aberration control characteristics.

The fourth lens 124 may have positive (+) or negative (−) refractive power on the optical axis OA, for example, positive (+) refractive power. The fourth lens 124 may include plastic or glass, for example, may be made of plastic. On the optical axis, the seventh surface S7 of the fourth lens 124 may have a concave shape, and the eighth surface S8 may have a convex shape. That is, the fourth lens 124 may have a meniscus shape that is convex from the optical axis OA toward the sensor. Alternatively, the seventh surface S7 may have a convex or concave shape on the optical axis OA, and the eighth surface S8 may have a convex or concave shape on the optical axis OA. That is, the shapes of the seventh and eighth surfaces S7 and S8 of the fourth lens 124 on the optical axis OA may include the configuration disclosed in the first embodiment. The refractive index of the fourth lens 124 may be lower than that of the third lens 123. The fourth lens 124 may have a greater Abbe number than the third lens 123. For example, the Abbe number of the fourth lens 124 may be greater than the Abbe number of the third lens 123 by about 20 or more, for example, 30 or more. Accordingly, the optical system 1000 may have improved chromatic aberration control characteristics.

The fifth lens 125 may have positive (+) or negative (−) refractive power on the optical axis OA, for example, positive (+) refractive power. The fifth lens 125 may include plastic or glass, for example, may be made of plastic. On the optical axis, the ninth surface S9 of the fifth lens 125 may have a concave shape, and the tenth surface S10 may have a convex shape. That is, the fifth lens 125 may have a meniscus shape that is convex from the optical axis OA toward the sensor. Alternatively, the ninth surface S9 may have a convex or concave shape on the optical axis OA, and the tenth surface S10 may have a convex or concave shape on the optical axis OA. That is, the shapes of the ninth and tenth surfaces S9 and S10 of the fifth lens 125 on the optical axis OA may include the configuration disclosed in the first embodiment.

The sixth lens 126 may have positive (+) or negative (−) refractive power on the optical axis OA, for example, negative (−) refractive power. The sixth lens 126 may include plastic or glass, for example, may be made of plastic. On the optical axis, the eleventh surface S11 of the sixth lens 126 may have a concave shape, and the twelfth surface S12 may have a convex shape. That is, the sixth lens 126 may have a meniscus shape that is convex from the optical axis OA toward the sensor. Alternatively, the eleventh surface S11 may have a convex or concave shape, and the twelfth surface S12 may have a concave or convex shape, and may include the configuration disclosed in the first embodiment.

The seventh lens 127 may have positive (+) or negative (−) refractive power on the optical axis OA, for example, negative (−) refractive power. The seventh lens 127 may include plastic or glass, for example, may be made of plastic. On the optical axis, the thirteenth surface S13 of the seventh lens 127 may have a convex shape, and the fourteenth surface S14 may have a concave shape. That is, the seventh lens 127 may have a meniscus shape that is convex from the optical axis OA toward the object. Alternatively, the thirteenth surface S13 may have a convex or concave shape on the optical axis OA, the fourteenth surface S14 may have a convex or concave shape on the optical axis OA, and may include the configuration disclosed in the first embodiment.

The seventh lens 127 may include at least one critical point. In detail, at least one or both of the thirteenth surface S13 and the fourteenth surface S14 may include at least one critical point. The critical point of the thirteenth surface S13 may be located at a position greater than 50% of the effective radius of the thirteenth surface S13, for example, in the range of 50% to 60%. The effective radius is the distance from the optical axis OA of the thirteenth surface S13 to the end of the effective region. The critical point of the fourteenth surface S14 may be located at a position greater than 62% of the effective radius of the fourteenth surface S14, for example, in the range of 62% to 72%. The critical point of the fourteenth surface S14 may be located further outside the optical axis OA than the critical point of the thirteenth surface S13. Accordingly, the fourteenth surface S14 may diffuse the light incident through the thirteenth surface S13. The critical point is a point at which the sign of the inclination value with respect to the optical axis OA and the direction perpendicular to the optical axis OA changes from positive (+) to negative (−) or from negative (−) to positive (+), and may mean a point at which the slope value is 0. Additionally, the critical point may be a point where the slope value decreases as it increases, or a point where it decreases and then increases.

The eighth lens 128 may have positive (+) or negative (−) refractive power on the optical axis OA, for example, positive (+) refractive power. The eighth lens 128 may include plastic or glass, for example, may be made of plastic. On the optical axis, the fifteenth surface S15 of the eighth lens 128 may have a convex shape, and the sixteenth surface S16 may have a convex shape. That is, the eighth lens 128 may have a shape in which both sides are convex on the optical axis OA. Alternatively, the fifteenth surface S15 may have a convex or concave shape on the optical axis OA, the sixteenth surface S16 may have a concave or convex shape on the optical axis OA, and the fifteenth surface S15 and the sixteenth surface S16 may optionally include the configuration of the first embodiment. The fifteenth surface S15 and the sixteenth surface S16 of the eighth lens 128 may be provided without a critical point from the optical axis to the end of the effective region. As another example, the fifteenth surface S15 may have a critical point in the region from the optical axis to the end of the effective region.

The ninth lens 129 may have positive (+) or negative (−) refractive power on the optical axis OA, for example, negative (−) refractive power. The ninth lens 129 may include plastic or glass, for example, may be made of plastic. On the optical axis, the seventeenth surface S17 of the ninth lens 129 may have a concave shape, and the eighteenth surface S18 may have a convex shape. That is, the ninth lens 129 may have a meniscus shape that is convex from the optical axis OA toward the sensor. Alternatively, the seventeenth surface S17 may have a convex or concave shape on the optical axis OA, the eighteenth surface S18 may have a concave or convex shape on the optical axis OA, or may have a concave meniscus shape toward the object or a shape where both sides are concave or convex. The seventeenth surface S17 and the eighteenth surface S18 may be provided without a critical point from the optical axis OA to the end of the effective region.

The position of the critical point of the seventh lens 127 is preferably disposed at a position that satisfies the above-mentioned range in consideration of the optical characteristics of the optical system 1000. In detail, it is desirable that the position of the critical point satisfies the above-mentioned range for controlling optical characteristics such as chromatic aberration, distortion characteristics, aberration characteristics, and resolution of the optical system 1000. Accordingly, the path of light emitted to the image sensor 300 through the lens may be effectively controlled. Accordingly, the optical system 1000 according to the embodiment may have improved optical characteristics not only in the center portion but also in the periphery portion of the FOV.

The tenth lens 130 may have negative refractive power on the optical axis OA. The tenth lens 130 may include plastic or glass, for example, may be provided as a plastic material. On the optical axis, the nineteenth surface S19 of the tenth lens 130 may have a concave shape, and the twentieth surface S20 may have a convex shape. That is, the tenth lens 130 may have a meniscus shape convex from the optical axis OA toward the sensor. The nineteenth surface S19 of the tenth lens 130 may have at least one critical point, and the twentieth surface S20 may have no critical point. The critical point of the nineteenth surface S19 may be located in a range of 65% or more, for example, 65% to 80% of the effective radius of the nineteenth surface S19. As another example, the nineteenth surface S19 may be provided without a critical point. The twentieth surface S20 may be provided without a critical point from the optical axis to the end of the effective region. Here, in the twentieth surface S20, the center of the twentieth surface S20 is the closest to the distance of the image sensor 300, and the distance from the image sensor 300 may gradually decrease from the optical axis OA to the end of the effective region.

FIG. 21 is a graph showing a height in the optical axis direction according to a distance in the first direction Y from the object-side nineteenth surface S19 and the sensor-side twentieth surface S20 in the tenth lens 120 of FIG. 16. In the drawing, L10 means the tenth lens, L10S1 means the nineteenth surface, and L10S2 means the twentieth surface. As shown in FIG. 21, the twentieth surface (L10S2) appears in a shape extending along a straight line perpendicular to the center 0 of the twentieth surface (L10S2) to a point where the height in the optical axis direction is 1 mm or less from the optical axis, and it may be seen that there is no critical point. In addition, in the nineteenth surface L10S1, it may be seen that the critical point exists between 3 mm and 4 mm from the center 0, and there may be or may not be a critical point in the region after the effective radius, but is not limited thereto.

Referring to FIGS. 16 and 21, the twentieth surface S20 of the tenth lens 120 has a negative radius of curvature on the optical axis OA, and may have a slope of a straight line passing from the center of the twentieth surface S20 to a surface of the twentieth surface S20 with respect to a straight line orthogonal to the optical axis OA or the center of the twentieth surface S20, and a distance dP2 from the optical axis OA to a first point P2 having an inclination of less than −1 may be located in a range of 10% or more, for example, in a range of 10% to 30% of the effective radius of the twentieth surface S20. The distance from the optical axis OA to a second point having a slope of less than −2 may be located in the range of 35% or more, for example, 35% to 48% of the effective radius of the twentieth surface S20. Accordingly, the optical axis or paraxial region of the twentieth surface S20 may be provided without a critical point, and a slim optical system may be provided. The first and second points of the slope may be set to an absolute value of less than 1 or less than 2. Accordingly, the optical axis or paraxial region of the twentieth surface S20 may be provided without a critical point, and a slim optical system may be provided.

At least one or all of the first to twentieth surfaces S1 to S20 of the plurality of lenses 100B may be aspherical, and the aspheric coefficient of each surface S1 to S20 may be provided as shown in FIG. 18 and may be provided as shown in S1/S2 from lens L1 to L10.

The second lens group G2 may include the fourth to tenth lenses 124, 125, 126, 127, 128, 129, and 130. Among the fourth to tenth lenses 124, 125, 126, 127, 128, 129, and 130, at least one of the sixth, seventh, and tenth lenses 126, 127, and 130 may have the thinnest thickness in the optical axis OA, that is, the center thickness, and the ninth lens 129 may be the thickest. Accordingly, the optical system 1000 may control incident light and have improved aberration characteristics and resolution.

As shown in FIG. 16, L9_CT is the center thickness or optical axis thickness of the ninth lens 129, and L9_ET is the end or edge thickness of the effective region of the ninth lens 129. L10_CT is the center thickness or optical axis thickness of the tenth lens 130, and L10_ET is the end or edge thickness of the effective region of the tenth lens 130. d910_CT is the optical axis distance (i.e., center distance) from the center of the ninth lens 119 to the center of the tenth lens 130. d910_ET is the distance (i.e., edge distance) in the optical axis direction from the edge of the ninth lens 119 to the edge of the tenth lens 120. Back focal length (BFL) is the optical axis distance from the image sensor 300 to the last lens 130. In this way, the center thickness, edge thickness, and center distance and edge distance between two adjacent lenses of the first to tenth lenses 121 to 130 may be set. For example, as shown in FIG. 17, a distance between adjacent lenses may be provided, for example, a first distance d12 between the first and second lenses 121 and 122, a second distance d23 between the second and third lenses 122 and 123, a third distance d34 between the third and fourth lenses 123 and 124, a fourth distance d45 between the fourth and fifth lenses 124 and 125, a fifth distance d56 between the fifth and sixth lenses 125 and 126, a sixth distance d67 between the sixth and seventh lenses 126 and 127, a seventh distance d78 between the seventh and eighth lenses 127 and 128, an eighth distance d89 between the eighth and ninth lenses 128 and 129, and a ninth distance d910 between the ninth and tenth lenses 129 and 130 may be obtained in a region spaced by a predetermined distance (e.g., 0.1 mm) along the first direction Y with respect to the optical axis OA.

Referring to FIGS. 17 and 15, when the first distance d12 has the optical axis OA as its starting point and the end of the effective region of the third surface S3 of the second lens 122 at its end point, the first distance d12 may gradually increase from the optical axis OA toward an end of the first direction Y. The first distance d12 may gradually increase from the optical axis OA to the end of the effective region. The maximum value in the first distance d12 may be 1.5 times or less, for example, in a range of 1.1 to 1.5 times the minimum value. Accordingly, the optical system 1000 may effectively control incident light and improve optical characteristics.

When the second distance d23 has the optical axis OA as its starting point and the end of the effective region of the fifth surface S5 of the third lens 123 as its end point, the second distance d23 may increase from the optical axis OA toward the end point in the first direction Y. The second distance d23 may be minimum at the optical axis OA or the starting point and maximum at the end point. The maximum value of the second distance d23 may be twice or more the minimum value, for example, in a range of 2 to 5 times the minimum value. Accordingly, the optical and aberration characteristics of the optical system 1000 may be improved. The maximum value of the first distance d12 may be three times or more greater than the maximum value of the second distance d23, and the minimum value of the first distance d12 may be greater than the maximum value of the second distance d23.

When the third distance d34 has the optical axis OA as its starting point and the end of the effective region of the sixth surface S6 of the third lens 123 as its the end point in the first direction Y, the third distance d34 may gradually become smaller as it moves from the optical axis OA toward the end point of the first direction Y. That is, the third distance d34 may have a maximum value at the optical axis OA and a minimum value around the end point. The maximum value may be 5 times or more, for example, in a range of 5 to 10 times the minimum value. The maximum value of the third distance d34 may be 3 times or more, for example, in a range of 3 to 7 times the maximum value of the second distance d23, and the minimum value may be greater than the minimum value of the second distance d23. Accordingly, the optical system 1000 may have improved optical and chromatic aberration characteristics and may control vignetting characteristics.

When the fourth distance d45 has the optical axis OA as the starting point and the end of the effective region of the eighth surface S8 of the fourth lens 124 as an end point, the fourth distance d45 may be increased and decreased again in the first direction Y from the start point to the end point. The minimum value of the fourth distance d45 may be located at the end of the effective region, and the maximum value may be located between the region around the optical axis OA and around the end. The fourth distance d45 may gradually increase toward the optical axis OA from the position of the minimum value, and may gradually decrease towards the end point from the position of the maximum value. Here, the fourth distance d45 may be larger at the optical axis OA than at the end point. The fourth distance d45 may be in the range of 0.03 mm to 0.15 mm. The maximum value of the fourth distance d45 may be smaller than the minimum value of the third distance d34 and may be smaller than the maximum value of the third distance d34. Accordingly, the optical system 1000 may have good optical performance in the center and periphery portions of the FOV, and may control improved chromatic aberration and distortion aberration.

When the optical axis OA is the starting point and the end of the effective region of the tenth surface S10 of the fifth lens 125 is the ending point, the fifth distance d56 may change from the optical axis OA toward a vertical first direction Y. The maximum value of the fifth distance d56 may be located at the end of the effective region, and the minimum value may be located in a range of 0% or more, for example, in a range of 0% to 60% of the distance from the optical axis OA to the end point. The maximum value of the fifth distance d56 may be 3 times or more, for example, 3 to 5 times the minimum value. The minimum value of the fifth distance d56 may be smaller than the minimum value of the third distance d34, and the maximum value may be greater than the minimum value of the third distance d34.

When the sixth distance d67 has the optical axis OA as the starting point and the end of the effective region of the twelfth surface S12 of the sixth lens 126 as the end point, the minimum value of the sixth distance d67 is located at the optical axis OA, the maximum value is located at the end, and may gradually increase from the minimum value to the maximum value. The maximum value of the sixth distance d67 may be 3 times or more, for example, 3 to 5 times the minimum value. The maximum value of the sixth distance d67 may be less than the maximum value of the third distance d34, and the minimum value may be greater than the minimum value of the third distance d34.

When the seventh distance d78 has the optical axis OA as the starting point and the end of the effective region of the fourteenth surface S14 of the seventh lens 127 as the end point, the minimum value of the sixth distance d78 is located at the end of the effective region, the maximum value is located at the optical axis, and may gradually increase from the minimum value to the maximum value. The maximum value of the seventh distance d78 may be 1.5 times or more, for example, 1.5 to 3 times the minimum value. Accordingly, the optical system 1000 may have improved optical characteristics in the center and periphery portions of the FOV, may have improved aberration control characteristics, and may appropriately control the size of the effective diameter of the tenth lens 130.

When eighth distance d89 has the optical axis OA as the starting point and the end point of the effective region of the sixteenth surface S16 of the eighth lens 128 as the end point, the minimum value of the eighth distance d89 is located at the optical axis, the maximum value is located in the range of 70% to 90% of the distance to the end of the effective region, and may gradually increase from the minimum value to the maximum value. The maximum value of the eighth distance d89 may be 3 times or more, for example, 3 to 10 times the minimum value. Aberration control characteristics may be improved by the eighth distance d89, and the size of the effective diameter of the tenth lens 130 may be appropriately controlled.

When the ninth distance d910 has the optical axis OA as the starting point and the end point of the effective region of the eighteenth surface S18 of the ninth lens 129 as the end point, the minimum value of the ninth distance d910 may be arranged in a range of 65% or more, for example, in a range of 65% to 85% of the distance from the optical axis to the end of the effective region, and the maximum value may be located at the optical axis OA. The maximum value of the ninth distance d910 may be 10 times or more, for example, 10 to 25 times the minimum value. Accordingly, the optical system 1000 may have improved optical characteristics in the center and periphery portions of the FOV. In addition, the optical system 1000 may improve the distortion and aberration characteristics of the periphery portion of the FOV as the ninth lens 129 and the tenth lens 130 are spaced apart at a ninth distance d910 set according to the position.

The lens with the thickest center thickness in the first lens group G1 may be thicker than the lens with the thickest center thickness in the second lens group G2. Among the first to tenth lenses 121 to 130, the maximum center thickness may be greater than the maximum center distance, for example, 1.2 times or more or in the range of 1.2 to 2 times the maximum center distance. For example, the center thickness of the first lens 121 is the largest among the lenses, and the center distance d910 between the ninth lens 129 and the tenth lens 130 is the largest among the distances between the lenses. The maximum thickness of the center of the first lens 121 may be 1.2 times or more, for example, 1.2 to 2 times the center distance between the ninth and tenth lenses 129 and 130.

Among the fourth to tenth lenses 124, 125, 126, 127, 128, 129, and 130, the average effective diameter (clear aperture (CA) of the lenses may be the smallest for the fourth lens 124, and the largest for the tenth lens 130. In detail, in the second lens group G2, the effective diameter of the seventh surface S7 of the fourth lens 124 may be the smallest, and the effective diameter of the twentieth surface S20 may be the largest. Among the plurality of lenses 100B, the effective diameter of the twentieth surface S20 may be 2.5 times or more, for example, 2.5 to 4 times the effective diameter of the sixth surface S6. Among the plurality of lenses 100B, the average effective diameter of the tenth lens S10 may be 2.5 times or more, for example, 2.5 to 4 times the average effective diameter of the third lens 123. The average effective diameter of the tenth lens 130 is the largest, so that it may effectively refract incident light toward the image sensor 300. Accordingly, the optical system 1000 may have improved chromatic aberration control characteristics, and the vignetting characteristics of the optical system 1000 may be improved by controlling incident light.

Among the lenses 121 to 130, the maximum center thickness may be 3 times or more, for example, 3 to 4 times the minimum center thickness. The first lens 121 having the maximum center thickness may be 3 times or more, for example, 3 to 4 times the range of the sixth, seventh, or tenth lenses 126, 127, and 130 having the minimum center thickness.

The refractive index of the ninth lens 129 may be greater than that of the eighth and tenth lenses 128 and 130. The refractive index of the ninth lens 129 may be greater than 1.6, and the refractive index of the eighth and tenth lenses 128 and 130 may be less than 1.6. The ninth lens 129 may have an Abbe number that is smaller than the Abbe numbers of the eighth and tenth lenses 128 and 130. For example, the Abbe number of the ninth lens 129 may be small and has a difference of 5 or more from the Abbe number of the tenth lens 130. In detail, since the Abbe number of the tenth lens 130 is greater than the Abbe number of the eighth and ninth lenses 128 and 129, the optical system 1000 may have improved chromatic aberration control characteristics. In the second lens group G2, the number of lenses with a refractive index exceeding 1.6 may be equal to the number of lenses with a refractive index of less than 1.6. In the second lens group G2, the number of lenses with an Abbe number exceeding 50 may be smaller than the number of lenses with an Abbe number of less than 50.

Among the plurality of lenses 100B, the number of lenses with a center thickness of less than 0.5 mm may be greater than the number of lenses with a center thickness of 0.5 mm or more. Among the plurality of lenses 100B, the number of lenses smaller than 0.5 mm may be 60% or more of the total number of lenses. Accordingly, the optical system 1000 may be provided in a structure with a slim thickness. Among the plurality of lens surfaces S1 to S20, lens surfaces with an effective radius of less than 1 mm may be disposed between the first surface S1 of the first lens 121 and the twelfth surface S12 of the sixth lens 126.

When the radius of curvature is explained as an absolute value, the radius of curvature of the twentieth surface S20 of the tenth lens 130 among the plurality of lenses 100B may be the largest among the lens surfaces, and the radius of curvature of the twentieth surface S20 of the tenth lens 130 may be the largest among the lens surfaces, and the radius of curvature of the twentieth surface S20 of the tenth lens 130 may be the largest among the lens surfaces, and the radius of curvature of the twentieth surface S20 of the plurality of lenses 100B may be the largest among the lens surfaces, and may be 25 times or more, for example, 25 to 40 times the radius of curvature of the first surface S1 or the nineteenth surface S19 of the tenth lens 130. When the focal length is described as an absolute value, the focal length of the fifth lens 125 among the plurality of lenses 100B may be the largest among the lenses, and may be 40 times or more than the focal length of the tenth lens 130, for example, in a range of 40 times to 80 times.

Table 3 is an example of lens data of the optical system of FIG. 15.

TABLE 3

| Lens | Surface | Radius (mm) of curvature | Thickness (mm)/ Distance (mm) | Refractive index | Abbe number | Effective diameter (mm) |
|---|---|---|---|---|---|---|
| Lens 1 | S1 | 2.262 | 0.656 | 1.536 | 55.699 | 3.200 |
| | S2 | 4.592 | 0.146 | | | 3.037 |
| Lens 2 | S3 (Stop) | 3.851 | 0.406 | 1.536 | 55.699 | 2.877 |
| | S4 | 12.242 | 0.030 | | | 2.716 |
| Lens 3 | S5 | 5.289 | 0.220 | 1.677 | 19.270 | 2.626 |
| | S6 | 3.179 | 0.419 | | | 2.400 |
| Lens 4 | S7 | −6.412 | 0.354 | 1.536 | 55.699 | 2.446 |
| | S8 | −5.131 | 0.095 | | | 2.696 |
| Lens 5 | S9 | −6.357 | 0.300 | 1.678 | 19.230 | 2.745 |
| | S10 | −6.227 | 0.052 | | | 3.111 |
| Lens 6 | S11 | −6.085 | 0.300 | 1.622 | 23.991 | 3.210 |
| | S12 | −7.491 | 0.194 | | | 3.570 |
| Lens 7 | S13 | 4.532 | 0.300 | 1.677 | 19.285 | 4.400 |
| | S14 | 4.152 | 0.510 | | | 5.103 |
| Lens 8 | S15 | −56.135 | 0.413 | 1.580 | 33.982 | 5.442 |
| | S16 | −4.001 | 0.066 | | | 5.983 |
| Lens 9 | S17 | −44.452 | 0.703 | 1.602 | 26.662 | 6.911 |
| | S18 | −24.978 | 0.645 | | | 7.386 |
| Lens 10 | S19 | −2.072 | 0.300 | 1.581 | 32.513 | 8.408 |
| | S20 | −62.891 | 0.030 | | | 8.761 |
| Filter | | Infinity | 0.110 | | | 9.395 |
| | | Infinity | 0.754 | | | 9.446 |
| Image sensor | | Infinity | 0.000 | | | 10.00 |

Table 3 shows the radius of curvature, the thickness of the lens, the distance between lenses on the optical axis OA of the first to tenth lenses 121 to 130 of FIG. 15, the refractive index at d-line, Abbe Number, and effective diameter (clear aperture (CA)).

As shown in FIG. 18, in the third embodiment, at least one lens surface among the plurality of lenses 100 may include an aspherical surface with a 30th order aspherical coefficient. For example, the first to tenth lenses 121 to 130 may include a lens surface having a 30th order aspheric coefficient. As described above, an aspheric surface with a 30th order aspherical coefficient (a value other than "0") may particularly significantly change the aspheric shape of the periphery portion, so the optical performance of the periphery portion of the FOV may be well corrected.

FIG. 19 is a graph of the diffraction MTF characteristics of the optical system 1000 according to the third embodiment, and FIG. 20 is a graph of the aberration characteristics. The aberration graph in FIG. 20 is a graph measuring spherical aberration, astigmatic field curves, and distortion from left to right. In FIG. 20, the X-axis may represent focal length (mm) and distortion (%), and the Y-axis may represent the height of the image. Additionally, the graph for spherical aberration is a graph for light in the approximately 470 nm, approximately 510 nm, approximately 555 nm, approximately 610 nm, and approximately 660 nm wavelength bands, and the graph for astigmatism and distortion aberration is a graph for light in the approximately 555 nm wavelength band.

In the aberration diagram of FIG. 20, it may be interpreted that the closer each curve is to the Y-axis, the better the aberration correction function. Referring to FIG. 20, it may be seen that measurement values of the optical system 1000 according to an embodiment are adjacent to the Y-axis in most regions. That is, the optical system 1000 according to the embodiment has improved resolution and may have good optical performance not only in the center portion but also in the periphery portion of the FOV.

Among the lenses of the optical system 1000 according to the above-described first to third embodiments, the number of lenses with an Abbe number of 40 or more, for example, in the range of 40 to 70, may be in the range of 30%, and the number of lenses with a refractive index of 1.6 or more, for example, in the range of 1.6 to 1.7 may be in range of 50% of the total number of lenses. Accordingly, the optical system 1000 may implement good optical performance in the center and periphery portions of the FOV and have improved aberration characteristics.

The optical system 1000 according to the first to third embodiments disclosed above may satisfy at least one or two of the equations described below. Accordingly, the optical system 1000 according to the embodiment may have improved optical characteristics. For example, when the optical system 1000 satisfies at least one mathematical equation, the optical system 1000 may effectively control aberration characteristics such as chromatic aberration and distortion aberration, not only in the center portion but also in the periphery portion of the FOV. In addition, the optical system 1000 may have improved resolution and may have a slimmer and more compact structure. In addition, the meaning of the thickness of the lens in the optical axis OA, the distance in the optical axis OA of adjacent lenses, and the distance at the edges described in the equations may be the same as FIG. 2.

$$1 < L1\_CT/L3\_CT < 5 \quad \text{[Equation 1]}$$

In Equation 1, L1_CT means the thickness (mm) of the first lens 101, 111, and 121 in the optical axis OA, and L3_CT means the thickness (mm) of the third lens 103 in the optical axis OA. When the optical system 1000 according to the embodiment satisfies Equation 1, the optical system 1000 may improve aberration characteristics.

$$0.5 < L3\_CT/L3\_ET < 2 \quad \text{[Equation 2]}$$

In Equation 2, L8_CT means the thickness (mm) of the third lens 103, 113, and 123 in the optical axis OA, and L3_ET means the thickness (mm) in the optical axis OA direction at the end of the effective region of the third lens 103, 113, and 123. In detail, L3_ET means a distance in the optical axis OA direction between the effective region end of the fifth surface S5 of the third lens 103, 113, and 123 and the effective region end of the sixth surface S6 of the third lens 103, 113, and 123. When the optical system 1000 according to the embodiment satisfies Equation 2, the optical system 1000 may have improved chromatic aberration control characteristics.

$$1 < L1\_CT/L1\_ET < 5 \quad \text{[Equation 2-1]}$$

In Equation 2-1, L1_ET means the thickness (mm) in the optical axis OA direction at the ends of the effective region of the first lens 101, 111, 1 and 121. When the optical system 1000 according to the embodiment satisfies Equation 2-1, the optical system 1000 may have improved chromatic aberration control characteristics.

$$1 < L10\_ET/L10\_CT < 5 \quad \text{[Equation 3]}$$

In Equation 3, L10_CT means the thickness (mm) of the tenth lens 110, 120, and 130 in the optical axis OA, and L10_ET means the thickness (mm) in the optical axis OA direction at the end of the effective region of the tenth lens 110, 120, and 130. In detail, L10_ET means a distance in the optical axis OA direction between the end of the effective region of the object-side nineteenth surface S19 of the tenth lens 110, 120, and 130 and the end of the effective region of the sensor-side twentieth surface S20 of the tenth lens 110, 120, and 130. When the optical system 1000 according to the embodiment satisfies Equation 3, the optical system 1000 may reduce distortion and have improved optical performance.

$$1.6 < n3 \quad \text{[Equation 4]}$$

In Equation 4, n3 means the refractive index at the d-line of the third lens 103. When the optical system 1000 according to the embodiment satisfies Equation 4, the optical system 1000 may improve chromatic aberration characteristics.

$$1.5 < n1 < 1.6 \quad \text{[Equation 4-1]}$$

$$1.5 < n10 < 1.6$$

In Equation 4-1, n1 is the refractive index at the d-line of the first lens 101, 111, and 121, and n10 is the refractive index at the d-line of the tenth lens 110, 120, and 130. When the optical system 1000 according to the embodiment satisfies Equation 4-1, the influence on the TTL of the optical system 1000 may be suppressed.

$$0.5 < L10S2\_max\_sag \text{ to Sensor} < 2 \quad \text{[Equation 5]}$$

In Equation 5, L10S2_max_sag to Sensor means the distance (mm) in the optical axis OA direction from the maximum Sag value of the sensor-side twentieth surface S20 of the tenth lens 110, 120, and 130 to the image sensor 300. For example, L10S2_max_sag to Sensor means the distance (mm) in the optical axis OA direction from the center of the tenth lens 110, 120, 130 to the image sensor 300. When the optical system 1000 according to the embodiment satisfies Equation 5, the optical system 1000 has a space where the filter 500 may be disposed between the plurality of lenses 100 and the image sensor 300, thereby having improved assembly properties. Additionally, when the optical system 1000 satisfies Equation 5, the optical system 1000 may secure a distance for module manufacturing. In the lens data for the first to third embodiments, the position of the filter 500, and the distance between the image sensor 300 and the filter 500 is a position set for convenience of design of the optical system 1000, and the filter 500 may be freely arranged within a range that does not contact the last lens and the image sensor 300. Accordingly, the value of L10S2_max_sag to Sensor in the lens data may be equal to the distance in the optical axis OA between the object-side surface of the filter 500 and the image sensor 300, which may be equal to the back focal length (BFL) of the optical system 1000, and the position of the filter 500 may be moved within a range that does not contact the last lens and the image sensor 300, respectively, so that good optical performance may be achieved. That is, the distance between the center of the twentieth surface S20 and the image sensor 300 of the twentieth surface S20 of the tenth lens 110, 120, and 130 is minimum, and may gradually increase toward the end of the effective region.

$$0.5 < BFL/L10S2\_max\_sag \text{ to Sensor} < 2 \quad \text{[Equation 6]}$$

In Equation 6, the back focal length (BFL) means the distance (mm) in the optical axis OA from the center of the sensor-side twentieth surface S20 of the tenth lens 110, 120, and 130 closest to the image sensor 300 to the image surface of the image sensor 300. The L10S2_max_sag to Sensor means the distance (mm) in the optical axis OA direction from the maximum Sag (Sagittal) value of the twentieth surface S20 of the tenth lens 110, 120, and 130 to the image sensor 300. When the optical system 1000 according to the embodiment satisfies Equation 6, the optical system 1000 may improve distortion aberration characteristics and have good optical performance in the periphery portion of the FOV. Here, the maximum Sag value may be the center of the twentieth surface S20.

$$|L10S2\_max\ slope| < 45 \qquad \text{[Equation 7]}$$

In Equation 7, L10S2_max slope means the maximum value (Degree) of the tangential angle measured on the sensor-side twentieth surface S20 of the tenth lens 110, 120, and 130. In detail, L10S2_max slope in the twentieth surface S20 means the angle value (Degree) of a point having the largest tangent angle with respect to an imaginary line extending in a direction perpendicular to the optical axis OA. When the optical system 1000 according to the embodiment satisfies Equation 7, the optical system 1000 may control the occurrence of lens flare.

$$nL10S2\ \text{Inflection Point} < 0 \qquad \text{[Equation 8]}$$

In Equation 8, nL10S2 Inflection Point may mean the number of critical points located on the sensor-side twentieth surface S20 of the tenth lens 110, 120, and 130. In detail, when the optical axis OA is a starting point and an end of the effective region of the twentieth surface S20 of the tenth lenses 110, 120, and 130 is an end point, L10S2 Inflection Point may be provided without a critical point from the optical axis OA to the end of the effective region of the twentieth surface S20. When the optical system 1000 according to the embodiment satisfies Equation 8, influence on the slim rate of the optical system 1000 may be suppressed.

$$1 < d910\_CT/d910\_min < 30 \qquad \text{[Equation 9]}$$

In Equation 9, d910_CT means a distance (mm) between the ninth lens 109, 119, and 129 and the tenth lens 110, 120, and 130 in the optical axis OA. In detail, d910_CT means the distance (mm) in the optical axis OA between the eighteenth surface S18 of the ninth lens 109, 119, 129 and the nineteenth surface S19 of the tenth lens 110, 120, 130. d910_min means the minimum distance (mm) among the distances in the optical axis OA direction between the ninth lenses 109, 119, and 129 and the tenth lenses 110, 120, and 130. When the optical system 1000 according to the embodiment satisfies Equation 9, the optical system 1000 may improve distortion aberration characteristics and have good optical performance in the periphery portion of the FOV.

$$1 < d910\_CT/d910\_ET < 20 \qquad \text{[Equation 10]}$$

In Equation 10, d910_ET means the distance (mm) in the optical axis OA direction between the end of the effective region of the sensor-side eighteenth surface S18 of the ninth lens 109, 119, and 129 and the end of the effective region of the object-side nineteenth surface S19 of the tenth lens 110, 120, and 130. When the optical system 1000 according to the embodiment satisfies Equation 10, it may have good optical performance even in the center and periphery portions of the FOV. Additionally, the optical system 1000 may reduce distortion and have improved optical performance.

$$0.01 < d12\_CT/d910\_CT < 1 \qquad \text{[Equation 11]}$$

In Equation 11, d12_CT means the optical axis distance (mm) between the first lens 101 and the second lens 102. In detail, d12_CT means a distance (mm) between the second surface S2 of the first lens 101 and the third surface S3 of the second lens 102 in the optical axis OA. When the optical system 1000 according to the embodiment satisfies Equation 11, the optical system 1000 may improve aberration characteristics, and control the size of the optical system 1000, for example, to reduce TTL (Total track length).

$$1 < d910\_CT/d34\_CT < 4 \qquad \text{[Equation 11-1]}$$

In Equation 11-1, d34_CT means the optical axis distance (mm) between the third lens 103 and the fourth lens 104. In detail, d34_CT means a distance (mm) between the sixth surface S6 of the third lens 103 and the seventh surface S7 of the fourth lens 104 in the optical axis OA. When the optical system 1000 according to the embodiment satisfies Equation 11-1, the optical system 1000 may improve aberration characteristics and control the size of the optical system 1000, for example, TTL.

$$1 < G2\_TD/d910\_CT < 15 \qquad \text{[Equation 11-2]}$$

In Equation 11-2, G2_TD means a distance (mm) in the optical axis between the object-side seventh surface S7 of the fourth lens 104 and the sensor-side twentieth surface S20 of the tenth lens 110, 120, and 130. Equation 11-2 may set the total optical axis distance of the second lens group G2 and the largest distance within the second lens group G2. When the optical system 1000 according to the embodiment satisfies Equation 11-2, the optical system 1000 may improve aberration characteristics and control the size of the optical system 1000, for example, TTL.

$$1 < G1\_TD/d34\_CT < 10 \qquad \text{[Equation 11-3]}$$

In Equation 11-3, G1_TD means a distance (mm) in the optical axis between the object-side first surface S1 of the first lens 101 and the sensor-side sixth surface S6 of the third lens 103. Equation 11-3 may set the total optical axis distance of the first lens group G1 and the distance between the first and second lens groups G1 and G2. When the optical system 1000 according to the embodiment satisfies Equation 11-3, the optical system 1000 may improve aberration characteristics and control TTL reduction.

$$3 < CA\_L10S2/d910\_CT < 20 \qquad \text{[Equation 11-4]}$$

In Equation 11-4, CA_L10S2 is the effective diameter of the largest lens surface, and is the effective diameter of the sensor-side twentieth surface S20 of the tenth lens 110, 120, and 130. When the optical system 1000 according to the embodiment satisfies Equation 11-4, the optical system 1000 may improve aberration characteristics and control TTL reduction.

$$1 < L1\_CT/L10\_CT < 5 \quad \text{[Equation 12]}$$

In Equation 12, L1_CT means the thickness (mm) of the first lens 101, 111, and 121 in the optical axis OA, and L10_CT means the thickness (mm) of the tenth lens 110, 120, and 130 in the optical axis OA. When the optical system 1000 according to the embodiment satisfies Equation 12, the optical system 1000 may have improved aberration characteristics. Additionally, the optical system 1000 has good optical performance at a set field of view and may control TTL.

$$1 < L9\_CT/L10\_CT < 5 \quad \text{[Equation 13]}$$

In Equation 13, L9_CT means the thickness (mm) of the ninth lens 109, 119, and 129 in the optical axis OA, and L10_CT means the thickness (mm) of the tenth lens 110, 120, and 130 in the optical axis OA. When the optical system 1000 according to the embodiment satisfies Equation 13, the optical system 1000 may reduce the manufacturing precision of the ninth lens 109, 119, and 129 and the tenth lens 110, 120, and 130 and may improve optical performance in the center and periphery portions of the field of view (FOV).

$$d34\_CT < L1\_CT < L9\_CT \text{ or } d34\_CT < L9\_CT < L1\_CT \quad \text{[Equation 13-1]}$$

In Equation 13-1, L1_CT is the center thickness of the thickest first lens 101, 111, and 121 in the first lens group G1, d34_CT is the center distance between the first and second lens groups G1 and G2 or is the optical axis distance between the third and fourth lenses 103 and 104, and L9_CT is the thickest lens thickness in the second lens group G2 and is the center thickness of the ninth lens 109, 119, and 129 having at least one critical point. When Equation 13-1 is satisfied, optical performance may be improved.

$$1 < L9\_CT/L9\,ET < 5 \quad \text{[Equation 13-2]}$$

In Equation 13-2, L9_ET means the edge side thickness (mm) of the ninth lens 109, 119, and 129, and when this is satisfied, the effect on reducing distortion aberration may be improved.

$$1 < L1R1/L10R2 < 5 \quad \text{[Equation 14]}$$

In Equation 14, L1R1 means the radius (mm) of curvature of the first surface S1 of the first lens 101, and L10R2 means the radius of curvature (mm) of the twentieth surface S20 of the tenth lens 110, 120, and 130. When the optical system 1000 according to the embodiment satisfies Equation 14, the aberration characteristics of the optical system 1000 may be improved.

$$0 < (d910\_CT - d910\_ET)/(d910\_CT) < 5 \quad \text{[Equation 15]}$$

In Equation 15, d910_CT means the optical axis distance (mm) between the ninth lens 109, 119, and 129 and the tenth lens 110, 120, and 130, and d910_ET means the distance (mm) in the direction of the optical axis OA between the end of the effective region of the sensor-side eighteenth surface S18 of the ninth lens 109, 119, and 129 and the end of the effective region of the object-side nineteenth surface S19 of the tenth lens 110, 120, and 130. When the optical system 1000 according to the embodiment satisfies Equation 15, distortion may be reduced and improved optical performance may be achieved. When the optical system 1000 according to the embodiment satisfies Equation 15, the optical system 1000 may reduce the manufacturing precision of the ninth lens 109, 119, and 129 and the tenth lens 110, 120, and 130 and may improve optical performance in the center and the periphery portion of FOV.

$$1 < CA\_L1S1/CA\_L3S1 < 1.5 \quad \text{[Equation 16]}$$

In Equation 16, CA_L1S1 means a size (mm) of the effective diameter (CA) of the first surface S1 of the first lens 101, 111, and 121, and CA_L3S1 means a size (mm) of the effective diameter (CA) the fifth surface S5 of the third lens 103, 113, and 123. When the optical system 1000 according to the embodiment satisfies Equation 16, the optical system 1000 may control light incident on the first lens group G1 and have improved aberration control characteristics.

$$1 < CA\_L10S2/CA\_L4S2 < 5 \quad \text{[Equation 17]}$$

In Equation 17, CA_L4S2 means a size (mm) of the effective diameter (CA) of the eighth surface S8 of the fourth lens 104, 114, and 124, and CA_L10S2 means a size (mm) of the effective diameter (CA) of the twentieth surface S20 of the tenth lens 110, 120, and 130. When the optical system 1000 according to the embodiment satisfies Equation 17, the optical system 1000 may control light incident on the second lens group G2 and improve aberration characteristics.

$$0.2 < CA\_L3S2/CA\_L4S1 < 1 \quad \text{[Equation 18]}$$

In Equation 18, CA_L3S2 means a size (mm) of the effective diameter (CA) of the sixth surface S6 of the third lens 103, 113, and 123, and CA_L4S1 means the size (mm) of the effective diameter (CA) of the seventh surface S7 of the fourth lens 104, 114, and 124. When the optical system 1000 according to the embodiment satisfies Equation 18, the optical system 1000 may improve chromatic aberration and control vignetting for optical performance.

$$0.1 < CA\_L8S2/CA\_L10S2 < 1 \quad \text{[Equation 19]}$$

In Equation 19, CA_L8S2 means the size (mm) of the effective diameter (CA) of the sixteenth surface S16 of the eighth lens 108, 118, and 128, and CA_L10S2 means the size (mm) of the effective diameter (CA, H10 in FIG. 1) of the twentieth surface S20 of the tenth lens 110, 120, and 130. When the optical system 1000 according to the embodiment satisfies Equation 19, the optical system 1000 may improve chromatic aberration.

$$1 < d34\_CT / d34\_ET < 8 \quad \text{[Equation 20]}$$

In Equation 8, d34_CT means the distance (mm) between the third lens 103 and the fourth lens 104 in the optical axis OA. In detail, d34_CT means the distance (mm) between the sixth surface S6 of the third lens 103 and the seventh surface S7 of the fourth lens 104 in the optical axis OA. d34_ET means the distance (mm) in the direction of the optical axis OA between the end of the effective region of the sixth surface S6 of the third lens 103 and the end of the effective region of the seventh surface S7 of the fourth lens 104. When the optical system 1000 according to the embodiment satisfies Equation 20, the optical system 1000 may reduce chromatic aberration, improve aberration characteristics, and control vignetting for optical performance.

$$1 < d89\_CT / d89\_ET < 3 \quad \text{[Equation 21]}$$

In Equation 21, d89_CT means the distance (mm) between the eighth lens 108, 118, and 128 and the ninth lens 109, 119, and 129 in the optical axis OA. d89_ET means the distance (mm) in the direction of the optical axis OA between the end of the effective region of the sixteenth surface S16 of the eighth lens 108, 118, and 128 and the end of the effective region of the seventeenth surface S17 of the ninth lens 109, 119, and 129. When the optical system 1000 according to the embodiment satisfies Equation 21, good optical performance may be achieved even in the center and periphery portions of the FOV, and distortion may be suppressed.

$$0 < d910\_max / d910\_CT < 2 \quad \text{[Equation 22]}$$

In Equation 22, d910_Max means the maximum distance (mm) between the ninth lens 109, 119, and 129 and the tenth lens 110, 120, and 130. In detail, d910_Max means the maximum distance between the eighteenth surface S18 of the ninth lens 109, 119, and 129 and the thirteenth surface S13 of the tenth lens 110, 120, and 130. When the optical system 1000 according to the embodiment satisfies Equation 22, optical performance may be improved in the periphery portion of the FOV, and distortion of aberration characteristics may be suppressed.

$$1 < L8\_CT / d89\_CT < 2 \quad \text{[Equation 23]}$$

In Equation 23, L8_CT means the thickness (mm) of the eighth lens 108, 118, and 128 in the optical axis OA, and d89_CT means the distance (mm) between the eighth lens 108, 118, and 128 and the ninth lens 109, 119, and 129 in the optical axis OA. When the optical system 1000 according to the embodiment satisfies Equation 23, the optical system 1000 may reduce the effective diameter size of the eighth lens 108, 118, and 128 and the center distance between adjacent lenses, and improve the optical performance of the periphery portion of FOV.

$$0.1 < L9\_CT / d910\_CT < 3 \quad \text{[Equation 24]}$$

In Equation 24, L9_CT means the thickness (mm) of the ninth lens 109, 119, and 129 in the optical axis OA, and d910_CT means the distance (mm) between the ninth lens 109, 119, and 129 and the tenth lens 110, 120, and 130 in the optical axis OA. When the optical system 1000 according to the embodiment satisfies Equation 24, the optical system 1000 may reduce the effective diameter size and distance of the eighth, ninth, and tenth lenses, and improve the optical performance of the periphery portion of FOV.

$$0.01 < L10\_CT / d910\_CT < 1 \quad \text{[Equation 25]}$$

In Equation 25, L10_CT means the thickness (mm) in the optical axis OA of the tenth lens 110, 120, and 130, and d910_CT means the distance (mm) between the ninth lens 109, 119, and 129 and the tenth lens 110, 120, and 130 in the optical axis OA. When the optical system 1000 according to the embodiment satisfies Equation 24 or/and Equation 25, the optical system 1000 has the effective diameter size of the tenth lens 110, 120, and 130 and the ninth lens 109, 119, and 129 and the tenth lens. The center distance between 110, 120, and 130 may be reduced, and the optical performance of the peripheral portion of FOV may be improved.

$$2 < L10\_Max\_Thi / L10\_CT < 10 \quad \text{[Equation 25-1]}$$

In Equation 25-1, L10_Max_Thi means the maximum value among the thicknesses of the tenth lenses 110, 120, and 130. When the optical system 1000 according to the embodiment satisfies Equation 25-1, the optical system 1000 may reduce an effective diameter of the tenth lens 110, 120, and 130 and the center distance between the ninth lens 109, 119, and 129 and the tenth lens 110, 120, and 130, and improve the optical performance of the periphery portion of the FOV.

$$1 < |L9R1 / L9\_CT| < 100 \quad \text{[Equation 26]}$$

In Equation 26, L9R1 means the radius (mm) of curvature of the seventeenth surface S17 of the ninth lens 109, 119, and 129, and L9_CT means the thickness (mm) of the ninth lens 109, 119, and 129 in the optical axis. When the optical system 1000 according to the embodiment satisfies Equation 26, the optical system 1000 may control the refractive power of the ninth lens 109, 119, and 129, and improve the optical performance of the light incident on the second lens group G2.

$$1 < |L8R1 / L10R1| < 100 \quad \text{[Equation 27]}$$

In Equation 27, L8R1 means the radius (mm) of curvature of the fifteenth surface S15 of the eighth lens 108, 118, and 128, and L10R1 means the radius (mm) of curvature of the nineteenth surface S19 of the tenth lens 110, 120, and 130. When the optical system 1000 according to the embodiment satisfies Equation 27, the optical performance may be improved by controlling the shape and refractive power of the eighth and tenth lenses, and the optical performance of the second lens group G2 may be improved.

$$0 < L\_CT\_Max/Air\_Max < 5 \quad \text{[Equation 28]}$$

In Equation 28, L_CT_max means the thickest thickness (mm) of each of the plurality of lenses in the optical axis OA, and Air_max means the maximum value of air distances or distances (mm) between the plurality of lenses. When the optical system 1000 according to an embodiment satisfies Equation 28, the optical system 1000 has good optical performance at a set FOV and focal length, and may reduce the size of the optical system 1000, for example, TTL.

$$0.5 < \sum L\_CT / \sum Air\_CT < 2 \quad \text{[Equation 29]}$$

In Equation 29, ΣL_CT means the sum of the thicknesses (mm) of each of the plurality of lenses in the optical axis OA, and ΣAir_CT means the sum of the distance (mm) between two adjacent lenses in the plurality of lenses in the optical axis OA. When the optical system 1000 according to an embodiment satisfies Equation 29, the optical system 1000 may have good optical performance at a set FOV and focal length, and may reduce the size of the optical system 1000, for example, TTL.

$$10 < \sum Index < 30 \quad \text{[Equation 30]}$$

In Equation 30, ΣIndex means the sum of the refractive indices at the d-line of each of the plurality of lenses 100, 100A, and 100B. When the optical system 1000 according to the embodiment satisfies Equation 30, TTL of the optical system 1000 may be controlled and the resolution may be improved.

$$10 < \sum Abbe / \sum Index < 50 \quad \text{[Equation 31]}$$

In Equation 31, ΣAbbe means the sum of Abbe numbers of each of the plurality of lenses 100, 100A, and 100B. When the optical system 1000 according to the embodiment satisfies Equation 31, the optical system 1000 may have improved aberration characteristics and resolution.

$$0 < |Max\_distortion| < 5 \quad \text{[Equation 32]}$$

In Equation 32, Max_distortion means the maximum value of distortion in the region from the center (0.0 F) to the diagonal end (1.0 F) based on the optical characteristics detected by the image sensor 300. When the optical system 1000 according to the embodiment satisfies Equation 32, the optical system 1000 may improve distortion characteristics.

$$0 < Air\_ET\_Max/L\_CT\_Max < 2 \quad \text{[Equation 33]}$$

In Equation 33, L_CT_max means the thickest thickness (mm) among the thicknesses in the optical axis OA of each of the plurality of lenses, and as shown in FIG. 2, Air_ET_Max means is the distance in the optical axis OA between the end of the effective region of the sensor-side surface of the n−1th lens and the end of the effective region of the object-side surface of the n-th lens facing each other, for example, the maximum value (Air_Edge_max) among the edge distances between the two lenses. In other words, it means the largest value among the d (n−1, n)_ET values in the lens data to be described later (where n is a natural number greater than 1 and less than or equal to 10). When the optical system 1000 according to the embodiment satisfies Equation 33, the optical system 1000 has a set FOV and focal length, and may have good optical performance in the periphery portion of the FOV.

$$0.5 < CA\_L1S1/CA\_min < 2 \quad \text{[Equation 34]}$$

In Equation 34, CA_L1S1 means the effective diameter (mm) of the first surface S1 of the first lens 101, 111, and 121, and CA_Min means the smallest effective diameter (mm) among the effective diameters of the first to twentieth surfaces S1 to S20. When the optical system 1000 according to the embodiment satisfies Equation 34, light incident through the first lens 101 may be controlled, and a slim optical system may be provided while maintaining optical performance.

$$1 < CA\_max/CA\_min < 5 \quad \text{[Equation 35]}$$

In Equation 35, CA_max means the largest effective diameter (mm) among the object-side surfaces and sensor-side surfaces of the plurality of lenses, and means the largest effective diameter (mm) among the effective diameters of the first to twentieth surfaces S1 to S20. When the optical system 1000 according to the embodiment satisfies Equation 35, the optical system 1000 may provide a slim and compact optical system while maintaining optical performance.

$$1 < CA\_L10S2/CA\_L3S2 < 5 \quad \text{[Equation 35-1]}$$

In Equation 35, CA_L10S2 represents the effective diameter (mm) of the twentieth surface S20 of the tenth lens 110, 120, and 130, and has the largest effective diameter of the lens surface among the lenses. CA_L3S2 represents the effective diameter (mm) of the sixth surface S6 of the third lens 103, 113, and 123, and has the smallest effective diameter of the lens surface among the lenses. That is, the effective diameter difference between the last lens surface of the first lens group G1 and the last lens surface of the second lens group G2 may be the largest. When the optical system 1000 according to the embodiment satisfies Equation 35-1, the optical system 1000 may provide a slim and compact optical system while maintaining optical performance.

$$2 \leq AVR\_CA\_L10/AVR\_CA\_L3 < 4 \quad \text{[Equation 35-2]}$$

In Equation 35, AVR_CA_L10 represents the average value of the effective diameter (mm) of the nineteenth and twentieth surfaces S19 and S20 of the tenth lens 110, 120, and 130, and is the average of the effective diameters of the two largest lens surfaces among the lenses. AVR_CA_L3 represents the average value of the effective diameter (mm) of the fifth and sixth surfaces S5 and S6 of the third lens 103, and represents the average of the effective diameters of the two smallest lens surfaces among the lenses. That is, a difference between the average effective diameter of the object-side and sensor-side surfaces S5 and S6 of the last lens L3 of the first lens group G1 and the average effective diameter of the object-side and sensor-side surfaces S19 and S20 of the last lens L10 of the second lens group G2 may be the largest. When the optical system 1000 according to the embodiment satisfies Equation 35-2, the optical system 1000 may provide a slim and compact optical system while maintaining optical performance.

Using these equations 35, 35-1, and 35-2, the effective diameter CA_L10S1 of the thirteenth surface S13 of the tenth lens 110, 120, and 130 may be twice or more the minimum effective diameter CA_min, and the effective diameter CA_L10S2 of the twentieth surface S20 may be twice or more the minimum effective diameter CA_min. In other words, the following equation may be satisfied.

$$2 \leq CA\_L10S1/CA\_min < 5 \quad \text{(Equation 35-3)}$$

$$2 \leq CA\_L10S2/CA\_min < 5 \quad \text{(Equation 35-4)}$$

Using these equations 35, 35-1 to 35-4, the effective diameter CA_L10S2 of the thirteenth surface S13 of the tenth lens 110, 120, and 130 may be twice or more of the average effective diameter AVR_CA_L3 of the third lens 103, 113, and 123, for example, in the range of 2 times to 4 times, and the effective diameter CA_L10S2 of the twentieth surface S20 may be twice or more the average effective diameter AVR_CA_L3 of the third lens 103, for example, in a range of 2 times or more and less than 5 times.

The following equation may be satisfied.

$$2 \leq CA\_L10S1/AVR\_CA\_L3 \leq 4 \quad \text{(Equation 35-5)}$$

$$2 \leq CA\_L10S2/AVR\_CA\_L3 < 5 \quad \text{(Equation 35-6)}$$

$$1 < CA\_max/CA\_Aver < 3 \quad \text{[Equation 36]}$$

In Equation 36, CA_max means the largest effective diameter (mm) of the object-side surface and sensor-side surface of the plurality of lenses, and CA_Aver means the average of the effective diameters of the object-side surface and sensor-side surface of the plurality of lenses. When the optical system 1000 according to the embodiment satisfies Equation 36, a slim and compact optical system may be provided.

$$0.1 < CA\_min/CA\_Aver < 1 \quad \text{[Equation 37]}$$

In Equation 37, CA_min means the smallest effective diameter (mm) among the object-side surface and sensor-side surface of the plurality of lenses. When the optical system 1000 according to the embodiment satisfies Equation 37, a slim and compact optical system may be provided.

$$0.1 < CA\_max/(2*imgH) < 1 \quad \text{[Equation 38]}$$

In Equation 38, CA_max means the largest effective diameter among the object-side surface and sensor-side surface of the plurality of lenses, and ImgH means a distance (mm) from the center (0.0 F) of the image sensor 300 overlapping the optical axis OA to the diagonal end (1.0 F). That is, ImgH means ½ of the maximum diagonal length (mm) of the effective region of the image sensor 300. When the optical system 1000 according to the embodiment satisfies Equation 38, the optical system 1000 has good optical performance in the center and periphery portions of the FOV and may provide a slim and compact optical system.

$$0.5 < TD/CA\_max < 1.5 \quad \text{[Equation 39]}$$

In Equation 39, TD is the maximum optical axis distance (mm) from the object-side surface of the first lens group G1 to the sensor-side surface of the second lens group G2. For example, it is the distance from the first surface S1 of the first lens 101 to the twentieth surface S20 of the tenth lens 110, 120, and 130 in the optical axis OA. When the optical system 1000 according to the embodiment satisfies Equation 39, a slim and compact optical system may be provided.

$$1 < |F/L10R2| < 10 \quad \text{[Equation 40]}$$

In Equation 40, F means the total focal length (mm) of the optical system 1000, and L10R2 means the radius (mm) of curvature of the twentieth surface S20 of the tenth lens 110, 120, and 130. When the optical system 1000 according to the embodiment satisfies Equation 40, the optical system 1000 may reduce the size of the optical system 1000, for example, reduce TTL.

$$1 < F/L1R1 < 10 \quad \text{[Equation 41]}$$

In Equation 41, L1R1 means the radius (mm) of curvature of the first surface S1 of the first lens 101, 111, and 121. When the optical system 1000 according to the embodiment satisfies Equation 41, the optical system 1000 may reduce the size of the optical system 1000, for example, reduce TTL.

$$1 < |EPD/L10R2| < 10 \quad \text{[Equation 42]}$$

In Equation 42, EPD means the size (mm) of the entrance pupil diameter (EPD) of the optical system 1000, and L10R2 means the radius (mm) of curvature of the twentieth surface S20 of the tenth lens 110, 120, and 130. When the optical system 1000 according to the embodiment satisfies Equation 42, the optical system 1000 may control the overall brightness and have good optical performance in the center and periphery portions of the FOV.

$$0.5 < EPD/L1R1 < 8 \quad \text{[Equation 43]}$$

Equation 42 shows the relationship between the size of the entrance pupil diameter of the optical system and the radius of curvature of the first surface S1 of the first lens 101, 111, and 121, and may control incident light.

$$-3 < f1/f3 < 0 \quad \text{[Equation 44]}$$

In Equation 44, f1 means the focal length (mm) of the first lens 101, 111, and 121, and f3 means the focal length (mm) of the third lens 103, 113, and 123. When the optical system 1000 according to the embodiment satisfies Equation 44, the first lenses 101, 111, and 121 and the third lenses 103, 113, and 123 may have appropriate refractive power for controlling the incident light path and may improve resolution.

$$1 < f13/F < 5 \quad \text{[Equation 45]}$$

In Equation 45, f13 means a composite focal length (mm) of the first to third lenses, and F means a total focal length (mm) of the optical system 1000. Equation 45 establishes the relationship between the focal length of the first lens group G1 and the total focal length. When the optical system 1000 according to the embodiment satisfies Equation 45, the optical system 1000 may control TTL of the optical system 1000.

$$0 < |f410/f13| < 2 \quad \text{[Equation 46]}$$

In Equation 46, f13 means the composite focal length (mm) of the first to third lenses, and f410 means a composite focal length (mm) of the fourth to tenth lenses. Equation 46 establishes the relationship between the focal length of the first lens group G1 and the focal length of the second lens group G2. In an embodiment, the composite focal length of the first to third lenses may have a positive (+) value, and the composite focal length of the fourth to tenth lenses may have a negative (−) value. When the optical system 1000 according to the embodiment satisfies Equation 46, the optical system 1000 may improve aberration characteristics such as chromatic aberration and distortion aberration.

$$2 < TTL < 20 \quad \text{[Equation 47]}$$

In Equation 47, TTL (Total Track Length) means a distance (mm) from the apex of the first surface S1 of the first lens 101 to the image surface of the image sensor 300 in the optical axis OA. By setting the TTL to less than 20 in Equation 47, a slim and compact optical system may be provided.

$$2 < ImgH \quad \text{[Equation 48]}$$

Equation 48 allows the diagonal size of the image sensor 300 to exceed 4 mm, thereby providing an optical system with high resolution.

$$BFL < 2.5 \quad \text{[Equation 49]}$$

Equation 42 sets the BFL (Back focal length) to less than 2.5 mm, so that the installation space of the filter 500 may be secured and the assembly of the components is improved through the distance between the image sensor 300 and the last lens, and a coupling reliability may be improved.

$$2 < F < 20 \quad \text{[Equation 50]}$$

In Equation 50, the total focal length (F) may be set to suit the optical system.

$$FOV < 120 \quad \text{[Equation 51]}$$

In Equation 51, FOV (Field of view) means the field of view (Degree) of the optical system 1000, and may provide an optical system of less than 120 degrees. FOV may be 80 degrees or less.

$$0.5 < TTL/\text{CA\_max} < 2 \quad \text{[Equation 52]}$$

In Equation 52, CA_max means the largest effective diameter (mm) among the object-side surfaces and the sensor-side surfaces of the plurality of lenses, and TTL (Total track length) means the distance (mm) from the apex of the first surface S1 of the first lens 101, 111, and 121 to the image surface of the image sensor 300 in the optical axis OA. Equation 52 sets the relationship between the total optical axis length of the optical system and the maximum effective diameter, thereby providing a slim and compact optical system.

$$0.4 < TTL/ImgH < 3 \quad \text{[Equation 53]}$$

Equation 53 may set the total length TTL on the optical axis of the optical system and the diagonal length ImgH of the image sensor 300 from the optical axis. When the optical system 1000 according to the embodiment satisfies Equation 53, the optical system 1000 may secure a relatively large image sensor 300, for example, BFL for application of the large image sensor 300 of about 1 inch in size, and may have a smaller TTL, thereby implementing high-definition image quality and a slim structure.

$$0.01 < BFL/ImgH < 0.5 \quad \text{[Equation 54]}$$

Equation 54 may set the optical axis distance between the image sensor 300 and the last lens and the diagonal length from the optical axis of the image sensor 300. When the optical system 1000 according to the embodiment satisfies Equation 54, the optical system 1000 may secure a relatively large image sensor 300, for example, BFL for application of the large image sensor 300 of about 1 inch in size, and the distance between the last lens and the image sensor 300 may be minimized, so that good optical properties may be obtained on the center and periphery portions of FOV.

$$4 < TTL/BFL < 10 \quad \text{[Equation 55]}$$

Equation 55 may set the total length TTL on the optical axis of the optical system and the distance BFL (unit, mm) on the optical axis between the image sensor 300 and the last lens. When the optical system 1000 according to the embodiment satisfies Equation 55, the optical system 1000 secures BFL and may be provided in a slim and compact manner.

$$0.5 < F/TTL < 1.5 \quad \text{[Equation 56]}$$

Equation 56 may set the total focal length F and the total length TTL on the optical axis of the optical system 1000. Accordingly, it is possible to provide a slim and compact optical system.

$$3 < F/BFL < 10 \quad \text{[Equation 57]}$$

Equation 57 may set the total focal length F of the optical system 1000 and the distance BFL (unit, mm) of the optical axis between the image sensor 300 and the last lens. When the optical system 1000 according to the embodiment satisfies Equation 57, the optical system 1000 may have a set FOV and an appropriate focal length, and a slim and compact optical system may be provided. Additionally, the optical system 1000 may minimize the distance between the last lens and the image sensor 300, and thus may have good optical characteristics on the periphery portion of FOV.

$$0.1 < F/ImgH < 3 \quad \text{[Equation 58]}$$

Equation 58 may set the total focal length (F, mm) of the optical system 1000 and the diagonal length ImgH of the image sensor 300 from the optical axis. This optical system 1000 may have improved aberration characteristics by applying a relatively large image sensor 300, for example, a large image sensor 300 of about 1 inch or less.

$$1 \leq F/EPD < 5 \quad \text{[Equation 59]}$$

Equation 59 may set the total focal length F (mm) and the size of the entrance pupil diameter of the optical system 1000. Accordingly, it is possible to control the overall brightness of the optical system.

$$Z = \frac{cr^2}{1+\sqrt{1-(1+k)c^2r^2}} + u^4\sum_{m=0}^{13} a_m Q_m^{con}(u^2) \quad \text{[Equation 60]}$$

The meaning of each item in Equation 60 is as follows.

Z: The sag of the surface parallel to the Z-axis (in lens units)

c: The vertex curvature (CUY)

k: The conic constant r: The radial distance $r_n$: The normalization radius (NRADIUS)

u: $r/r_n$ am: The $m^{th}Q^{con}$ coefficient, which correlates to surface sag departure $Q_m^{con}$: The $m^{th}Q^{con}$ polynomial The optical system 1000 according to the embodiment may satisfy at least one or two of Equations 1 to 59. In this case, the optical system 1000 may have improved optical characteristics. In detail, when the optical system 1000 satisfies at least one or two of Equations 1 to 59, the optical system 1000 may have improved resolution and may improve aberration and distortion characteristics. In addition, the optical system 1000 may secure a BFL for applying the large-sized image sensor 300 and minimize the distance between the last lens and the image sensor 300, thereby having good optical performance on the center and periphery portions of FOV. In addition, when the optical system 1000 satisfies at least one of Equations 1 to 59, the optical system 1000 includes the image sensor 300 having a relatively large size and may have a relatively small TTL value, and may provide a slimmer compact optical system and a camera module having the same.

In the optical system 1000 according to the embodiment, the distance between the plurality of lenses 100 may have a value set according to the region. Table 4 shows the items of the above-described equations in the optical system 1000 according to the first to third embodiments, shows total track length TTL, back focal length BFL, total focal length F, ImgH, focal lengths f1, f2, f3, f4, f5, f6, 17, f8, f9, and f10 of each of the first to tenth lenses, composite focal length, edge thickness ET and the like of the optical system 1000. Here, the edge thickness of the lens means the thickness in the optical axis direction Z at the end of the effective region of the lens, and the unit is mm.

TABLE 4

| Items | First Embodiment | Second Embodiment | Third Embodiment |
|---|---|---|---|
| F | 7.231 | 6.697 | 5.999 |
| f1 | 6.618 | 6.395 | 7.579 |
| f2 | 22.998 | 29.012 | 10.314 |
| f3 | −11.653 | −14.626 | −12.282 |
| f4 | 31.560 | 33.617 | 43.709 |
| f5 | 76.529 | 69.262 | 232.100 |
| f6 | −138.459 | −61.013 | −56.757 |
| f7 | −42.125 | −33.517 | −107.591 |
| f8 | 7.118 | 6.470 | 7.402 |
| f9 | −17.784 | −52.113 | 93.488 |
| f10 | −5.049 | −4.129 | −3.698 |
| f_G1 | 7.755 | 7.138 | 6.279 |
| f_G2 | −13.929 | −13.216 | −11.362 |
| L1_ET | 0.280 | 0.254 | 0.1967 |
| L2_ET | 0.256 | 0.250 | 0.2362 |
| L3_ET | 0.481 | 0.437 | 0.3073 |
| LA_ET | 0.252 | 0.250 | 0.2476 |
| L5_ET | 0.467 | 0.282 | 0.2501 |
| L6_ET | 0.289 | 0.295 | 0.2501 |
| L7_ET | 0.656 | 0.520 | 0.3886 |
| L8_ET | 0.307 | 0.334 | 0.4224 |
| L9_ET | 0.489 | 0.299 | 0.3001 |
| L10_ET | 1.161 | 0.673 | 0.3428 |
| d12_ET | 0.340 | 0.229 | 0.184 |
| d23_ET | 0.121 | 0.100 | 0.092 |
| d34_ET | 0.065 | 0.051 | 0.055 |
| d45_ET | 0.079 | 0.050 | 0.052 |
| d56_ET | 0.091 | 0.085 | 0.069 |
| d67_ET | 0.532 | 0.260 | 0.383 |
| d78_ET | 0.055 | 0.265 | 0.159 |
| d89_ET | 0.222 | 0.257 | 0.196 |
| d910_ET | 0.412 | 0.403 | 0.492 |
| EPD | 3.851 | 4.173 | 3.137 |
| BFL | 0.890 | 0.890 | 0.890 |
| TD | 7.445 | 6.810 | 5.810 |

TABLE 4-continued

| Items | First Embodiment | Second Embodiment | Third Embodiment |
|---|---|---|---|
| Imgh | 5.00 | 5.000 | 5.000 |
| TTL | 8.634 | 8.0 | 7.0 |
| F-number | 1.877 | 1.60 | 1.912 |
| FOV | 78.4 | 72.4 | 78.4 |

Table 5 shows the result values for Equations 1 to 59 described above in the optical system 1000 of FIG. 1. Referring to Table 5, it may be seen that the optical system 1000 satisfies at least one, two, or three of Equations 1 to 59. In detail, it may be seen that the optical system 1000 according to the embodiment satisfies all of Equations 1 to 59 above. Accordingly, the optical system 1000 may improve optical performance and optical characteristics in the center and periphery portions of the FOV.

TABLE 5

| | Equations | First Embodiment | Second Embodiment | Third Embodiment |
|---|---|---|---|---|
| 1 | 1 < L1_CT/L3_CT < 5 | 2.531 | 3.504 | 2.983 |
| 2 | 0.5 < L3_CT/L3_ET < 2 | 0.730 | 0.704 | 0.716 |
| 3 | 1 < L10_ET/L10_CT < 5 | 3.870 | 2.244 | 1.143 |
| 4 | 1.60 < n3 | 1.674 | 1.678 | 1.677 |
| 5 | 0.5 < L10S2_max_sag to Sensor < 2 | 0.890 | 0.890 | 0.890 |
| 6 | 0.5 < BFL/L10S2_max_sag to Sensor < 2 | 1.000 | 1.000 | 1.000 |
| 7 | \|L10S2_max slope\| < 45 | 37.000 | 39.000 | 43.000 |
| 8 | nL10S2 Inflection Point ≤ 0 | 만족 | 만족 | 만족 |
| 9 | 1 < d910_CT/d910_min < 30 | 5.153 | 24.233 | 21.756 |
| 10 | 1 < d910_CT/d910_ET < 20 | 3.247 | 11.309 | 6.802 |
| 11 | 0.01 < d12_CT/d910_CT < 1 | 0.446 | 0.229 | 0.226 |
| 12 | 1 < L1_CT/L10_CT < 5 | 2.966 | 3.593 | 2.187 |
| 13 | 1 < L9_CT/L10_CT < 5 | 4.033 | 2.875 | 2.343 |
| 14 | 0 < L1R1/L10R2 < 5 | 0.032 | 0.027 | 0.036 |
| 15 | 0 < (d910_CT - d910_ET)/(d910_CT) < 5 | 0.692 | 0.909 | 0.853 |
| 16 | 1 < CA_L1S1/CA_L3S1 < 1.5 | 1.234 | 1.231 | 1.219 |
| 17 | 1 < CA_L10S2/CA_L4S2 < 5 | 2.925 | 2.696 | 3.250 |
| 18 | 0.2 < CA_L3S2/CA_LAS1 < 1 | 0.969 | 0.983 | 0.981 |
| 19 | 0.1 < CA_L8S2/CA_L10S2 < 1 | 0.681 | 0.756 | 0.683 |
| 20 | 2 < d34_CT/d34_ET < 15 | 7.448 | 11.309 | 7.675 |
| 21 | 0 < d89_CT/d89_ET < 3 | 0.135 | 0.217 | 0.337 |
| 22 | 0 < d910_max/d910_CT < 2 | 1.000 | 1.000 | 1.000 |
| 23 | 1 < L8_CT/d89_CT < 30 | 17.897 | 9.910 | 6.257 |
| 24 | 0 < L9_CT/d910_CT < 3 | 1.909 | 1.284 | 1.089 |
| 25 | 0.01 < L10_CT/d910_CT < 1 | 0.248 | 0.348 | 0.427 |
| 26 | 1 < \|L9R1/L9_CT\| < 100 | 12.288 | 8.650 | 9.832 |
| 27 | 1 < \|L8R1/L10R1\| < 100 | 42.232 | 22.973 | 27.093 |
| 28 | 0 < CT_Max/Air_Max < 5 | 1.91 | 1.60 | 1.09 |
| 29 | 0.5 < ΣL_CT/ΣAir_CT < 2 | 2.269 | 2.212 | 1.831 |
| 30 | 10 < ΣIndex <30 | 15.863 | 16.117 | 16.023 |
| 31 | 10 < ΣAbbe/ΣIndex < 50 | 13.371 | 10.966 | 11.401 |
| 32 | 0 < \|Max_distortion\| < 5 | 2.002 | 2.002 | 1.996 |
| 33 | 0 < Air_ET_Max/L_CT_Max < 2 | 0.439 | 0.374 | 0.701 |
| 34 | 0.5 < CA_L1S1/CA_min < 2 | 1.377 | 1.383 | 1.333 |
| 35 | 1 < CA_max/CA_min < 5 | 3.305 | 2.965 | 3.650 |
| 36 | 1 < CA_max/CA_Aver < 3 | 1.930 | 1.811 | 2.013 |
| 37 | 0.1 < CA_min/CA_Aver < 1 | 0.584 | 0.611 | 0.552 |
| 38 | 0.1 < CA_max/(2*ImgH) < 1 | 0.912 | 0.900 | 0.875 |
| 39 | 0.5 < TD/CA_max < 1.5 | 0.816 | 0.756 | 0.663 |
| 40 | 0 < \|F/L10R2\| < 10 | 0.082 | 0.067 | 0.095 |
| 41 | 1 < F/L1R1 < 10 | 2.529 | 2.490 | 2.652 |
| 42 | 0 < \|EPD/L10R2\| < 10 | 0.044 | 0.042 | 0.050 |
| 43 | 0.5 < EPD/L1R1 < 8 | 1.347 | 1.552 | 1.386 |
| 44 | −3 < f1/f3 < 0 | −0.568 | −0.437 | −0.617 |
| 45 | 1 < f13/F < 5 | 1.073 | 1.066 | 1.047 |
| 46 | 0 < \|f410/f13\| < 2 | 1.796 | 1.851 | 1.809 |
| 47 | 2 < TTL < 20 | 8.635 | 8.635 | 8.635 |
| 48 | 2 < ImgH | 5.000 | 5.001 | 5.008 |
| 49 | BFL < 2.5 | 0.890 | 0.890 | 0.890 |
| 50 | 2 < F < 20 | 7.231 | 7.231 | 7.231 |
| 51 | FOV < 120 | 68.455 | 68.455 | 68.455 |
| 52 | 0.5 < TTL/CA_max < 2 | 0.947 | 0.889 | 0.799 |
| 53 | 0.4 < TTL/ImgH < 2.5 | 1.727 | 1.600 | 1.398 |
| 54 | 0.01 < BFL/ImgH < 0.5 | 0.178 | 0.178 | 0.178 |
| 55 | 4 < TTL/BFL < 10 | 9.702 | 8.989 | 7.865 |
| 56 | 0.5 < F/TTL < 1.5 | 0.837 | 0.837 | 0.857 |
| 57 | 3 < F/BFL < 10 | 8.124 | 7.524 | 6.741 |
| 58 | 0.1 < F/ImgH < 3 | 1.446 | 1.339 | 1.198 |
| 59 | 1 ≤ F/EPD < 5 | 1.878 | 1.605 | 1.913 |

Figure 22:
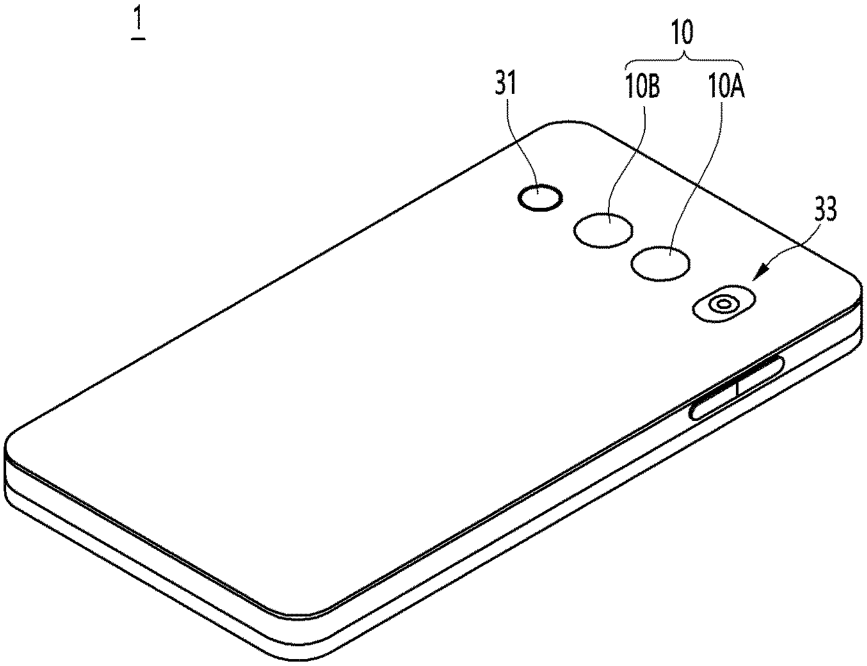
FIG. 22 is a diagram illustrating that a camera module according to an embodiment is applied to a mobile terminal.

FIG. 22 is a diagram illustrating that a camera module according to an embodiment is applied to a mobile terminal.

Referring to FIG. 22, the mobile terminal 1 may include a camera module 10 provided on the rear side. The camera module 10 may include an image capturing function. Also, the camera module 10 may include at least one of an auto focus function, a zoom function, and an OIS function. The camera module 10 may process a still video image or an image frame of a moving image obtained by the image sensor 300 in an imaging mode or a video call mode. The processed image frame may be displayed on a display unit (not shown) of the mobile terminal 1 and may be stored in a memory (not shown). In addition, although not shown in the drawings, the camera module may be further disposed on the front of the mobile terminal 1. For example, the camera module 10 may include a first camera module 10A and a second camera module 10B. In this case, at least one of the first camera module 10A and the second camera module 10B may include the above-described optical system 1000 and the image sensor 300. In addition, the camera module 10 may have a slim structure and may have improved distortion and aberration characteristics. the camera module may be provided more compactly by the optical system 1000 having a slim structure. In addition, the camera module 10 may have good optical performance even at the center and the periphery portions of the FOV.

The mobile terminal 1 may further include an autofocus device 31. The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emission laser (VCSEL) semiconductor device and a light receiving unit that converts light energy such as a photodiode into electrical energy. The mobile terminal 1 may further include a flash module 33. The flash module 33 may include a light emitting device emitting light therein. The flash module 33 may be operated by a camera operation of a mobile terminal or a user's control.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system, comprising:

first to tenth lenses disposed along an optical axis in a direction from an object side to a sensor side, wherein the first lens has positive (+) refractive power on the optical axis, wherein the second lens has positive (+) refractive power on the optical axis, wherein the ninth lens has negative (−) refractive power on the optical axis, wherein the tenth lens has negative (−) refractive power on the optical axis, wherein an object-side surface of the first lens has a convex shape on the optical axis, wherein the third lens has a meniscus shape that is convex toward the object, wherein an object-side surface of the fourth lens has a concave shape on the optical axis, wherein a sensor-side surface of the third lens has a minimum effective diameter among lens surfaces of the first to tenth lenses, wherein a sensor-side surface of the tenth lens has a maximum effective diameter among the lens surfaces of the first to tenth lenses, wherein the sensor-side surface of the tenth lens is provided without a critical point from the optical axis to an end of an effective region, wherein a distance from a center of the sensor-side surface of the tenth lens to a first point where a slope of a straight line passing through the sensor-side surface is less than −1 is more than 10% of an effective radius, and wherein the following equation satisfies:

$$0.4 < TTL/ImgH < 2.5$$

(TTL (Total track length) is a distance in the optical axis from an apex of the object-side surface of the first lens to an image surface of an image sensor, and ImgH is ½ of a maximum diagonal length of the image sensor).

2. The optical system of claim 1, wherein each of an object-side surface and a sensor-side surface of the seventh lens among the first to tenth lenses has at least one critical point, wherein the object-side surface of the seventh lens has a convex shape on the optical axis, wherein the sensor-side surface of the seventh lens has a concave shape on the optical axis, and wherein a sensor-side surface of the eighth lens disposed between the seventh lens and the ninth lens is provided without a critical point from the optical axis to an end of an effective region.

3. The optical system of claim 2, wherein a sensor-side surface of the ninth lens disposed between the eighth lens and the tenth lens is provided without a critical point from the optical axis to an end of an effective region, wherein an object-side surface of the eighth lens has a convex shape on the optical axis, and wherein the sensor-side surface of the eighth lens has a convex shape on the optical axis.

4. The optical system of claim 1, wherein the distance from the center of the sensor-side surface of the tenth lens to the first point is in a range of 10% to 30% or 40% to 55% of the effective radius, wherein a distance from the center of the sensor-side surface of the tenth lens to a second point where a slope of the straight line is less than −2 is in a range of 35% or more or 55% or more of the effective radius, and wherein the sensor-side surface of the tenth lens has a convex shape on the optical axis.

5. The optical system of claim 1, wherein the following equation satisfies:

$$1 < L1\_CT/L1\_ET < 5$$

(L1_CT is a thickness of the first lens in the optical axis, and L1_ET is a thickness between ends of effective region of the object-side surface and a sensor-side surface of the first lens).

6. The optical system of claim 1, wherein the following equations satisfy:

$$1.5 < n1 < 1.6$$

$$1.5 < n10 < 1.6$$

(n1 is a refractive index of the first lens, and n10 is a refractive index of the tenth lens).

7. The optical system of claim 1, wherein effective diameters of the third lens and an object-side and sensor-side surfaces of the tenth lens satisfy the following equation:

$$2 \le CA\_L10S1/AVR\_CA\_L3 \le 4$$

$$2 \le CA\_L10S2/AVR\_CA\_L3 < 5$$

(CA_L10S1 is an effective diameter (mm) of the object-side surface of the tenth lens, CA_L10S2 is the effective diameter (mm) of the sensor-side surface of the tenth lens, and AVR_CA_L3 is an average value of effective diameters of object-side and sensor-side surfaces of the third lens).

8. The optical system of claim 1, wherein a maximum Sag value of the sensor-side surface of the tenth lens is located at the center of the sensor-side surface, wherein thicknesses of the first and tenth lenses satisfies the following equation:

$$1 < L1\_CT/L10\_CT < 5$$

(L1_CT is a thickness of the first lens in the optical axis, and L10_CT is a thickness of the tenth lens in the optical axis).

9. A camera module, comprising:

an image sensor; and a filter between the image sensor and a last lens of an optical system, wherein the optical system includes an optical system according to claim 1, wherein the following equation satisfies:

$$1 \le F/EPD < 5$$

(F is a total focal length of the optical system, and EPD is an entrance pupil diameter of the optical system).

10. The optical system of claim 1, wherein the first lens has a meniscus shape that is convex toward the object, wherein the second lens has a meniscus shape that is convex toward the object, wherein the fourth lens has a meniscus shape that is convex toward the image sensor, wherein the ninth lens has a concave shape to both sides on the optical axis, and wherein the tenth lens has a meniscus shape that is convex toward the image sensor.

11. An optical system, comprising:

a first lens group having first to third lenses on an object side; and a second lens group having fourth to tenth lenses on a sensor side of the first lens group, wherein the first to tenth lenses is disposed along an optical axis from an object toward an image sensor, wherein the lenses within the optical system consist of ten lenses, wherein each of the first to tenth lenses has an object-side surface and a sensor-side surface, wherein the first lens group has positive (+) refractive power on the optical axis, wherein the second lens group has negative (−) refractive power on the optical axis, wherein the sensor-side surface of the third lens closest to the second lens group has a minimum effective diameter of effective diameters of the object-side and sensor-side surfaces of the first to tenth lenses, wherein the sensor-side surface of the tenth lens closest to the image sensor has a maximum effective diameter of the effective diameters of the object-side and sensor-side surfaces of the first to tenth lenses, wherein a distance between a center of the sensor-side surface of the tenth lens and the image sensor in the optical axis is a minimum distance, and the distance gradually increases toward an end of an effective region of the sensor-side surface of the tenth lens, and wherein the following equations satisfy:

$$0.4 < TTL/ImgH < 3$$

$$0.5 < TD/CA\_Max < 1.5$$

(TTL (Total track length) is a distance in an optical axis from an apex of the object-side surface of the first lens to an image surface of the image sensor, ImgH is ½ of a maximum diagonal length of the image sensor, TD is a maximum distance (mm) in the optical axis from the object-side surface of the first lens to the sensor-side surface of the tenth lens, and CA_Max is the effective diameter of the sensor-side surface of the tenth lens).

12. The optical system of claim 11, wherein an absolute value of a focal length of each of the first and second lens groups is greater for the second lens group than for the first lens group.

13. The optical system of claim 11, wherein each of the object-side surface and the sensor-side surface of the seventh lens has at least one critical point, wherein the sensor-side surface of the eighth lens disposed between the seventh lens and the ninth lens is provided without a critical point from the optical axis to an end of an effective region.

14. The optical system of claim 13, wherein the sensor-side surface of the ninth lens disposed between the eighth lens and the tenth lens is provided without a critical point from the optical axis to an end of an effective region.

15. The optical system of claim 11, wherein the sensor-side surface of the tenth lens is provided without a critical point from the optical axis to the end of the effective region, and a distance from the optical axis to a first point where a slope of a straight line passing through the sensor-side surface of the tenth lens is less than 1 is 10% or more of an effective radius.

16. The optical system of claim 15, wherein the distance from the center of the sensor-side surface closest to the image sensor of the tenth lens to the first point is in a range of 10% to 30% or 40% to 55% of the effective radius.

17. The optical system of claim 15, wherein the distance from the center of the sensor-side surface of the tenth lens to a second point where a slope of a straight line has an absolute value of less than 2 is located at 35% or more or 55% or more of the effective radius.

18. The optical system of claim 11, wherein the third lens has negative (−) refractive power on the optical axis, wherein the fourth lens has positive (+) refractive power on the optical axis, wherein the fifth lens has positive (+)

refractive power on the optical axis, wherein the sixth lens has negative (−) refractive power on the optical axis, wherein the seventh lens has negative (−) refractive power on the optical axis, and wherein the eighth lens has positive (+) refractive power on the optical axis.

19. An optical system, comprising:

first to tenth lenses disposed along an optical axis from an object side toward a sensor side, wherein the first lens has positive (+) refractive power on the optical axis, wherein the tenth lens has negative (−) refractive power on the optical axis, wherein each of the first to tenth lenses has an object-side surface and a sensor-side surface, wherein the sensor-side surface of the third lens has a concave shape on the optical axis, wherein the object-side surface of the fourth lens has a concave shape on the optical axis, wherein at least one of the object-side surface and the sensor-side surface of the eighth lens has a critical point, wherein the sensor-side surface of the ninth lens is provided without a critical point from the optical axis to an end of an effective region, wherein the sensor-side surface of the tenth lens is provided without a critical point from the optical axis to an end of an effective region, wherein the sensor-side surface of the third lens has a minimum effective diameter among effective diameters of the object-side and sensor-side surfaces of the first to tenth lenses, wherein the sensor-side surface of the tenth lens has a maximum effective diameter among the effective diameters of the object-side and sensor-side surfaces of the first to tenth lenses, wherein the following equation satisfies:

$$1 < CA\_Max/CA\_Min < 5$$

(CA_Max is the effective diameter of the sensor-side surfaces of the tenth, and CA_Min is the effective diameter of the sensor-side surface of the third lens).

20. The optical system of claim 19, wherein the sensor-side surface of the tenth lens has a minimum distance from a center to an image sensor.

* * * * *